(12) United States Patent
Nomura et al.

(10) Patent No.: US 9,754,169 B2
(45) Date of Patent: *Sep. 5, 2017

(54) INFORMATION PROCESSING SYSTEM, INFORMATION PROCESSING METHOD, INFORMATION PROCESSING DEVICE AND CONTROL METHOD AND CONTROL PROGRAM THEREOF, AND COMMUNICATION TERMINAL AND CONTROL METHOD AND CONTROL PROGRAM THEREOF

(71) Applicant: NEC Corporation, Tokyo (JP)

(72) Inventors: Toshiyuki Nomura, Tokyo (JP); Akio Yamada, Tokyo (JP); Kota Iwamoto, Tokyo (JP); Ryota Mase, Tokyo (JP)

(73) Assignee: NEC Corporation, Tokyo (JP)

( * ) Notice: Subject to any disclaimer, the term of this patent is extended or adjusted under 35 U.S.C. 154(b) by 220 days.

This patent is subject to a terminal disclaimer.

(21) Appl. No.: 14/365,008

(22) PCT Filed: Dec. 7, 2012

(86) PCT No.: PCT/JP2012/081853
§ 371 (c)(1),
(2) Date: Jun. 12, 2014

(87) PCT Pub. No.: WO2013/089042
PCT Pub. Date: Jun. 20, 2013

(65) Prior Publication Data
US 2015/0098610 A1    Apr. 9, 2015

(30) Foreign Application Priority Data
Dec. 16, 2011    (JP) .................. 2011-276522

(51) Int. Cl.
*G06K 9/00* (2006.01)
*G06Q 10/08* (2012.01)
(Continued)

(52) U.S. Cl.
CPC ... *G06K 9/00744* (2013.01); *G06F 17/30256* (2013.01); *G06K 9/00671* (2013.01);
(Continued)

(58) Field of Classification Search
CPC .......... G06K 9/00671; G06K 9/00744; G06K 9/00771; G06K 9/4609; G06K 9/4671;
(Continued)

(56) References Cited

U.S. PATENT DOCUMENTS 6,711,293 B1    3/2004  Lowe
7,050,631 B2 *  5/2006  Bian ..................... G06K 7/14
                                                235/462.08
(Continued)

FOREIGN PATENT DOCUMENTS

JP    2000-306077 A    11/2000
JP    2006-031200 A    2/2006
(Continued)

OTHER PUBLICATIONS

International Search Report, Corresponding to PCT/JP2012/081853, Feb. 5, 2013, 2 pages.
(Continued)

*Primary Examiner* — Katrina Fujita
(74) *Attorney, Agent, or Firm* — Wilmer Cutler Pickering Hale and Dorr LLP

(57) ABSTRACT

Merchandise management is implemented by recognizing a piece of merchandise in an image on a video in real time. A piece of merchandise and m-number of first local feature which are respectively 1-dimensional to i-dimensional feature vectors are stored after being associated with each other,
(Continued)

n-number of feature points are extracted from an image on a video captured by an imaging unit, n-number of second local feature which are respectively 1-dimensional to j-dimensional feature vectors are generated, a smaller number of dimensions of the number of dimensions i and the number of dimensions j is selected, and a recognition that the merchandise exists in the image on the video is made when it is determined that a prescribed proportion or more of the m-number of first local feature of the selected number of dimensions correspond to the n-number of second local feature of the selected number of dimensions.

20 Claims, 46 Drawing Sheets

(51) Int. Cl.
   *G06F 17/30*   (2006.01)
   *G06K 9/46*    (2006.01)
   *G06Q 10/06*   (2012.01)
   *G06Q 10/10*   (2012.01)
   *G06Q 50/10*   (2012.01)

(52) U.S. Cl.
   CPC ....... *G06K 9/00771* (2013.01); *G06K 9/4609* (2013.01); *G06K 9/4671* (2013.01); *G06Q 10/06* (2013.01); *G06Q 10/087* (2013.01); *G06Q 10/10* (2013.01); *G06Q 50/10* (2013.01)

(58) Field of Classification Search
   CPC  G06F 17/30256; G06Q 10/06; G06Q 10/087; G06Q 10/10; G06Q 50/10
   See application file for complete search history.

(56) References Cited

U.S. PATENT DOCUMENTS

| | | | | |
|---|---|---|---|---|
| 7,769,221 B1* | 8/2010 | Shakes | ...................... | B07C 3/14 382/141 |
| 8,335,251 B2* | 12/2012 | Oami | ................ | G06F 17/30256 375/240.08 |
| 2009/0063306 A1* | 3/2009 | Fano | ........................ | G06K 9/00 705/28 |
| 2010/0205177 A1* | 8/2010 | Sato | .................... | G06K 9/00281 707/737 |
| 2011/0129017 A1* | 6/2011 | Oami | ................ | G06F 17/30256 375/240.24 |
| 2011/0164826 A1* | 7/2011 | Noguchi | .............. | G06K 9/4671 382/253 |
| 2012/0202515 A1* | 8/2012 | Hsu | ...................... | G06Q 10/087 455/456.1 |
| 2014/0306952 A1* | 10/2014 | Oka | ........................ | G06T 15/08 345/419 |

FOREIGN PATENT DOCUMENTS

| | | |
|---|---|---|
| JP | 2008-257649 A | 10/2008 |
| JP | 2011-008507 | 1/2011 |
| JP | 2011-022168 A | 2/2011 |
| JP | 2011-198130 | 10/2011 |
| JP | 2011-242861 | 12/2011 |
| WO | WO-2010/035525 A1 | 4/2010 |

OTHER PUBLICATIONS

Hironobu Fujiyoshi, "Gradient-Based Feature Extraction-SIFT and HOG-", IEICE Technical Report, Aug. 27, 2007 (Aug. 27, 2007), vol. 107, No. 206, pp. 211 to 224.

David G. Lowe, "Distinctive image features from scale-invariant key points", International Journal of Computer Vision, 2004, pp. 91 to 110.

Japanese Office Action issued in corresponding Japanese Patent Application No. 2013-549240, dated Nov. 17, 2016, 16 pages.

Yan Ke, et al. "PCA-SIFT: A More Distinctive Representation for Local Image Descriptors", Proceedings of the 2004 IEEE Computer Society Conference on Computer Vision and Pattern (CVPR '04) Recognition, vol. 2, 2004, pp. 506-513 (8 pages).

* cited by examiner

Fig. 10

| MERCHANDISE ID (1001) | MERCHANDISE NAME/TYPE (1002) | FIRST LOCAL FEATURE (1003) | | | SECOND LOCAL FEATURE (1004) | ... | m-TH LOCAL FEATURE (1005) |
|---|---|---|---|---|---|---|---|
| | | 1ST TO 25TH DIMENSIONS | 26TH TO 50TH DIMENSIONS | 126TH TO 150TH DIMENSIONS | | | |
| 00001 | | | | | | | |
| 00002 | | | | | | | |
| ... | ... | | | | | | |

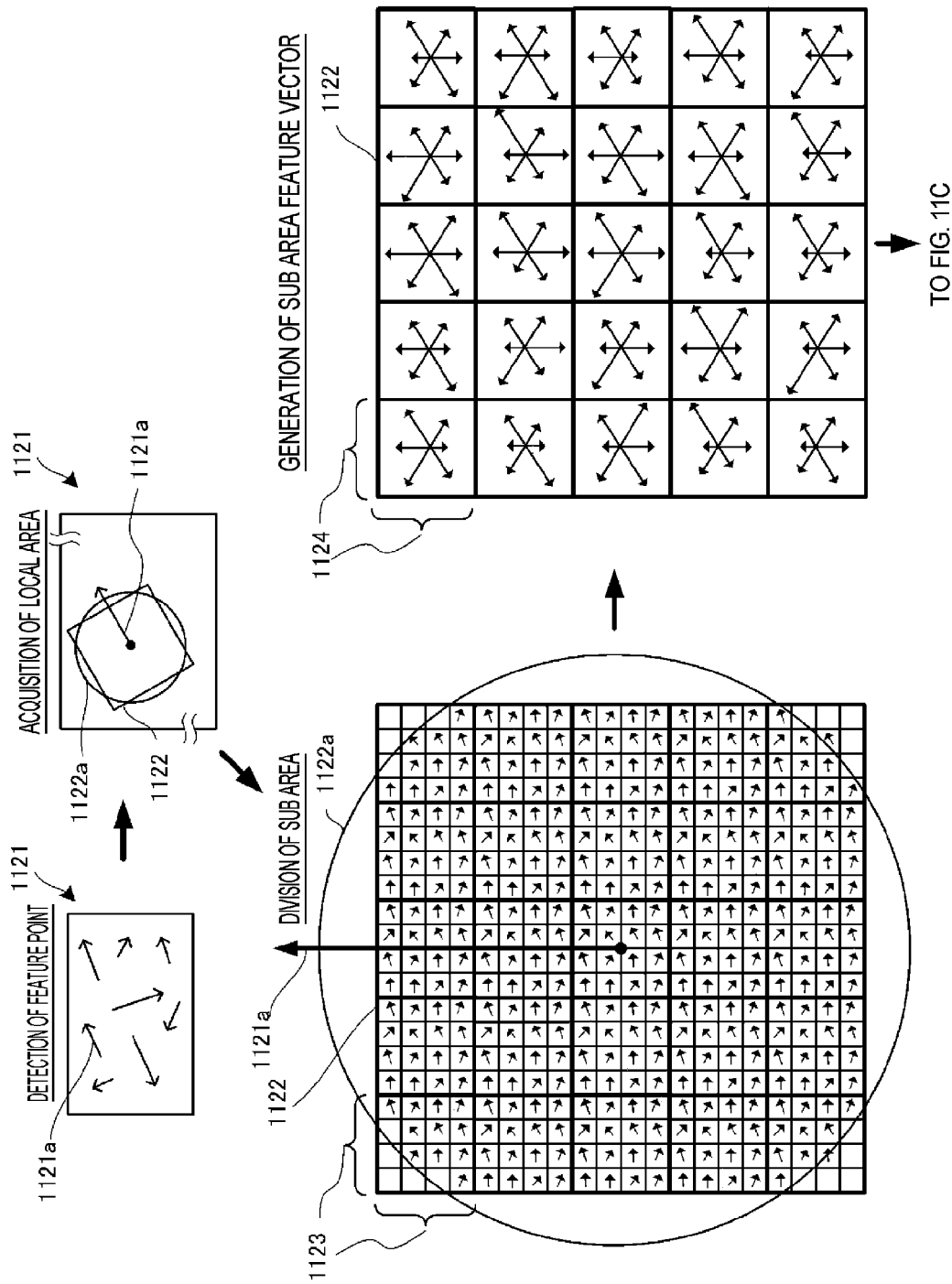

| 1201 | 1202 | 1203 | 1204 | 1205 | 1206 | 1207 | 1208 | 1209 |
|---|---|---|---|---|---|---|---|---|
| INPUT IMAGE ID | DETECTED FEATURE POINT | FEATURE POINT COORDINATE | LOCAL AREA INFORMATION | SUB AREA ID | SUB AREA INFORMATION | FEATURE VECTOR | SELECTED DIMENSION (PRIORITY) | LOCAL FEATURE |
| | 001 | | | 001 | | | | |
| | | | | 010 | | | | |
| | | | | ... | | | | |
| | 002 | | | 001 | | | | |
| | ... | ... | | ... | | | | |

1243

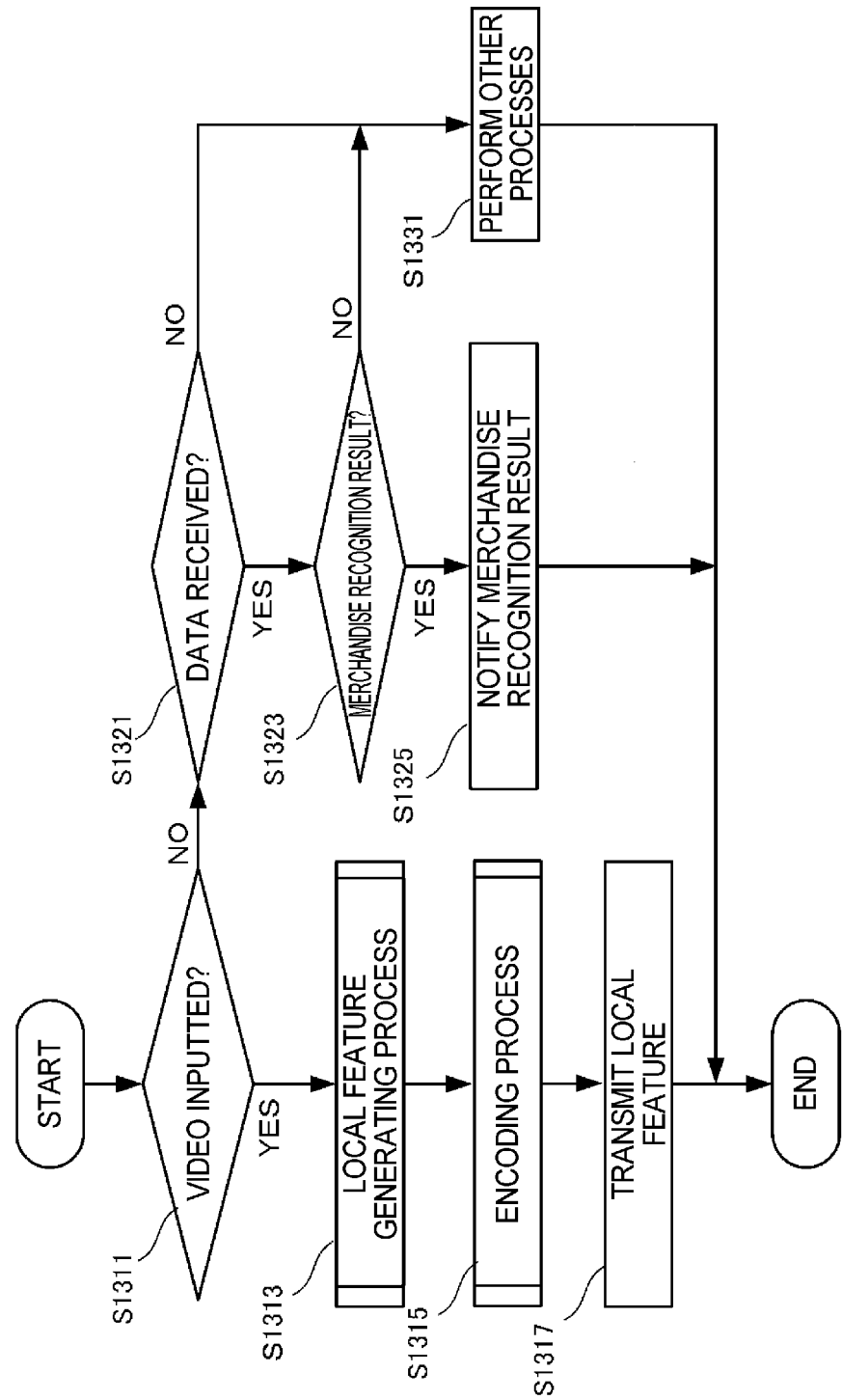

| MERCHANDISE ID | MERCHANDISE NAME/TYPE | PRICE |
|---|---|---|
| 00001 | | |
| 00002 | | |
| ⋮ | ⋮ | |

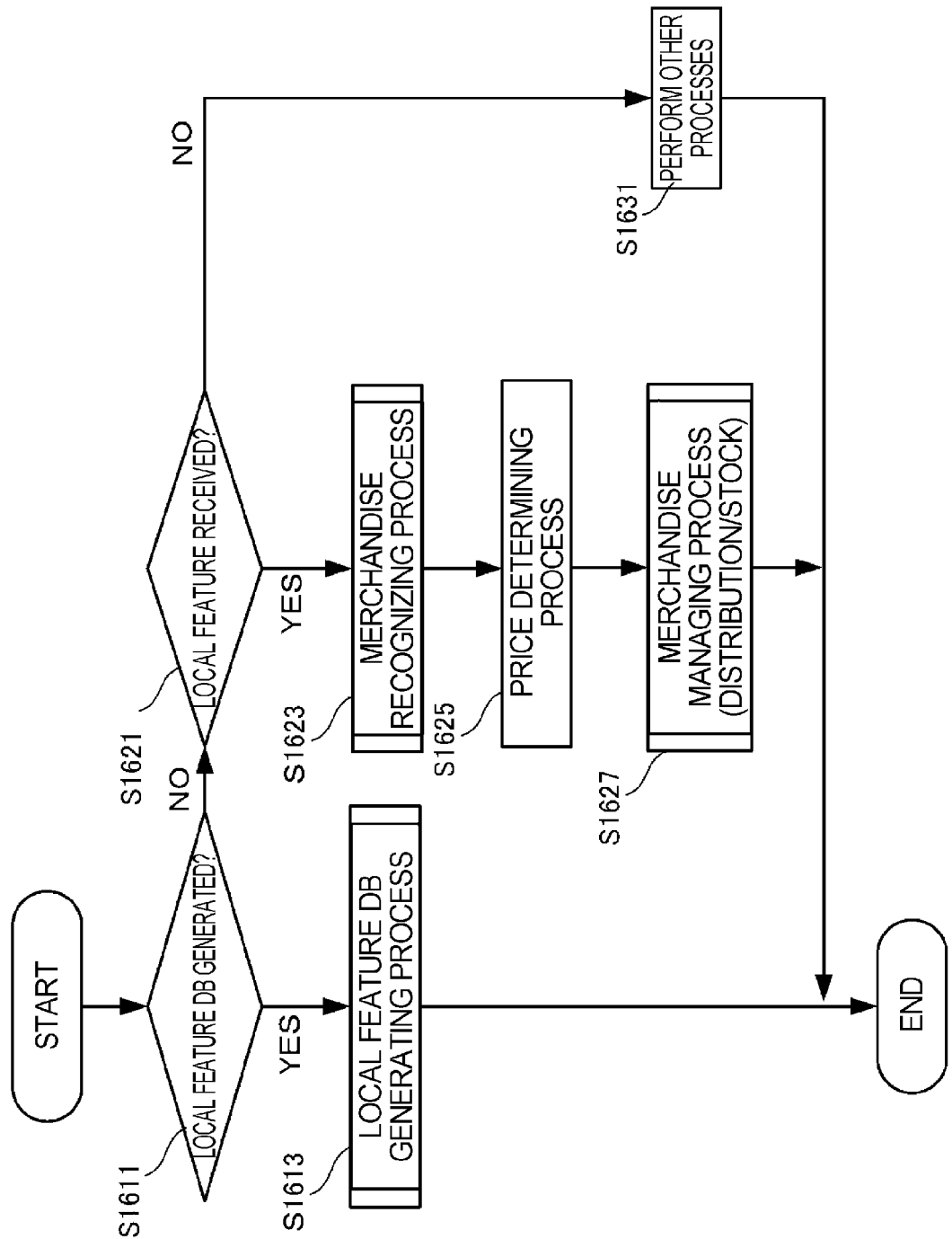

610a

| DISCOUNT TAG ID | DISCOUNT RATE | DISCOUNT PRICE | LOCAL FEATURE | ... |
|---|---|---|---|---|
|  |  |  |  |  |
|  |  |  |  |  |

INFORMATION PROCESSING SYSTEM, INFORMATION PROCESSING METHOD, INFORMATION PROCESSING DEVICE AND CONTROL METHOD AND CONTROL PROGRAM THEREOF, AND COMMUNICATION TERMINAL AND CONTROL METHOD AND CONTROL PROGRAM THEREOF

CROSS-REFERENCE TO RELATED APPLICATIONS

The present application is a national stage application of International Application No. PCT/JP2012/081853 entitled "Information Processing System, Information Processing Method, Information Processing Device and Control Method and Control Program Thereof, and Communication Terminal and Control Method Program Thereof," filed on Dec. 7, 2012, which claims the benefit of priority from Japanese Patent Application No. 2011-276522, filed on Dec. 16, 2011, the disclosures of which are incorporated herein in their entirety by reference thereto.

BACKGROUND

The present invention relates to a technique for identifying merchandise in a captured video using a local feature.

In the technical field described above, Patent Document 1 describes a technique for improving recognition speed by clustering features when recognizing a query image using a model dictionary generated from a model image in advance.

Patent Document 1: Patent Publication JP-A-2011-22168

SUMMARY

However, the technique described in the document mentioned above does not enable merchandise management to be performed by recognizing merchandise in an image on a video in real time.

An object of the present invention is to provide a technique for solving the problem described above.

In order to achieve the object described above, a system according to the present invention includes:

a first local feature storing unit which stores a piece of merchandise and m-number of first local feature which are respectively 1-dimensional to i-dimensional feature vectors and which are generated for each of m-number of local areas including each of m-number of feature points of an image of the merchandise after associating the piece of merchandise and m-number of first local feature with each other;

an imaging unit;

a second local feature generating unit which extracts n-number of feature points from an image on a video captured by the imaging unit and which generates n-number of second local feature which are respectively 1-dimensional to j-dimensional feature vectors for n-number of local areas including each of the n-number of feature points; and a recognizing unit which selects a smaller number of dimensions among the number of dimensions i of the feature vectors of the first local feature and the number of dimensions j of the feature vectors of the second local feature, and recognizes that the merchandise exists in the image on the video when determination is made that a prescribed proportion or more of the m-number of first local feature which are feature vectors up to the selected number of dimensions correspond to the n-number of second local feature which are feature vectors up to the selected number of dimensions.

In order to the achieve the object described above, a method according to the present invention is an information processing method in an information processing system including a first local feature storing unit that stores a piece of merchandise and m-number of first local feature which are respectively 1-dimensional to i-dimensional feature vectors and which are generated for each of m-number of local areas including each of m-number of feature points of an image of the merchandise after associating the piece of merchandise and m-number of first local feature with each other, the information processing method including:

an imaging step of performing imaging;

a second local feature generating step of extracting n-number of feature points from an image on a video captured in the imaging step and generating n-number of second local feature respectively which are 1-dimensional to j-dimensional feature vectors for n-number of local areas including each of the n-number of feature points; and a recognizing step of selecting a smaller number of dimensions among the number of dimensions i of the feature vectors of the first local feature and the number of dimensions j of the feature vectors of the second local feature, and recognizing that the merchandise exists in the image on the video when determination is made that a prescribed proportion or more of the m-number of first local feature which are feature vectors up to the selected number of dimensions correspond to the n-number of second local feature which are feature vectors up to the selected number of dimensions.

According to the present invention, merchandise management can be performed by recognizing merchandise in an image on a video in real time.

DESCRIPTION OF DRAWINGS

FIG. 10 is a diagram showing a configuration of a local feature DB according to the second embodiment of the present invention;

FIG. 11B is a diagram describing a procedure of local feature generation according to the second embodiment of the present invention;

FIG. 11F is a diagram showing hierarchization of feature vectors in the local feature generating unit according to the second embodiment of the present invention;

FIG. 12B is a diagram showing a local feature generating table of the communication terminal according to the second embodiment of the present invention;

FIG. 13 is a flow chart showing a processing procedure of the communication terminal according to the second embodiment of the present invention;

FIG. 15B is a diagram showing a configuration of a merchandise price DB according to the second embodiment of the present invention;

FIG. 16 is a flow chart showing a processing procedure of the managing computer according to the second embodiment of the present invention;

DETAILED DESCRIPTION

Hereinafter, embodiments of the present invention will be described in detail by way of example with reference to the drawings. However, it is to be understood that components described in the following embodiments are merely examples and are not intended to limit the technical scope of the present invention to such components.

First Embodiment

An information processing system 100 as a first embodiment of the present invention will be described with reference to FIG. 1. The information processing system 100 is a system for identifying merchandise in a captured video.

Figure 1:
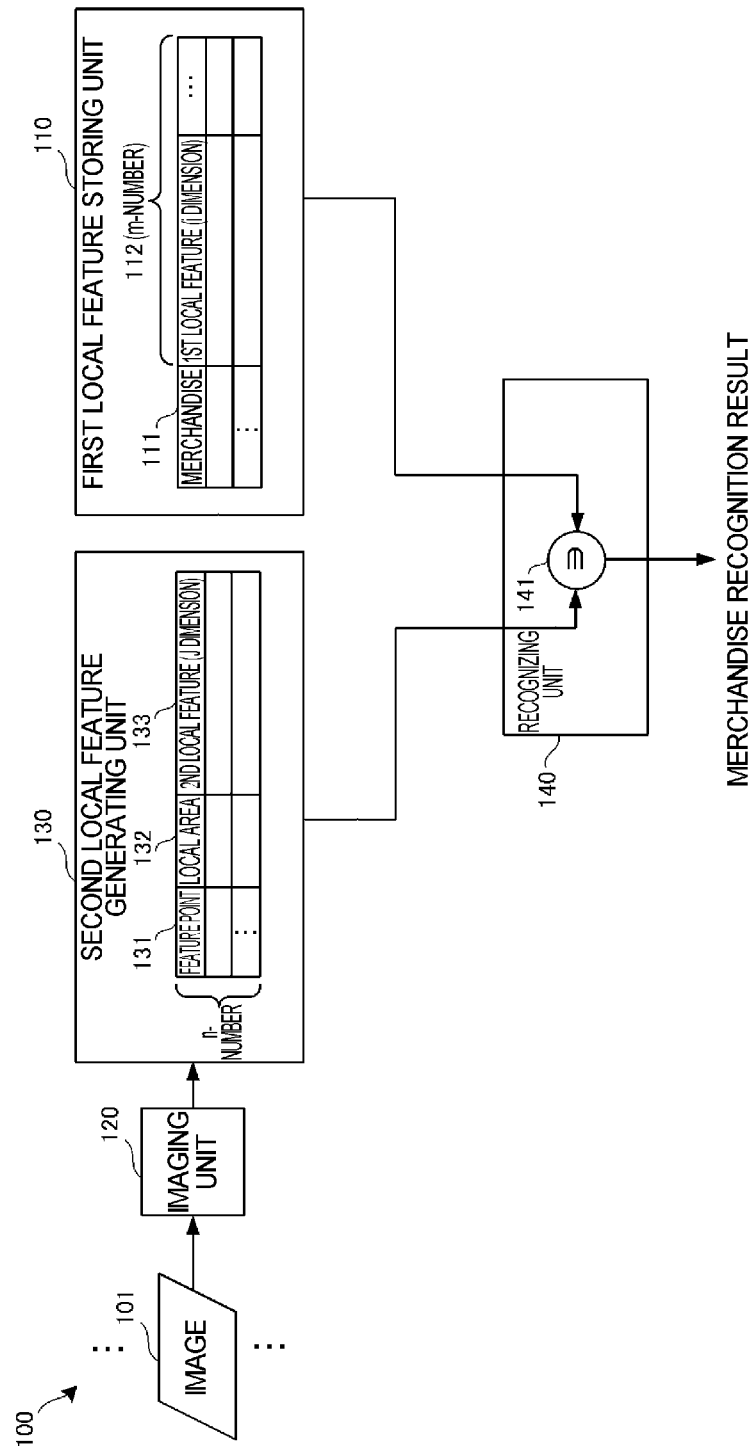
FIG. 1 is a block diagram showing a configuration of an information processing system according to a first embodiment of the present invention.

As shown in FIG. 1, the information processing system 100 includes a first local feature storing unit 110, an imaging unit 120, a second local feature generating unit 130, and a recognizing unit 140. The first local feature storing unit 110 stores, in association with each other, a piece of merchandise 111 and m-number of first local feature 112 which are respectively 1-dimensional to i-dimensional feature vectors and which are generated for each of m-number of local areas including each of m-number of feature points of an image of the merchandise. The second local feature generating unit 130 extracts m-number of feature points 131 from a video captured by the imaging unit 120 and generates m-number of second local feature 133 for m-number of local areas 132 including each of the m-number of feature points 131. The recognizing unit 140 selects a smaller number of dimensions among the number of dimensions i of the feature vectors of the first local feature 112 and the number of dimensions j of the feature vectors of the second local feature 133. The recognizing unit 140 determines whether or not a prescribed proportion or more of the m-number of first local feature 112 which are feature vectors up to the selected number of dimensions correspond to the n-number of second local feature 133 which are feature vectors up to the selected number of dimensions. When a correspondence of a specified proportion or more is determined (141), the recognizing unit 140 recognizes that the merchandise 111 exists in an image 101 on the video.

According to the present embodiment, merchandise management can be performed by recognizing merchandise in an image on a video in real time.

Second Embodiment

Next, an information processing system according to a second embodiment of the present invention will be described. In the information processing system according to the present embodiment, a communication terminal generates a local feature from a captured video and transmits the local feature to respective managing computers, and the managing computers collate the local feature with a local feature stored in association with a piece of merchandise to identify the merchandise and perform a managing process of the identified merchandise.

According to the present embodiment, since the same merchandise can be identified even in various conditions, merchandise management can be performed in a unified manner.

<<Configuration of Information Processing System>>

Figure 2:
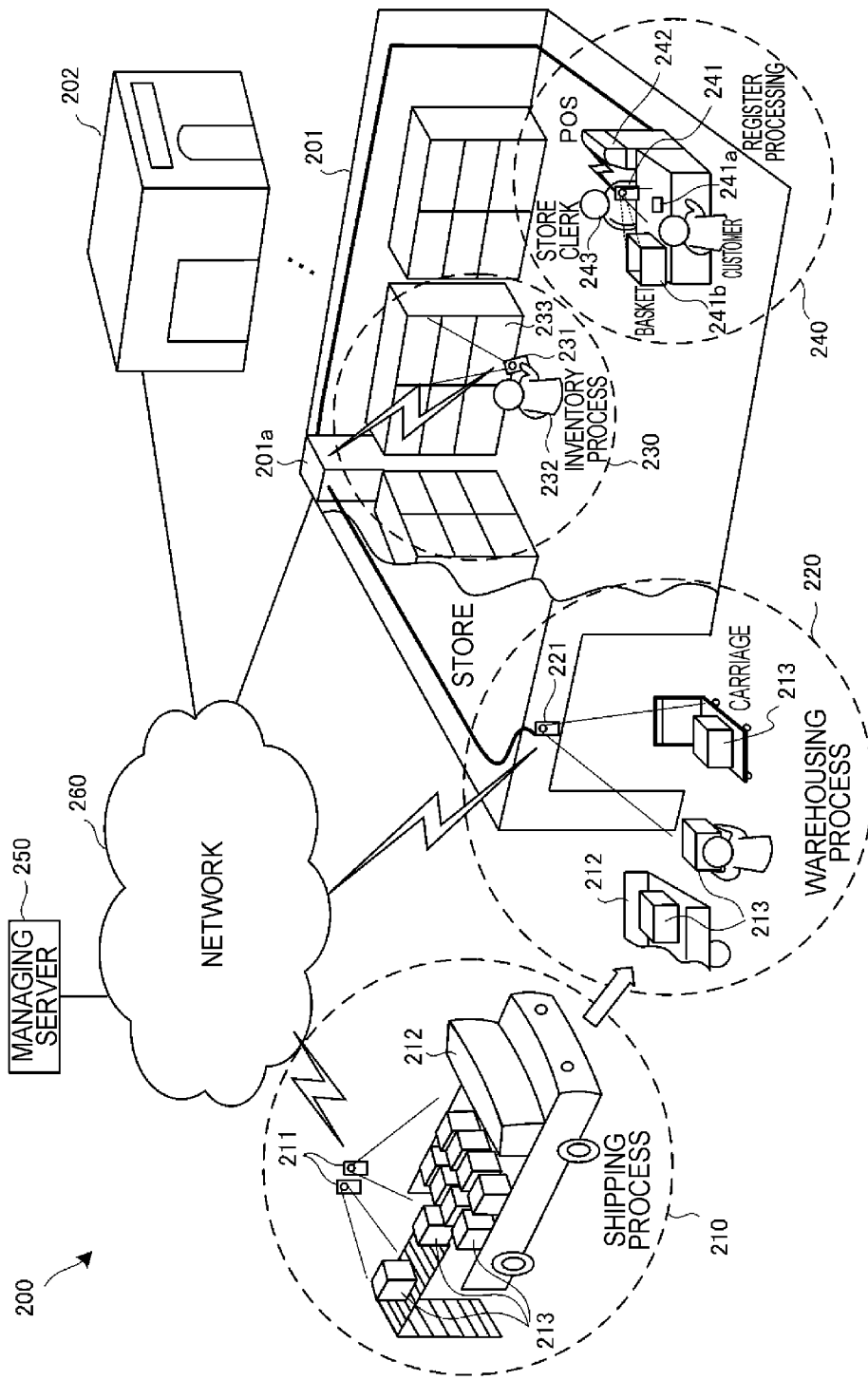
FIG. 2 is a block diagram showing a configuration of an information processing system according to a second embodiment of the present invention.

FIG. 2 is a block diagram showing a configuration of an information processing system 200 according to the present embodiment.

The information processing system 200 shown in FIG. 2 is a distribution system that performs sales of merchandise. The information processing system 200 includes a plurality of stores, shipping warehouses of merchandise, and the like connected via a network 260. FIG. 2 shows two stores 201 and 202. Hereinafter, processing at the store 201 will be described.

For the information processing system 200 shown in FIG. 2, a shipping process 210 from a warehouse, a warehousing process 220 to the store 201, an inventory process 230 at the store 201, and register processing 240 at the store 201 will be described.

First, in the shipping process 210, a communication terminal 211 captures a video of a delivery item 213 that is carried out from the warehouse onto a transport vehicle 212 and generates a local feature from the video. In the present example, the generated local feature is sent to a managing server 250 via the network 260. The managing server 250 identifies the delivery item 213 from the local feature and performs a delivery process. Moreover, in the shipping process 210, the captured delivery item 213 is a case such as a cardboard box.

Next, in the warehousing process 220, the communication terminal 221 captures a video of the warehoused item 213 that is unloaded from the transport vehicle 212 to be warehoused in the store 201, and generates a local feature from the video. Since the delivery item and the warehoused item are the same item, a same reference numeral is used. The generated local feature is sent to the managing server 250 via the network 260. At the same time, the generated local feature is sent to a store computer 20a. The managing server 250 and/or the store computer 201a identify the warehoused item 213 from the local feature and perform a warehousing process. Moreover, in the warehousing process 220, the captured delivery item 213 is also a case such as a cardboard box.

Next, in the inventory process 230, a communication terminal 231 carried by a store clerk 232 captures a video of a desired shelf 233. A local feature is generated from the captured video. The generated local feature is sent to the store computer 201a. Alternatively, the inventory process may be executed by the store computer 201a or may be performed by the managing server 250 by transferring data thereto. In addition, in the inventory process 230, since each piece of merchandise displayed on the shelf 233 must be recognized in addition to recognizing the shelf 233, local feature generation is performed on the basis of more accurate feature points or dimensions of feature vectors as compared to the shipping process 210 and the warehousing process 220 (refer to FIGS. 11A to 11F).

Next, in the register processing 240, a communication terminal 241 carried by a store clerk 243 or installed in a register captures a video of a piece of merchandise 241a or a basket 241b. A local feature is generated from the captured video. The generated local feature is sent to a POS (point of sale) 242 or to the store computer 201a via the POS 242. While an identifying process of merchandise using a local feature and a merchandise price determining process may be performed by both the POS 242 and the store computer 201a, the processes are desirably performed by the POS 242. Generation of local feature may be controlled so as to generate local feature with different accuracies when recognizing the individual piece of merchandise 241a and a plurality of pieces of merchandise in the basket 214b.

As described above, the shipping process 210, the warehousing process 220, the inventory process 230, and the register processing 240 can be realized in a unified manner in real time simply by capturing videos with the communication terminals 211 to 214.

Moreover, in the following description, the managing server 250, the store computer 201a, and the POS 242 which perform merchandise recognition by collating local feature may sometimes be collectively referred to as a managing computer as opposed to the communication terminals 211 to 214 that generate the local feature.

<<Operation Procedure During Shipping of Merchandise>>

Figure 3:
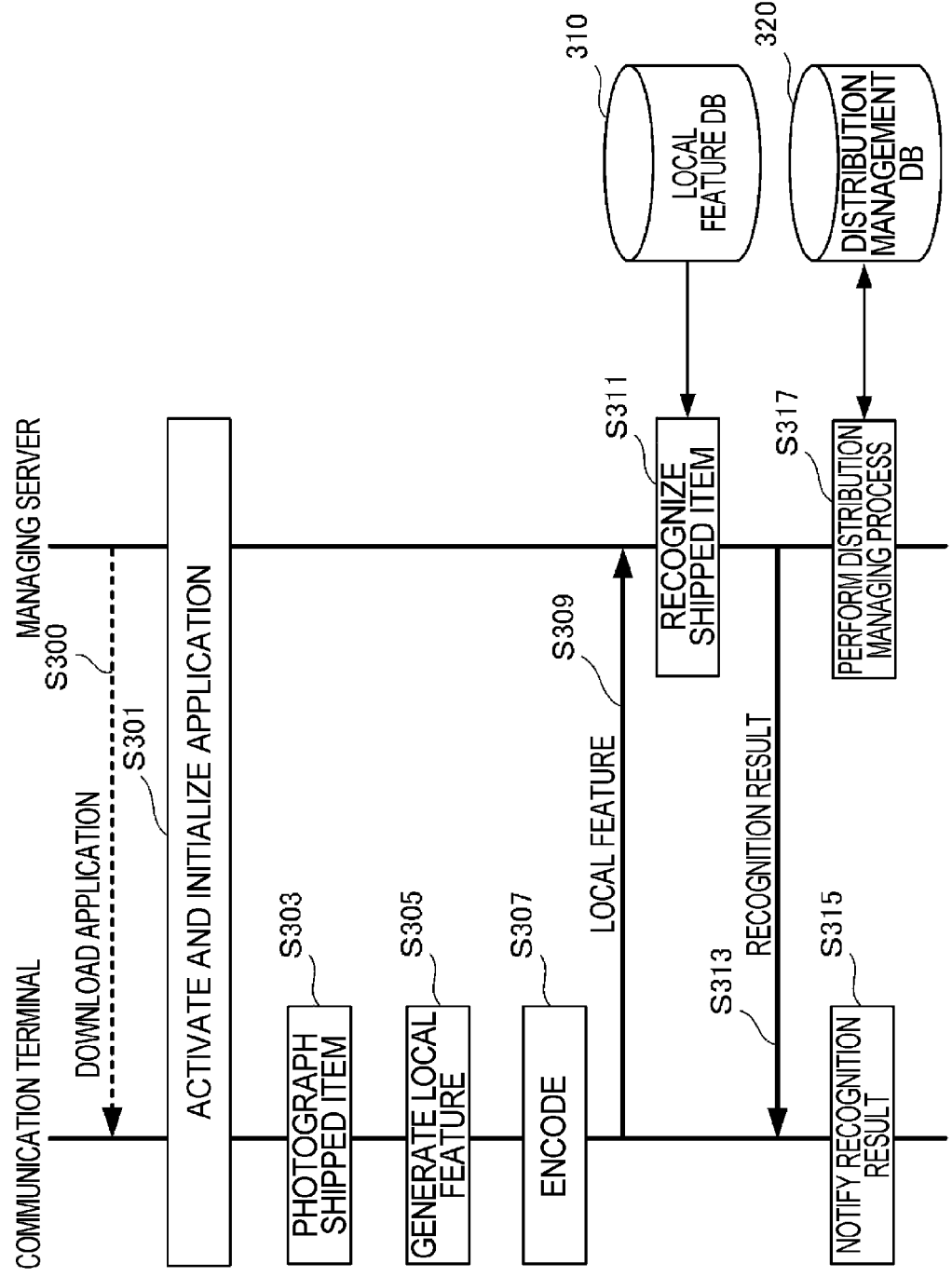
FIG. 3 is a sequence diagram showing an operation procedure during shipping of merchandise of the information processing system according to the second embodiment of the present invention.

FIG. 3 is a sequence diagram showing an operation procedure during shipping of merchandise according to the present embodiment.

First, if necessary, in step S300, an application is downloaded from the managing server 250 to a communication terminal. Subsequently, in step S301, the application is activated and initialized in order to perform the processes according to the present embodiment.

In step S303, the communication terminal captures a video of a shipped item. At this point, since the merchandise is housed in a cardboard box or the like, the box is recognized. In step S305, a local feature is generated from the video. Subsequently, in step S307, the local feature is encoded together with a feature point coordinate. The encoded local feature is transmitted in step S309 from the communication terminal to the managing server.

In step S311, the managing server refers to a local feature DB 310 generated and stored with respect to respective pieces of merchandise to recognize the shipped item. Subsequently, in step S313, the merchandise recognition result is transmitted from the managing server to the communication terminal.

In step S315, the communication terminal notifies the recognition result. Meanwhile, in step S317, the managing server refers to a distribution management DB 320 and performs a distribution managing process.

<<Operation Procedure During Warehousing of Merchandise>>

Figure 4:
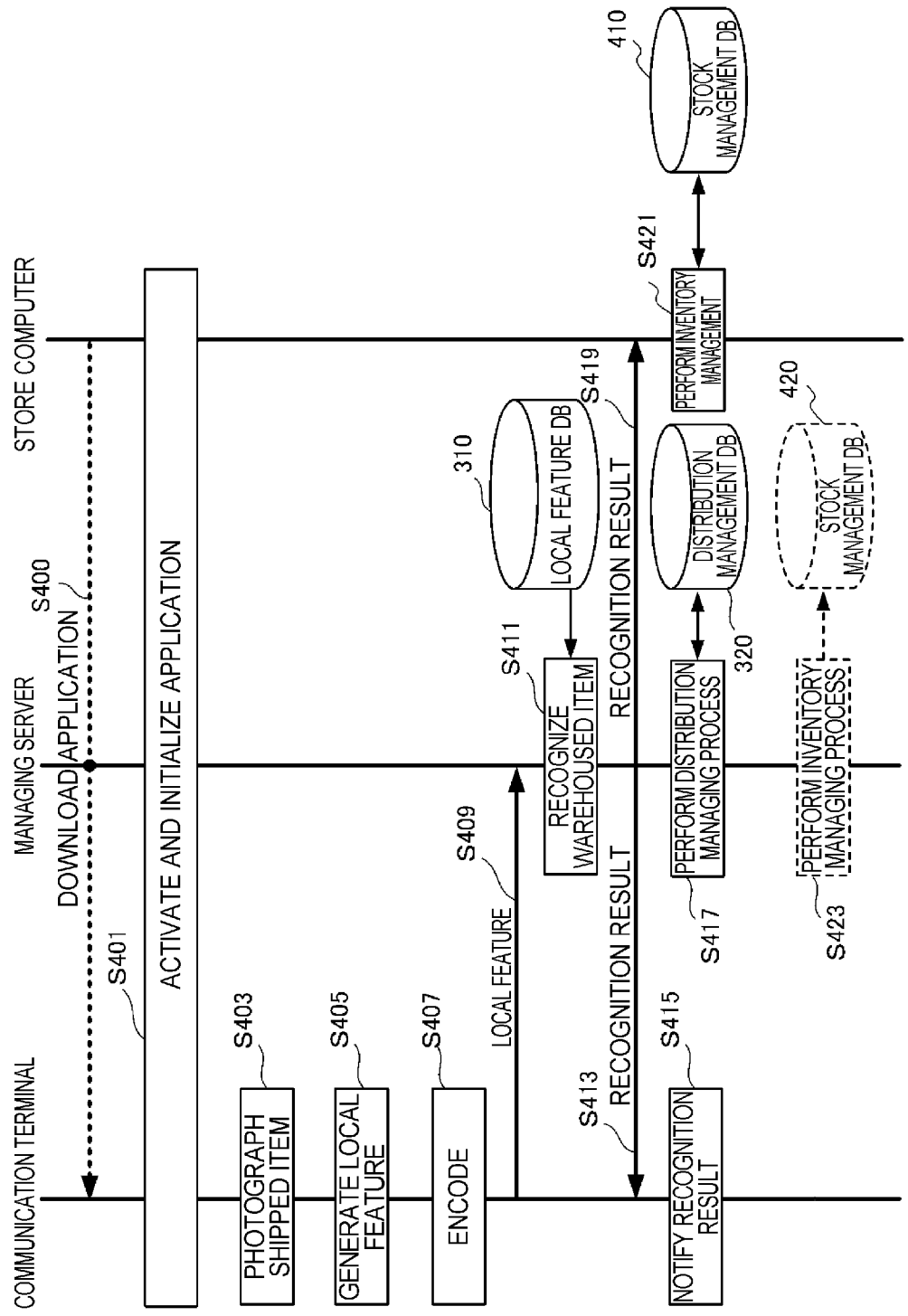
FIG. 4 is a sequence diagram showing an operation procedure during warehousing of merchandise of the information processing system according to the second embodiment of the present invention.

FIG. 4 is a sequence diagram showing an operation procedure during warehousing of merchandise according to the present embodiment.

First, if necessary, in step S400, an application is downloaded from the managing server 250 or a store computer to a communication terminal. Subsequently, in step S401, the application is activated and initialized in order to perform the processes according to the present embodiment.

In step S403, the communication terminal captures a video of a shipped/warehoused item. At this point, since the merchandise is housed in a cardboard box or the like, the box is recognized in a similar manner to during shipping. In step S405, a local feature is generated from the video. Subsequently, in step S407, the local feature is encoded together with a feature point coordinate. The encoded local feature is transmitted in step S409 from the communication terminal to the managing server.

In step S411, the managing server refers to the local feature DB 310 generated and stored with respect to respective pieces of merchandise to recognize the warehoused item. Subsequently, in step S413, the merchandise recognition result is transmitted from the managing server to the communication terminal.

In step S415, the communication terminal notifies the recognition result. Meanwhile, in step S417, the managing server refers to the distribution management DB 320 and performs a distribution managing process.

In the warehousing process, in step S419, the recognition result of the warehoused item is also transmitted from the managing server to the store computer. In step S421, the store computer refers to a stock management DB 410 and performs a warehousing process. Alternatively, recognition of the warehoused item using a local feature may be performed by the store computer. In addition, when the managing server performs stock management of the entire system, in S423, a stock managing process is performed by referring to a stock management DB included in the managing server.

<<Operation Procedure During Inventory/Shelf Allocation Evaluation>>

Figure 5:
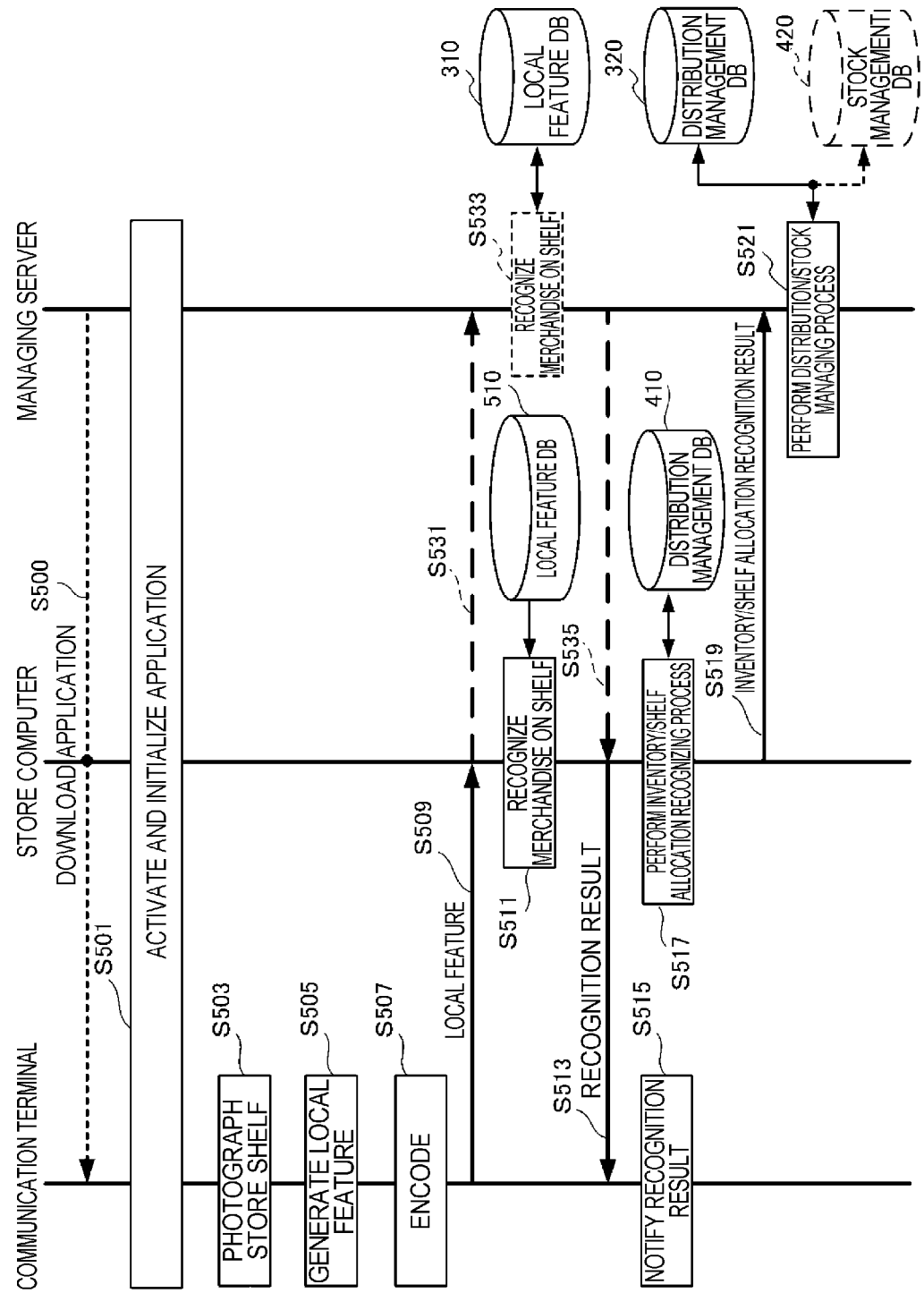
FIG. 5 is a sequence diagram showing an operation procedure during inventory/shelf allocation evaluation of the information processing system according to the second embodiment of the present invention.

FIG. 5 is a sequence diagram showing an operation procedure during inventory/shelf allocation evaluation according to the present embodiment.

First, if necessary, in step S500, an application is downloaded from the managing server 250 or a store computer to a communication terminal. Subsequently, in step S501, the application is activated and initialized in order to perform the processes according to the present embodiment.

In step S503, the communication terminal captures a video of a store shelf. In step S505, a local feature is generated from the video. Moreover, since identification and arrangement recognition of each piece of merchandise must be performed in addition to recognizing the entire shelf in inventory/shelf allocation evaluation, local feature with higher accuracy are generated by adjusting the number of feature points or the number of dimensions of feature vectors. Subsequently, in step S507, the local feature is encoded together with a feature point coordinate. The encoded local feature is transmitted in step S509 from the communication terminal to the store computer.

In step S511, the store computer refers to a local feature DB 510 of the store computer which is generated and stored with respect to respective pieces of merchandise to recognize the shelf and the merchandise. Subsequently, in step S513, the recognition results are transmitted from the store computer to the communication terminal.

In step S515, the communication terminal notifies the recognition results. Meanwhile, in step S517, the store computer refers to the stock management DB 410 of the store computer and performs an inventory/shelf allocation recognizing process. Subsequently, an inventory/shelf allocation recognition result is transmitted in step S519 from the store computer to the managing server. Based on the received inventory/shelf allocation recognition result, in step S521, the managing server refers to the distribution management DB 320 and the stock management DB 420 and performs a distribution/stock managing process.

Moreover, procedures that apply when recognition for inventory and shelf allocation evaluation using local feature is performed by the managing server instead of a store computer are indicated by dashed lines from step S531 to S535.

<<Operation Procedure at Store Register>>

Figure 6:
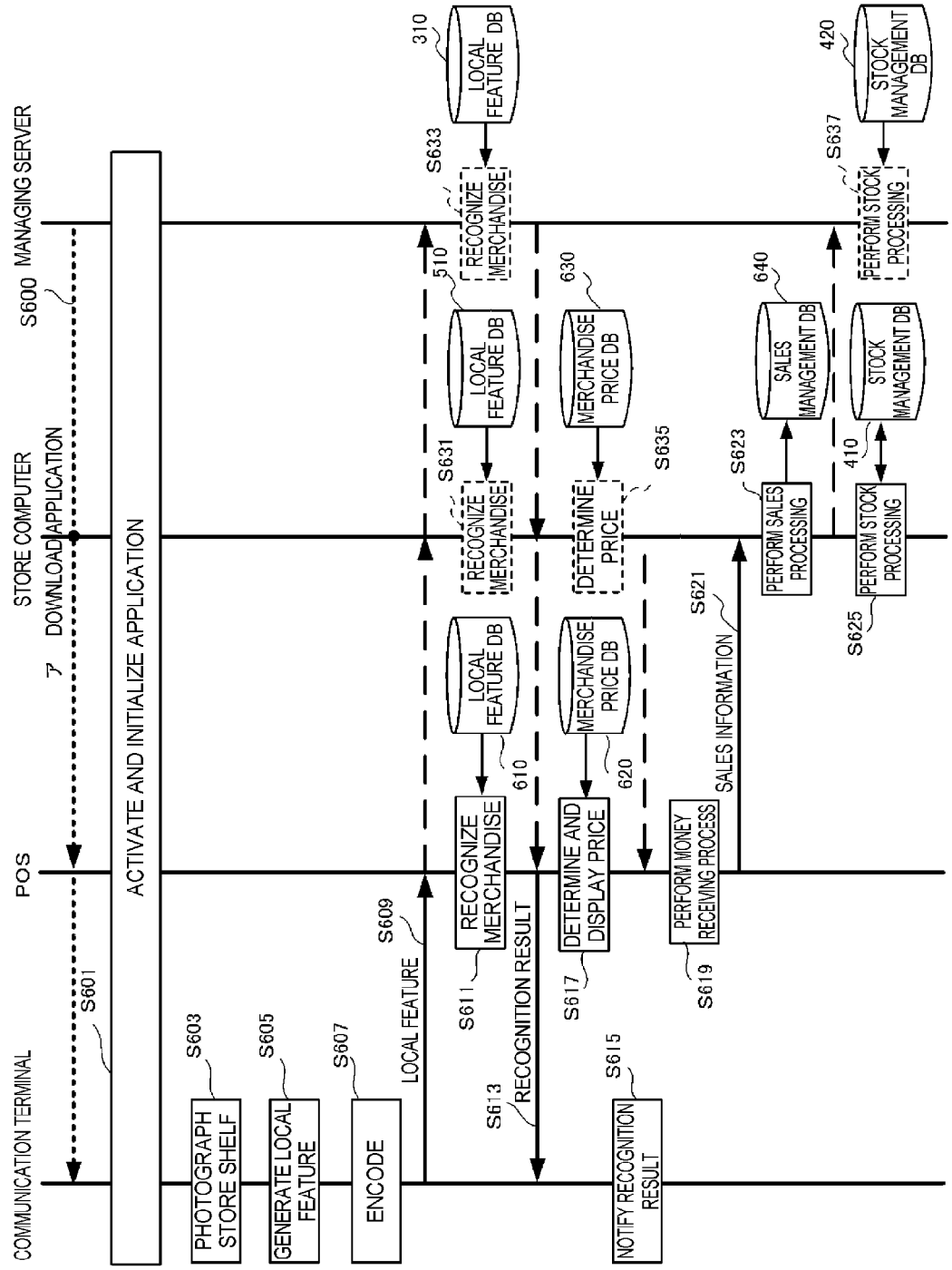
FIG. 6 is a sequence diagram showing an operation procedure at a store register in the information processing system according to the second embodiment of the present invention.

FIG. 6 is a sequence diagram showing an operation procedure at a store register according to the present embodiment.

First, if necessary, in step S600, an application is downloaded from the managing server 250 or a store computer to a POS or a communication terminal. Subsequently, in step S601, the application is activated and initialized in order to perform the processes according to the present embodiment.

In step S603, the communication terminal captures a video of a single piece of merchandise, a plurality of pieces of merchandise, or a group of merchandise placed in a basket at the register. In step S605, a local feature is generated from the video. Moreover, as already described with respect to inventory/shelf allocation evaluation, when recognizing individual pieces of merchandise or a plurality of pieces of merchandise in a basket, local feature with changed accuracy are generated by adjusting the number of feature points or the number of dimensions of feature vectors. Subsequently, in step S607, the local feature is encoded together with a feature point coordinate. The encoded local feature is transmitted in step S609 from the communication terminal to the POS.

In step S611, the POS refers to a local feature DB 610 of the POS which is generated and stored with respect to respective pieces of merchandise to recognize the merchandise. Subsequently, in step S613, the recognition result is transmitted from the POS to the communication terminal.

In step S615, the communication terminal notifies the recognition result. Meanwhile, in step S617, the POS refers to a merchandise price DB 620 of the POS to determine a price of the recognized merchandise and displays the price on the POS. In step S619, the POS accepts payment from a customer and performs a money receiving process. Subsequently, in step S621, sales information is transmitted to the store computer.

The store computer receives the sales information from the POS and, in step S623, refers to a sales management DB 640 and performs sales processing. Subsequently, in step S625, the store computer refers to the stock management DB 410 and performs stock processing.

Alternatively, in the processes shown in FIG. 6, merchandise recognition may be performed by the store computer or the managing server instead of the POS. Processes performed in this case are shown as steps S631 and S633. In addition, price determination may be performed by the store computer instead of the POS. A process performed in this case is shown as step S635. Furthermore, a case where stock processing is performed by the managing server is shown as step S637.

<<Functional Configuration of Communication Terminal>>

Figure 7:
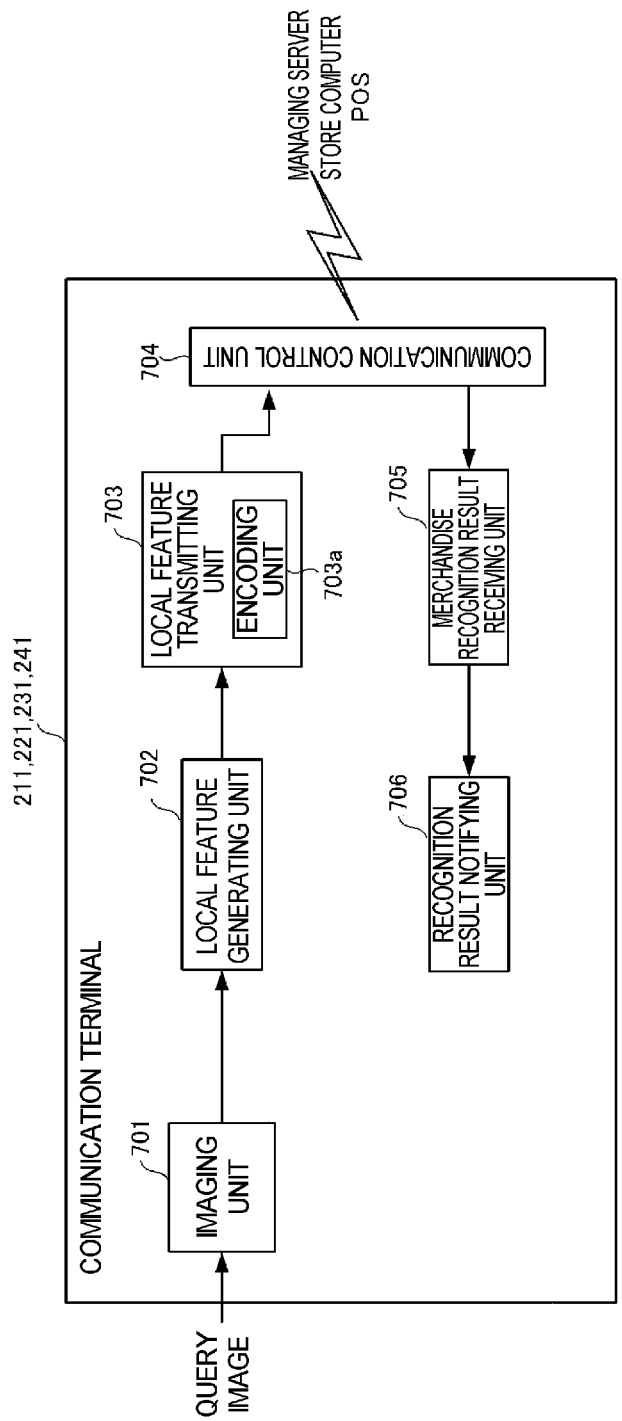
FIG. 7 is a block diagram showing a functional configuration of a communication terminal according to the second embodiment of the present invention.

FIG. 7 is a block diagram showing a functional configuration of the communication terminals 211, 221, 231, and 241 according to the present embodiment.

In FIG. 7, an imaging unit 701 inputs a query image. A local feature generating unit 702 generates a local feature from a video from the imaging unit 701. The generated local feature is encoded together with a feature point coordinate in a local feature transmitting unit 703 by an encoding unit 703a, and is transmitted via a communication control unit 704 to a computer that performs merchandise recognition using the local feature such as a POS, a store computer, or a managing server.

A merchandise recognition result receiving unit 705 receives a merchandise recognition result via the communication control unit 704. In addition, a recognition result notifying unit 706 notifies the received merchandise recognition result to a user.

<<Functional Configuration of Managing Server>>

Figure 8:
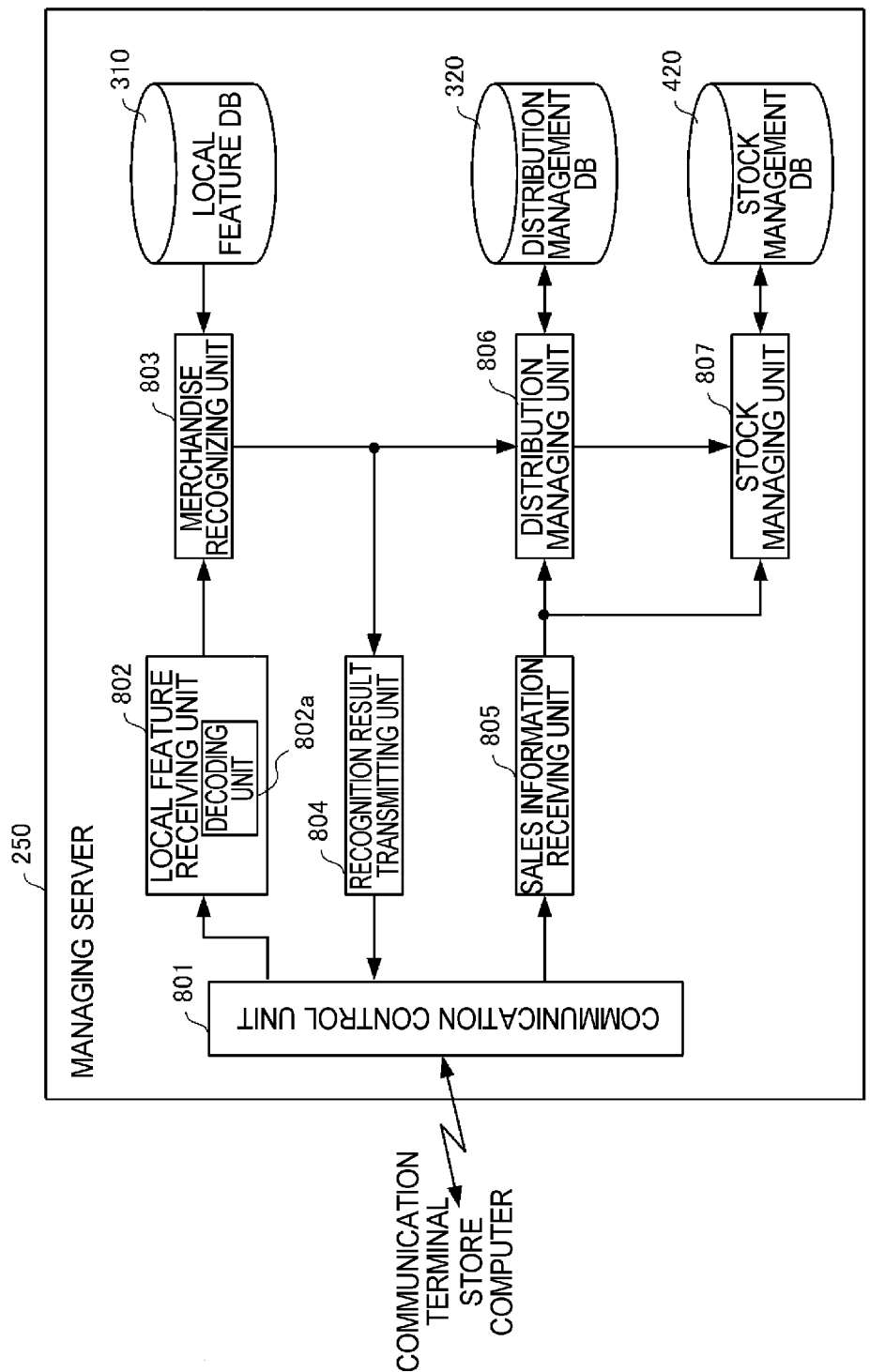
FIG. 8 is a block diagram showing a functional configuration of a managing server according to the second embodiment of the present invention.

FIG. 8 is a block diagram showing a functional configuration of the managing server 250 according to the present embodiment.

In FIG. 8, a local feature receiving unit 802 decodes a local feature received from a communication terminal via a communication control unit 801 with a decoding unit 802a. A merchandise recognizing unit 803 recognizes a piece of merchandise by collating the received local feature with a local feature in the local feature DB 310 that stores local feature corresponding to pieces of merchandise. A recognition result transmitting unit 804 returns a recognition result that is recognized by the merchandise recognizing unit 803 to the communication terminal via the communication control unit 801.

In addition, based on the recognition result from the merchandise recognizing unit 803 and sales information received by a sales information receiving unit 805, a distribution managing unit 806 performs distribution management by referring to the distribution management DB 320. In addition, a stock managing unit 807 performs stock management by referring to the stock management DB 420.

<<Functional Configuration of POS>>

Figure 9A:
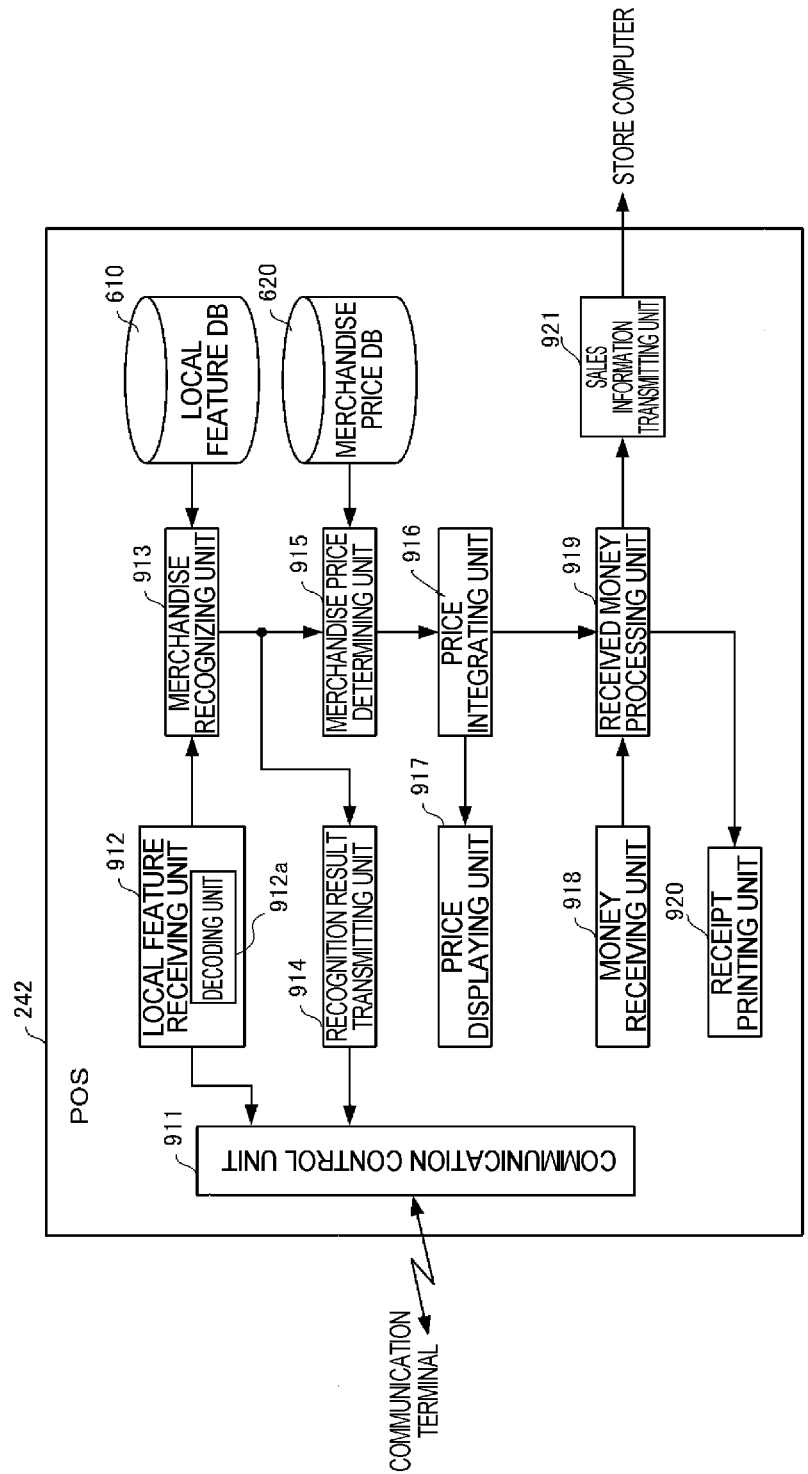
FIG. 9A is a block diagram showing a functional configuration of a POS according to the second embodiment of the present invention.

FIG. 9A is a block diagram showing a functional configuration of the POS 242 according to the present embodiment.

In FIG. 9A, a local feature receiving unit 912 decodes a local feature received from a communication terminal via a communication control unit 911 with a decoding unit 912a. A merchandise recognizing unit 913 recognizes merchandise by collating the received local feature with a local feature in the local feature DB 610 that stores local feature corresponding to merchandise. A recognition result transmitting unit 914 returns a recognition result that is recognized by the merchandise recognizing unit 913 to the communication terminal via the communication control unit 911.

In addition, a merchandise price determining unit 915 determines a price of a recognized piece of merchandise by referring to the merchandise price DB 620. The price of the merchandise is sent to a price integrating unit 916 to integrate a price of a piece of merchandise purchased by a customer. The integrated price is displayed on a price displaying unit 917.

Based on the integrated price that is integrated by the price integrating unit 916 and information on money received by the money receiving unit 918, a received money processing unit 919 prints a receipt with a receipt printing unit 920 and transmits the receipt to a store computer from a sales information transmitting unit 921.

<<Functional Configuration of Store Computer>>

Figure 9B:
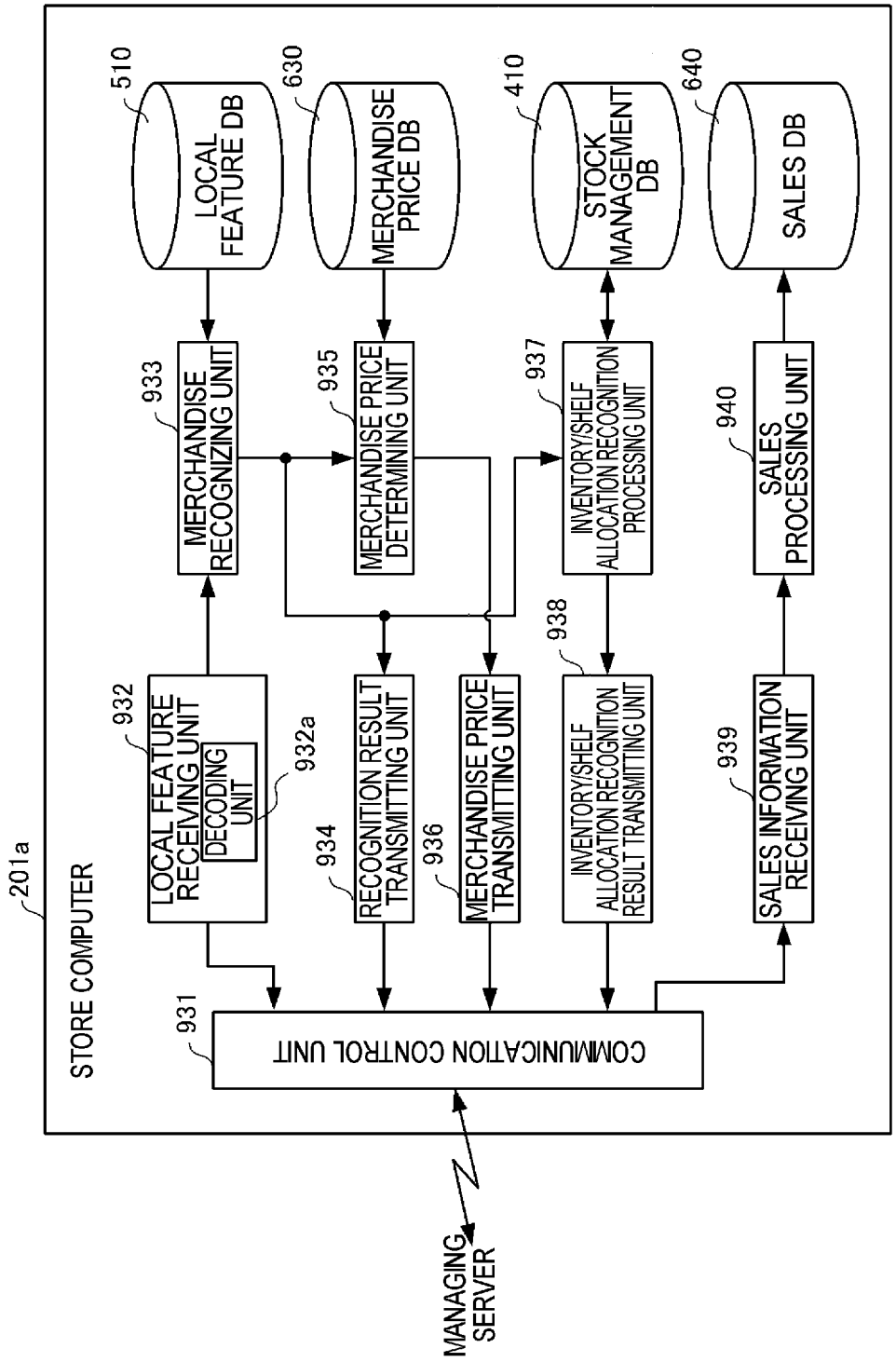
FIG. 9B is a block diagram showing a functional configuration of a store computer according to the second embodiment of the present invention.

FIG. 9B is a block diagram showing a functional configuration of the store computer 201a according to the present embodiment.

In FIG. 9B, a local feature receiving unit 932 decodes a local feature received from a communication terminal via a communication control unit 931 with a decoding unit 932a. A merchandise recognizing unit 933 recognizes merchandise by collating the received local feature with a local feature in the local feature DB 510 that stores local feature corresponding to merchandise. A recognition result transmitting unit 934 returns a recognition result that is recognized by the merchandise recognizing unit 933 to the communication terminal via the communication control unit 931.

In addition, a merchandise price determining unit 935 determines a price of a recognized piece of merchandise by referring to the merchandise price DB 630. The price of the merchandise is transmitted to the POS from a merchandise price transmitting unit 936 via the communication control unit 931 when, for example, the POS has a price determining function.

In addition, a recognition result of merchandise from the merchandise recognizing unit 933 is sent to an inventory/shelf allocation recognition processing unit 937 where an inventory/shelf allocation recognizing process is performed by referring to the stock management DB 410. An inventory/shelf allocation recognition result is sent to the managing server from an inventory/shelf allocation recognition result transmitting unit 938 via the communication control unit 931.

Furthermore, sales information transmitted from a POS via the communication control unit 931 is received at a sales information receiving unit 939 and accumulated in the sales management DB 640 by a sales processing unit 940.

(Local Feature DB)

FIG. 10 is a diagram showing a configuration of the local feature DBs 310, 510, and 610 according to the present embodiment.

The local feature DBs 310, 510, and 610 store a first local feature 1003, a second local feature 1004, . . . , and an m-th local feature 1005 in association with a merchandise ID 1001 and a merchandise name/type 1002. The respective local feature store feature vectors constituted by 1-dimensional to 150-dimensional components that are hierarchized every 25 dimensions in correspondence with 5×5 sub areas (refer to FIG. 11F).

Moreover, m denotes a positive integer and may be a number that differs according to the merchandise. In addition, in the present embodiment, a feature point coordinate is stored which is used for a collating process together with each local feature.

<<Local Feature Generating Unit>>

Figure 11A:
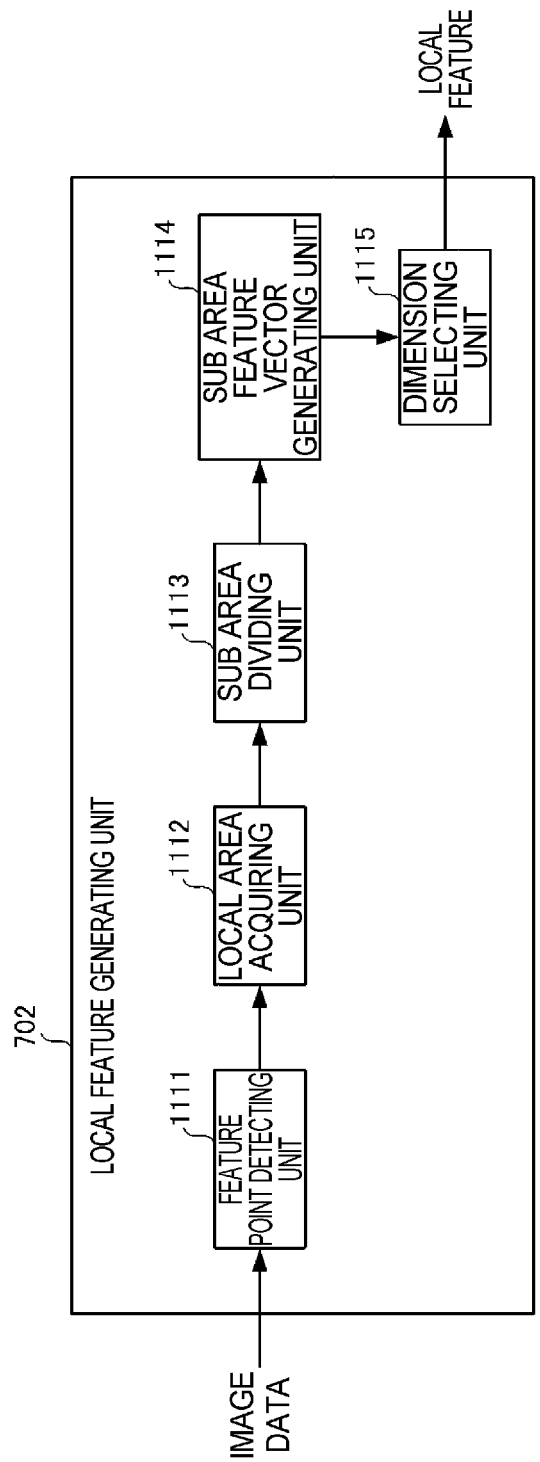
FIG. 11A is a block diagram showing a functional configuration of a local feature generating unit according to the second embodiment of the present invention.

FIG. 11A is a block diagram showing a configuration of the local feature generating unit 702 according to the present embodiment.

The local feature generating unit 702 is configured to include a feature point detecting unit 1111, a local area acquiring unit 1112, a sub area dividing unit 1113, a sub area feature vector generating unit 1114, and a dimension selecting unit 1115.

The feature point detecting unit 1111 detects a large number of feature points (feature points) from image data and outputs a coordinate position, a scale (size), and an angle of each feature point.

The local area acquiring unit 1112 acquires a local area to be subjected to feature extraction from the coordinate position, the scale, and the angle of each detected feature point.

The sub area dividing unit 1113 divides the local area into sub areas. For example, the sub area dividing unit 1113 is capable of dividing a local area into 16 blocks (4×4 blocks) or dividing a local area into 25 blocks (5×5 blocks). Moreover, the number of divisions is not limited. In the present embodiment, a case where a local area is divided into 25 blocks (5×5 blocks) will be hereinafter described as a representative example.

The sub area feature vector generating unit 1114 generates a feature vector for each sub area of a local area. For example, a gradient direction histogram can be used as a feature vector of a sub area.

Based on a positional relationship among sub areas, the dimension selecting unit 1115 selects (for example, by thinning) a dimension to be outputted as a local feature so that a correlation between feature vectors of adjacent sub areas is reduced. In addition, besides simply selecting a dimension, the dimension selecting unit 1115 is capable of determining a priority of selection. In other words, the dimension selecting unit 1115 can prioritize and select a dimension so that, for example, dimensions in a same gradient direction are not selected between adjacent sub areas. Furthermore, the dimension selecting unit 1115 outputs a feature vector constituted by the selected dimension as a local feature. Moreover, the dimension selecting unit 1115 can output a local feature in a state where dimensions are sorted according to priority.

<<Processes Performed by Local Feature Generating Unit>>

FIGS. 11B to 11F are diagrams showing processes performed by the local feature generating unit 702 according to the present embodiment.

First, FIG. 11B is a diagram showing a series of processes including feature point detection, local area acquisition, sub area division, and feature vector generation performed by the local feature generating unit 702. For information on the series of processes, please refer to U.S. Pat. No. 6,711,293 and David G. Lowe, "Distinctive Image Features from Scale-invariant Key Points", (U.S.A.), International Journal of Computer Vision, 60(2), 2004, p. 91-110.

(Feature Point Detecting Unit)

An image 1121 shown in FIG. 11B is an image representing a state where the feature point detecting unit 1111 in FIG. 11A has detected a feature point from an image on a video. Hereinafter, generation of a local feature will be described using a single piece of feature point data 1121a as a representative example. An origin of an arrow denoting the feature point data 1121a represents a coordinate position of a feature point, a length of the arrow represents a scale (size) of the feature point, and a direction of the arrow represents an angle of the feature point. In this case, brightness, chroma, hue, or the like can be selected as the scale (size) and direction depending on an object video. Moreover, while a case of 6 directions at 60-degree intervals will be described in the example shown in FIG. 11B, the present invention is not limited thereto.

(Local Area Acquiring Unit)

The local area acquiring unit 1112 shown in FIG. 11A generates, for example, a Gaussian window 1122a centered on the origin of the feature point data 1121a and generates a local area 1122 that substantially includes the Gaussian window 1122a. While the local area acquiring unit 1112 generates a square local area 1122 in the example shown in FIG. 11B, the local area may be circular or have another shape. This local area is acquired for each feature point. A circular local area produces an effect of improved robustness in an imaging direction.

(Sub Area Dividing Unit)

Next, a state is shown where the sub area dividing unit 1113 has divided the scale and the angle of each pixel included in the local area 1122 of the feature point data 1121a into sub areas 1123. Moreover, FIG. 11B shows an example of a division into 5×5=25 sub areas respectively including 4×4=16 pixels. Alternatively, there may be 4×4=16 sub areas, or other shapes and other numbers of divisions may be adopted.

(Sub Area Feature Vector Generating Unit)

The sub area feature vector generating unit 1114 quantizes the scale of each pixel in the sub area into angle units of 6 directions by generating a histogram to obtain sub area feature vectors 1124. In other words, these 6 directions are directions normalized with respect to angles outputted by the feature point detecting unit 1111. In addition, the sub area feature vector generating unit 1114 sums up frequencies in 6 directions quantized for each sub area and generates a histogram. In this case, the sub area feature vector generating unit 1114 outputs a feature vector constituted by a histogram of 25 sub area blocks×6 directions=150 dimensions which is generated for each feature point. Furthermore, quantization of the gradient direction is not limited to 6 directions, and the gradient direction may alternatively be quantized into an arbitrary number of quantizations such as 4 directions, 8 directions, and 10 directions. When the gradient direction is quantized in D-number of directions, if a gradient direction prior to quantization is denoted by G (0 to $2\pi$ radian), a gradient direction quantization value $Qq$ (q=0, ..., D−1) can be calculated using, but not limited to, Expressions (1) and (2) below.

$$Qq = \text{floor}(G \times D/2\pi) \quad (1)$$

$$Qq = \text{round}(G \times D/2\pi) \bmod D \quad (2),$$

where floor( ) denotes a function for truncating a fractional part, round( ) denotes a rounding function, and mod denotes an operation for calculating a remainder. Alternatively, when generating a gradient histogram, the sub area feature vector generating unit 1114 may sum up frequencies by adding a magnitude of a gradient instead of simply summing up frequencies. Alternatively, when summing up a gradient histogram, the sub area feature vector generating unit 1114 may add weight values not only to a sub area to which a pixel belongs but also to nearby sub areas (such as adjacent blocks) in accordance with a distance between sub areas. Alternatively, the sub area feature vector generating unit 1114 may also add weight values in gradient directions preceding and following the quantized gradient direction. Moreover, the feature vector of a sub area is not limited to a gradient direction histogram and may be any information having a plurality of dimensions (components) such as color information. In the present embodiment, a description of using a gradient direction histogram as a feature vector of a sub area will be given.

(Dimension Selecting Unit)

Next, processes of the dimension selecting unit 1115 in the local feature generating unit 702 will be described with reference to FIGS. 11C to 11F.

Based on a positional relationship among sub areas, the dimension selecting unit 1115 selects (thins) a dimension (component) to be outputted as a local feature so that a correlation between feature vectors of adjacent sub areas is reduced. More specifically, the dimension selecting unit 1115 selects a dimension so that, for example, at least one gradient direction differs between adjacent sub areas. Moreover, while the dimension selecting unit 1115 mainly uses adjacent sub areas as nearby sub areas in the present embodiment, nearby sub areas are not limited to adjacent sub areas. For example, sub areas within a prescribed distance from an object sub area may be used as nearby sub areas.

Figure 11C:
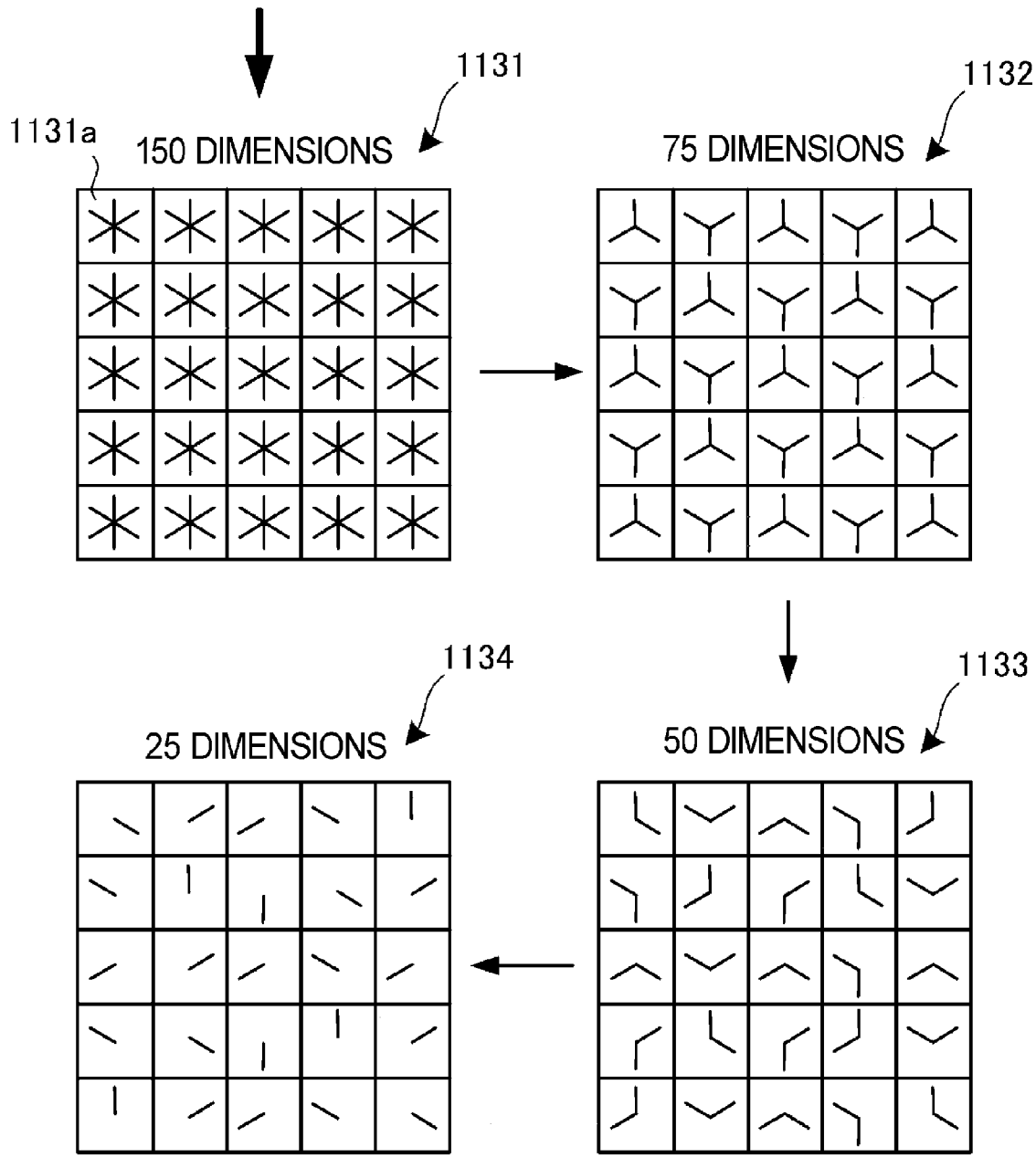
FIG. 11C is a diagram describing a procedure of local feature generation according to the second embodiment of the present invention.

FIG. 11C is a diagram showing an example of a case where a dimension is selected from a feature vector 1131 of a 150-dimensional gradient histogram generated by dividing a local area into sub areas of 5×5 blocks and quantizing a gradient direction into 6 directions 1131*a*. In the example shown in FIG. 11C, a dimension is selected from a 150-dimensional (5×5 sub area blocks×6 directions) feature vector.

(Dimension Selection of Local Area)

FIG. 11C is a diagram showing a selecting process of the number of dimensions of a feature vector by the local feature generating unit 702.

As shown in FIG. 11C, the dimension selecting unit 1115 selects a feature vector 1132 of a 75-dimensional gradient histogram having half the number of dimensions from the feature vector 1131 with the 150-dimensional gradient histogram. In this case, dimensions can be selected so that dimensions of a same gradient direction are not selected between sub area blocks that are adjacent to each other in horizontal and vertical directions.

In this example, when the quantized gradient directions in the gradient direction histogram are expressed as q (q=0, 1, 2, 3, 4, 5), a block for which components q=0, 2, 4 are selected and a sub area block for which components q=1, 3, 5 are selected are alternately arranged. In addition, in the example shown in FIG. 11C, gradient directions selected for the adjacent sub area blocks add up to a total of 6 directions.

In addition, the dimension selecting unit 1115 selects a feature vector 1133 of a 50-dimensional gradient histogram from the feature vector 1132 of the 75-dimensional gradient histogram. In this case, a dimension can be selected so that only one direction is the same (a remaining one direction is different) between sub area blocks positioned at an oblique 45 degrees with respect to each other.

Furthermore, when selecting a feature vector 1134 of a 25-dimensional gradient histogram from the feature vector 1133 of the 50-dimensional gradient histogram, the dimension selecting unit 1115 can select a dimension so that selected gradient directions are not consistent between sub area blocks positioned at an oblique 45 degrees with respect to each other. In the example shown in FIG. 11C, the dimension selecting unit 1115 selects one gradient direction from each sub area from 1 dimension to 25 dimension, two gradient directions from each sub area from 26 dimension to 50 dimension, and three gradient directions from each sub area from 51 dimension to 75 dimension.

In this manner, gradient directions are desirably selected so that gradient directions do not overlap each other between adjacent sub area blocks and that all gradient directions are equally selected. At the same time, desirably, as in the example shown in FIG. 11C, dimensions are equally selected from an entire local area. It should be noted that the dimension selection method shown in FIG. 11C is simply an example and selection methods are not limited thereto.

(Priority of Local Area)

Figure 11D:
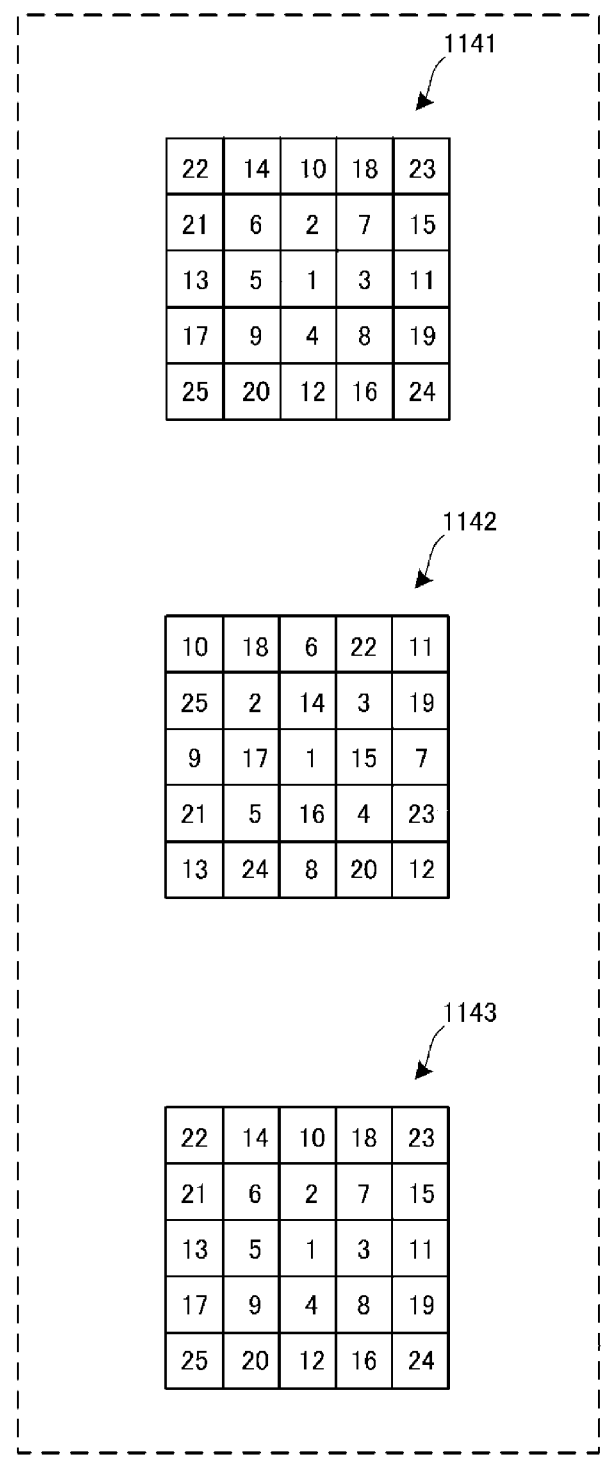
FIG. 11D is a diagram showing a selection order of sub areas in the local feature generating unit according to the second embodiment of the present invention.

FIG. 11D is a diagram showing an example of a selection order of feature vectors from sub areas in the local feature generating unit 702.

Instead of simply selecting dimensions, the dimension selecting unit 1115 is also capable of determining a priority of selection so that dimensions with greater contributions to a feature of a feature point are selected first. In other words, the dimension selecting unit 1115 can prioritize and select a dimension so that, for example, dimensions in a same gradient direction are not selected between adjacent sub area blocks. Furthermore, the dimension selecting unit 1115 outputs a feature vector constituted by the selected dimension as a local feature. Moreover, the dimension selecting unit 1115 can output a local feature in a state where dimensions are sorted according to priority.

In other words, between 1 to 25 dimensions, 26 to 50 dimensions, and 51 to 75 dimensions, for example, the dimension selecting unit 1115 can select dimensions so as to add dimensions in an order of sub area blocks shown in a matrix 1141 in FIG. 11D. When using the priority shown in the matrix 1141 in FIG. 11D, the dimension selecting unit 1115 can select gradient directions by giving a higher priority to sub area blocks near the center.

Figure 11E:
FIG. 11E is a diagram showing a selection order of feature vectors in the local feature generating unit according to the second embodiment of the present invention.

A matrix 1151 shown in FIG. 11E is a diagram showing examples of the number of components of a 150-dimensional feature vector on the basis of the order of selection in FIG. 11D. In this example, when 5×5=25 blocks are expressed by numbers p (p=0, 1, . . . , 25) in a raster-scanning order and quantized gradient directions are expressed as q (q=0, 1, 2, 3, 4, 5), the number of a component of the feature vector is expressed as 6×p+q.

Figure 11F:
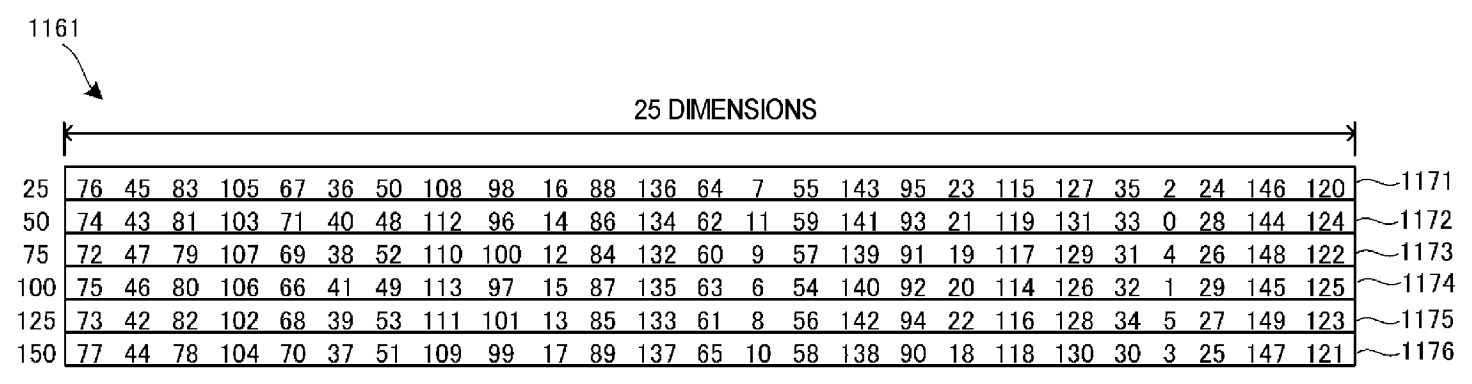

A matrix 1161 in FIG. 11F is a diagram showing hierarchization of orders of 150 dimensions according to the selection order shown in FIG. 11E in units of 25 dimensions. In other words, the matrix 1161 in FIG. 11F is a diagram showing a configuration example of local feature obtained by selecting the components shown in FIG. 11E according to the priority represented by the matrix 1141 in FIG. 11D. The dimension selecting unit 1115 can output dimension components in the order shown in FIG. 11F. Specifically, for example, when outputting local feature of 150 dimensions, the dimension selecting unit 1115 can output components of all 150 dimensions in the order shown in FIG. 11F. In addition, for example, when outputting the local feature of the 25 dimension, the dimension selecting unit 1115 can output a 1st row (76th, 45th, 83rd, . . . , 120th) component 1171 shown in FIG. 11F in the order (left to right) shown in FIG. 11F. Furthermore, for example, when outputting the local feature of the 50 dimension, the dimension selecting unit 1115 can output a 2nd row component 1172 shown in FIG. 11F in the order (left to right) shown in FIG. 11F in addition to the 1st row shown in FIG. 11F.

In the example shown in FIG. 11F, local feature have a hierarchical structure. In other words, for example, with the 25-dimensional local feature and the 150-dimensional local feature, an arrangement of the components 1171 to 1176 of the local feature of the first 25 dimensions is the same. In this manner, by hierarchically (progressively) selecting dimensions, the dimension selecting unit 1115 can extract and output a local feature of an arbitrary number of dimensions or, in other words, a local feature with an arbitrary size in accordance with an application, communication capacity, terminal specifications, or the like. In addition, as a result of the dimension selecting unit 1115 hierarchically selecting dimensions and sorting and outputting the dimensions based on priority, images can be collated using local feature with different numbers of dimensions. For example, when images are collated using the 75-dimensional local feature and the 50-dimensional local feature, a distance between local feature can be calculated using only the first 50 dimensions.

Moreover, the priorities shown in the matrix 1141 in FIG. 11D to FIG. 11F are simply examples and an order applied when selecting dimensions is not limited thereto. For example, as the order of blocks, orders represented by the matrix 1142 in FIG. 11D or the matrix 1143 in FIG. 11D may be adopted in addition to the example of the matrix 1141 in FIG. 11D. In addition, for example, a priority may be set so that dimensions are evenly selected from all sub areas. Alternatively, by placing importance on a vicinity of a center of the local area, a priority may be set so that sub areas near the center have a higher selection frequency. Furthermore, for example, information representing a selection order of dimensions may be defined in a program or may be stored in a table or the like (a selection order storing unit) that is referenced upon execution of a program.

Alternatively, the dimension selecting unit 1115 may select dimensions by selecting every other sub area block. In other words, the 6 dimension is selected for one sub area while the 0 dimension is selected for another sub area near the one sub area. Even in such cases, it can be said that a dimension is selected for each sub area so that a correlation between nearby sub areas is reduced.

In addition, a shape of a local area or a sub area is not limited to a square and may be an arbitrary shape. For example, the local area acquiring unit 1112 may be configured to acquire a circular local area. In this case, for example, the sub area dividing unit 413 can concentrically divide the circular local area into 9 or 17 sub areas having a plurality of local areas. Even in this case, the dimension selecting unit 1115 can select a dimension for each sub area.

As described above and as shown in FIGS. 11B to 11F, with the local feature generating unit 702 according to the present embodiment, dimensions of a generated feature vector are hierarchically selected while maintaining an amount of information of a local feature. Due to this process, real-time object recognition and displaying of a recognition result can be performed while maintaining recognition accuracy. Moreover, the configuration and processes of the local feature generating unit 702 are not limited to those in the present example. It is obvious that other processes that enable real-time object recognition and displaying of a recognition result to be performed while maintaining recognition accuracy can also be applied.

(Encoding Unit)

Figure 11G:
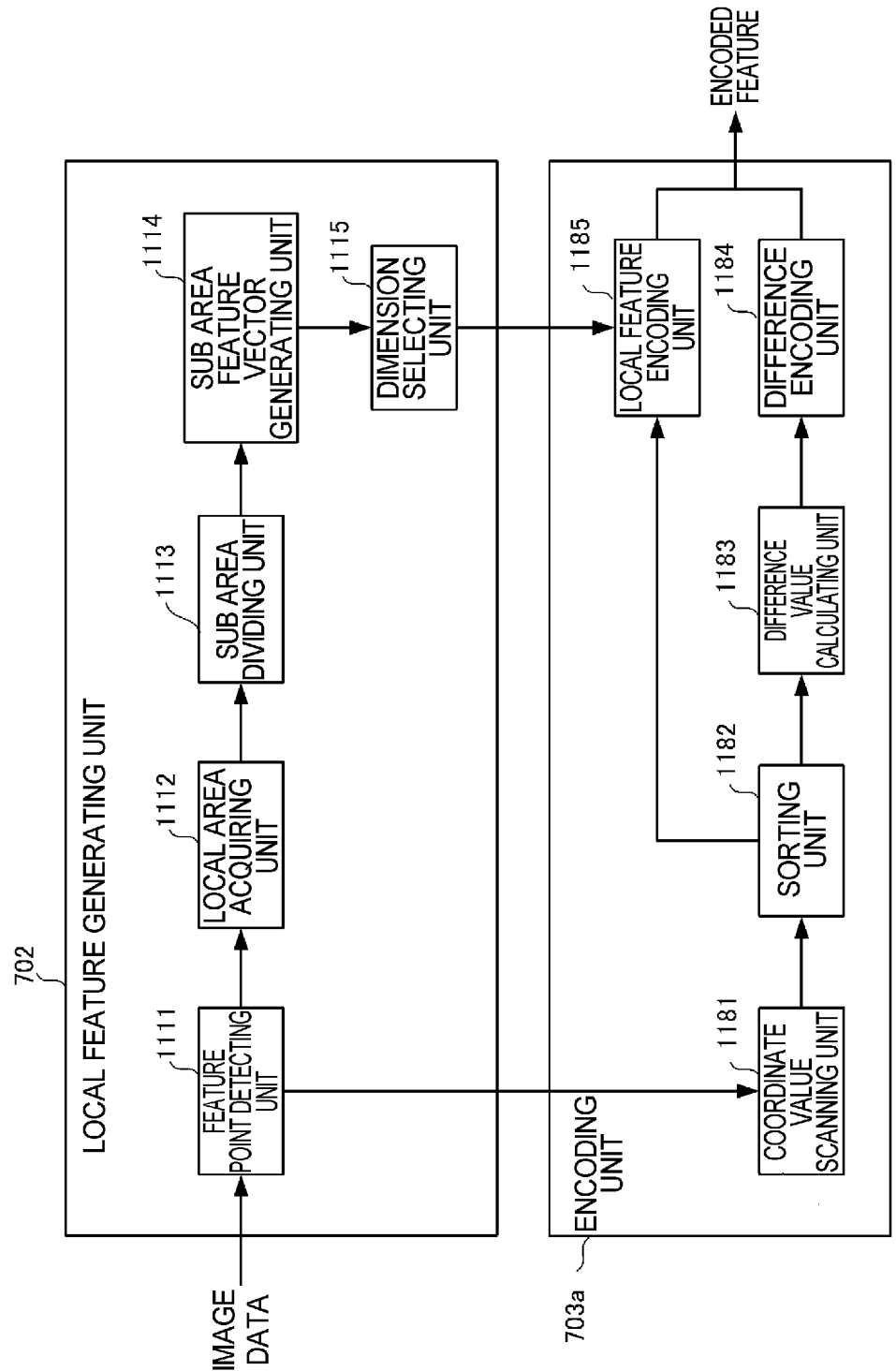
FIG. 11G is a diagram showing a configuration of an encoding unit according to the second embodiment of the present invention.

FIG. 11G is a block diagram showing the encoding unit 703a according to the present embodiment. Moreover, an encoding unit is not limited to the present example and other encoding processes can also be applied.

The encoding unit 703a includes a coordinate value scanning unit 1181 to which a coordinate of a feature point is inputted from the feature point detecting unit 1111 of the local feature generating unit 702 and which scans a coordinate value. The coordinate value scanning unit 1181 scans an image according to a specific scanning method and converts a two-dimensional coordinate value (X coordinate value and Y coordinate value) of a feature point into a one-dimensional index value. The index value represents a scanning distance from an origin of scanning. There are no limitations on scanning directions.

In addition, the encoding unit 703a includes a sorting unit 1182 which sorts index values of feature points and outputs information on a sorted permutation. In this case, for example, the sorting unit 1182 performs sorting in an ascending order. Alternatively, the sorting unit 1182 may perform sorting in a descending order.

Furthermore, the encoding unit 703a includes a difference value calculating unit 1183 which calculates a difference value between two adjacent index values among the sorted index values and outputs a series of difference values.

In addition, the encoding unit 703a includes a difference encoding unit 1184 that encodes a series of difference values in a series order. For example, the encoding performed on the series of difference values may be fixed bit length encoding. When encoding with a fixed bit length, the bit length may be defined in advance. However, doing so requires the number of bits necessary for expressing a largest possible difference value and therefore prevents encoding sizes from being reduced. In consideration thereof, when encoding with a fixed bit length, the difference encoding unit 1184 is capable of determining a bit length based on a series of inputted difference values. Specifically, for example, the difference encoding unit 1184 can calculate a maximum difference value from an inputted difference value series, calculate the number of bits necessary for representing (the number of representation bits of) the maximum value, and encode the difference value series using the calculated number of representation bits.

On the other hand, the encoding unit 703a includes a local feature encoding unit 1185 that encodes a local feature of a corresponding feature point with a same permutation as the sorted index values of the feature points. By encoding with the same permutation as the sorted index values, coordinate values encoded by the difference encoding unit 1184 and corresponding local feature can be associated one to one with each other. In the present embodiment, the local feature encoding unit 1185 can subject a local feature with a dimension selected from local feature of 150 dimensions corresponding to one feature point to, for example, encoding with the bytes representing the number of dimensions so that 1 dimension is encoded by 1 byte.

(Merchandise Recognizing Unit)

Figure 11H:
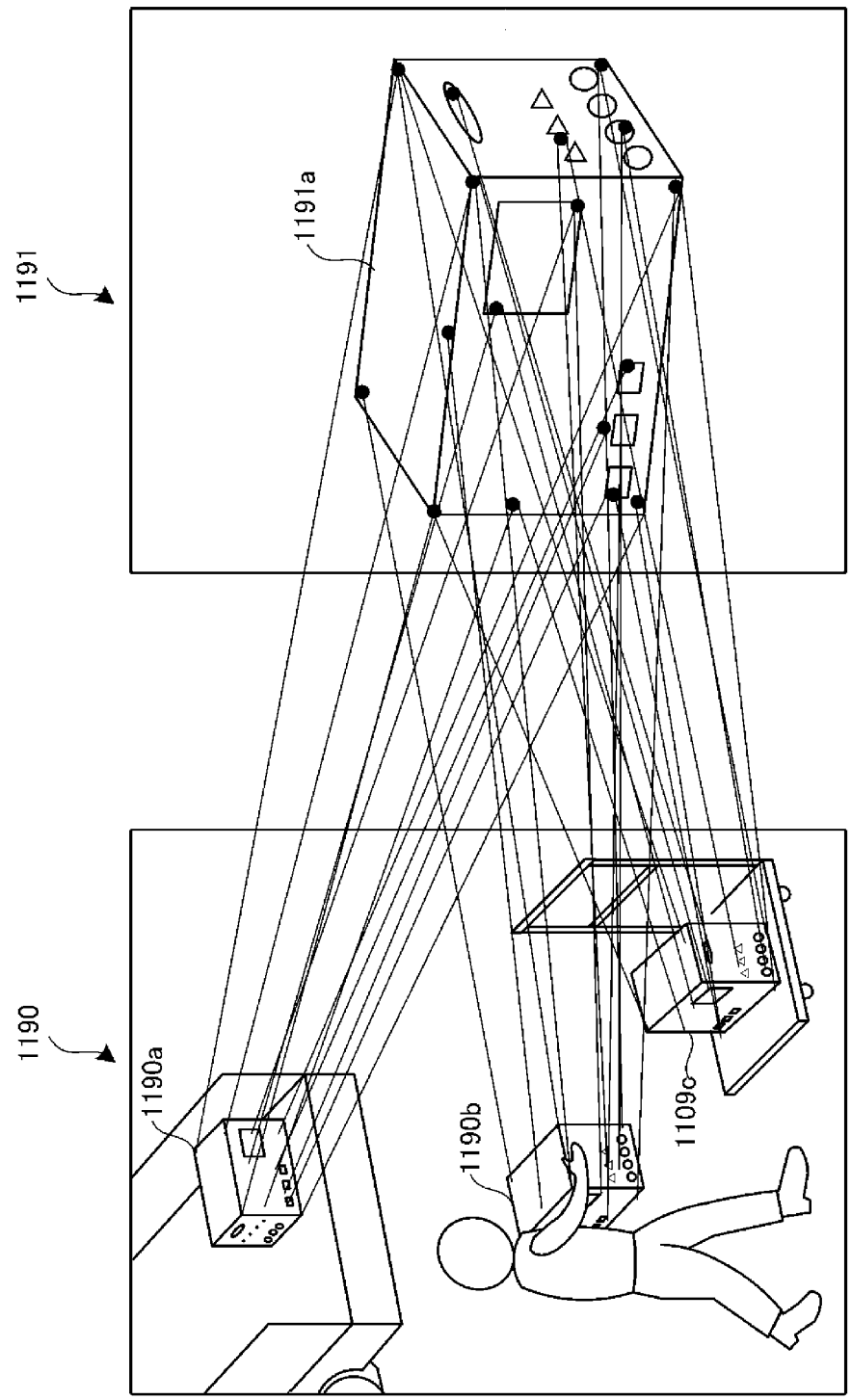
FIG. 11H is a diagram showing processes performed by a merchandise recognizing unit during a shipping process and a warehousing process according to the second embodiment of the present invention.
Figure 11J:
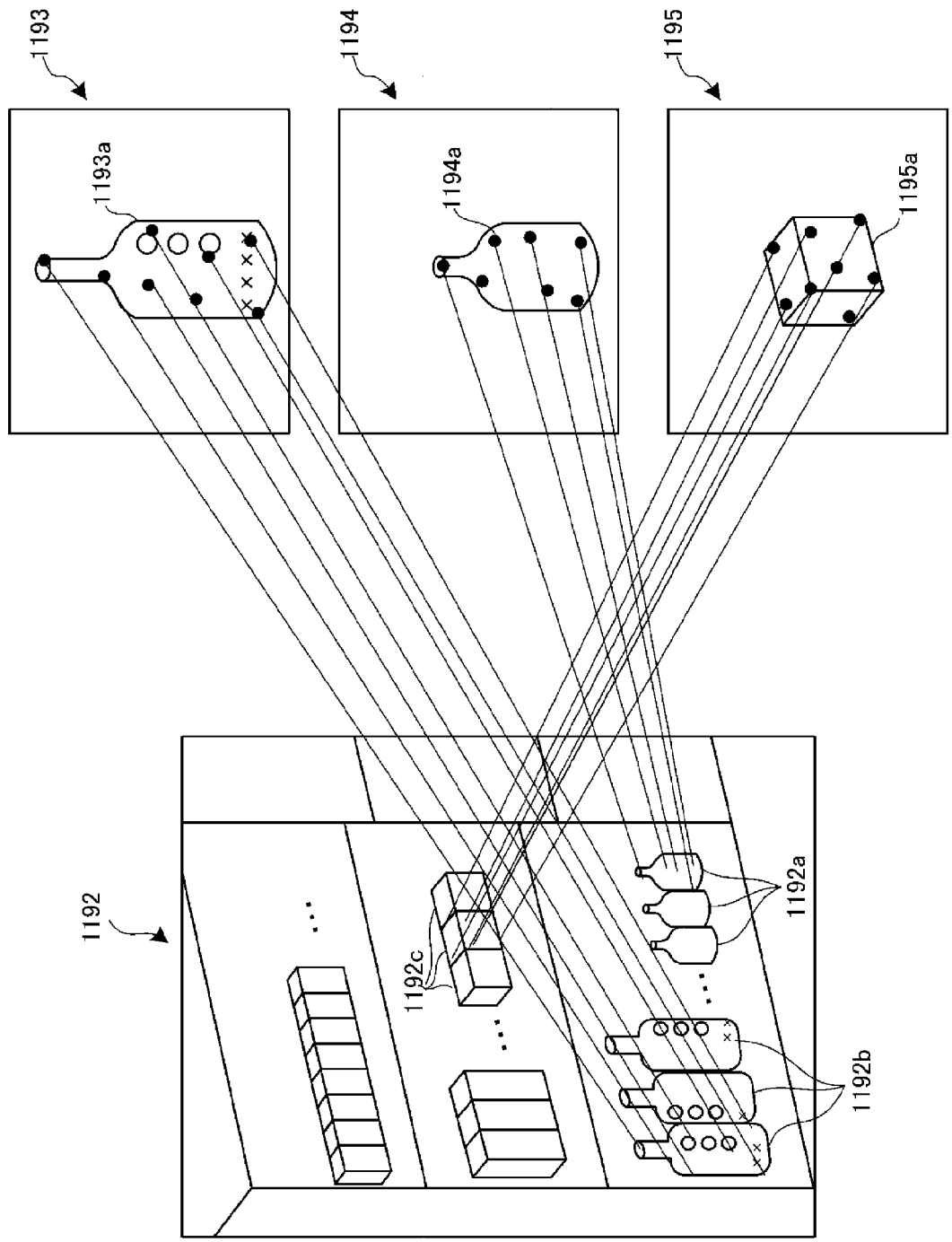
FIG. 11J is a diagram showing processes performed by the merchandise recognizing unit during inventory and shelf allocation according to the second embodiment of the present invention.
Figure 11K:
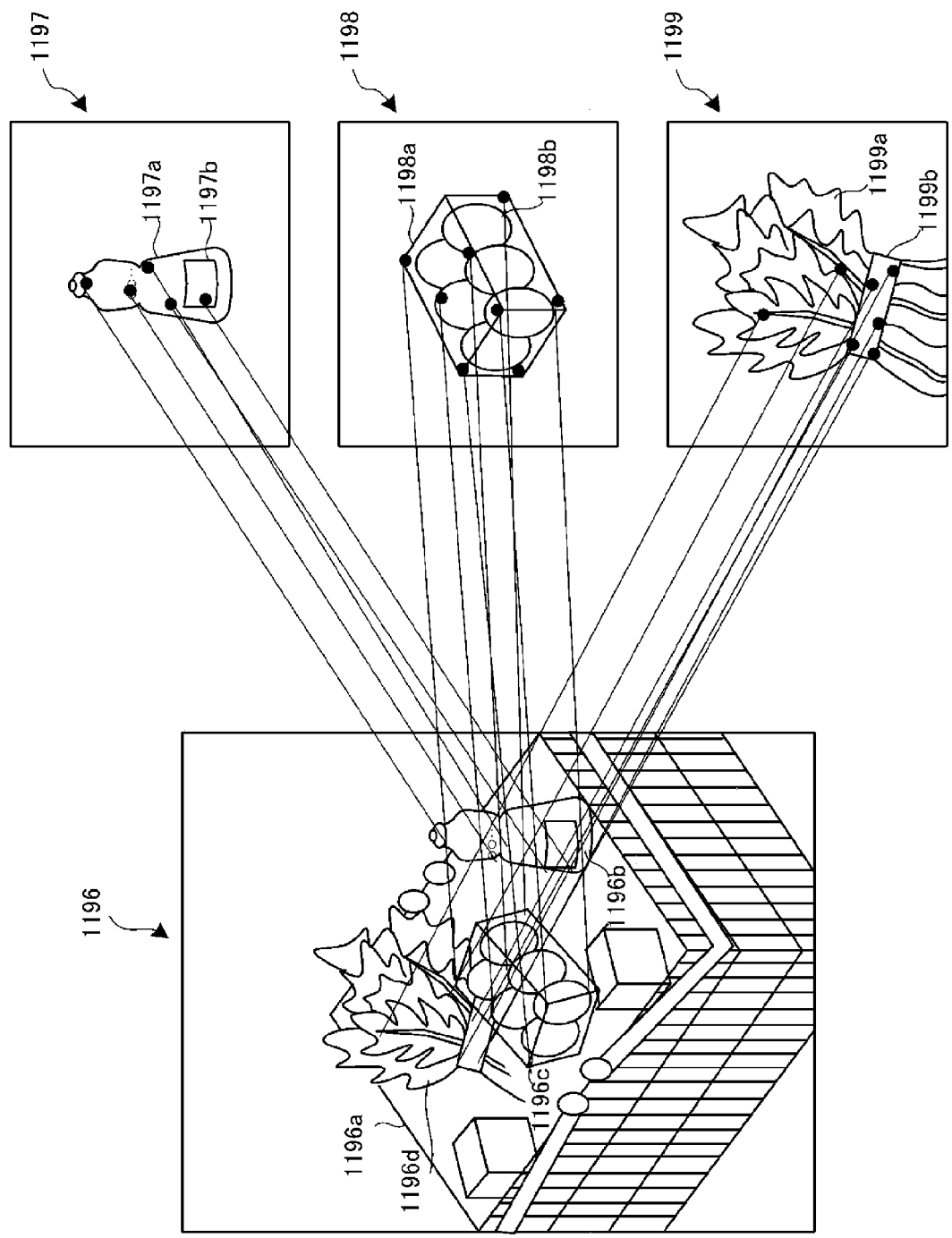
FIG. 11K is a diagram showing processes performed by the merchandise recognizing unit during register processing according to the second embodiment of the present invention.

FIGS. 11H, 11J, and 11K are diagrams showing processes performed by the merchandise recognizing units 803, 913, and 933 according to the present embodiment.

FIG. 11H is a diagram showing processes performed by the merchandise recognizing unit 803 during the shipping process 210 and the warehousing process 220 shown in FIG. 2. A local feature 1191 which is shown in FIG. 11H and which is generated in advance according to the present embodiment from a case 1191a such as a cardboard box that is a piece of shipped and warehoused merchandise is stored in the local feature DB 310. Meanwhile, local feature are generated according to the present embodiment from a video screen 1190 captured by a communication terminal shown in a left diagram in FIG. 11H. Subsequently, the local feature 1191 stored in the local feature DB 310 is collated to determine whether the local feature 1191 is included in the local feature generated from the video screen 1190.

As shown in FIG. 11H, the merchandise recognizing unit 803 associates each feature point at which the local feature stored in the local feature DB 310 and the local feature match as depicted by the fine lines. Moreover, the merchandise recognizing unit 803 determines a match of a feature point when a prescribed proportion or more of the local feature are consistent. Subsequently, the merchandise recognizing unit 803 recognizes a piece of object merchandise when a positional relationship between sets of feature points associated with each other is a linear relationship. Such recognition can be performed even in cases of different sizes or orientations (different viewpoints) or in cases of inversion or the like. In addition, since recognition accuracy is obtained as long as there are a prescribed number or more of associated feature points, merchandise can be recognized even if a part of the merchandise is hidden from view.

In FIG. 11H, three pieces of merchandise 1190a, 1190b, and 1190c with different orientations are recognized as a same piece of merchandise (a packing container or a case) from the single local feature 1191 in the local feature DB 310.

FIG. 11J is a diagram showing a process performed by the merchandise recognizing unit 933 during the inventory process 230 (shelf allocating process) shown in FIG. 2. Local feature 1193, 1194, and 1195 generated in advance according to the present embodiment from merchandise (in the present example, a large PET bottle merchandise 1193a, a small PET bottle merchandise 1194a, and a small paper carton merchandise 1195a) shown in FIG. 11J are stored in the local feature DB 510. Meanwhile, local feature are generated according to the present embodiment from a video screen 1192 captured by a communication terminal shown in a left diagram in FIG. 11J. Subsequently, each local feature stored in the local feature DB 510 is collated to determine whether the local feature is included in the local feature generated from the video screen 1192.

As shown in FIG. 11J, the merchandise recognizing unit 933 associates each feature point at which the local feature 1193 to 1195 stored in the local feature DB 510 and the local feature match as depicted by the fine lines. Moreover, a match of a feature point is determined when a prescribed proportion or more of the local feature are consistent. Subsequently, a recognition object is recognized when a positional relationship between associated feature points is a linear relationship. In this case, matching conditions of local feature and conditions of the number of feature points set for the recognition may be the same as those in FIG. 11H or different conditions may be set since recognition objects differ.

In FIG. 11J, three pieces of merchandise 1192a, 1192b, and 1192c which differ from one another and which are displayed on a shelf are individually recognized from the three local feature 1193 to 1195 stored in the local feature DB 510. Moreover, in FIG. 11J, only fine lines that respectively connect to one piece of merchandise are shown to illustrate the merchandise recognizing process in an easy-to-understand manner.

FIG. 11K is a diagram showing a process performed by the merchandise recognizing unit 913 during the register processing 240 shown in FIG. 2. Local feature 1197 to 1199 generated in advance according to the present embodiment from merchandise (in the present example, a PET bottle merchandise 1197a to which a label 1197b is attached, eggs 1198b housed in a case 1198a, and spinach 1199a bundled by a piece of identifiable tape 1199b) shown in FIG. 11K are stored in the local feature DB 610. Meanwhile, local feature are generated according to the present embodiment from a video screen 1196 captured by a communication terminal shown in a left diagram in FIG. 11K. Subsequently, each local feature stored in the local feature DB 610 is collated to determine whether the local feature is included in the local feature generated from the video screen 1196.

As shown in FIG. 11K, the merchandise recognizing unit 913 associates each feature point at which the local feature 1197 to 1199 stored in the local feature DB 610 and the local feature match as depicted by the fine lines. Moreover, a match of a feature point is determined when a prescribed proportion or more of the local feature are consistent. Subsequently, a recognition object is recognized when a positional relationship between associated feature points is a linear relationship. At this point, matching conditions of local feature and conditions of the number of feature points set for the recognition may be the same as those in FIGS. 11H and 11J or different conditions may be set since recognition objects differ.

In FIG. 11K, three pieces of merchandise 1196a, 1196b, and 1196c which differ from one another and which are placed in a basket are individually recognized from the three local feature 1197 to 1199 stored in the local feature DB 610.

Moreover, while collation is performed based on feature point coordinates and local feature in the collating processes performed by the merchandise recognizing units 809, 913, and 933 according to the present embodiment, recognition can also be performed solely based on a linear relationship of arrangement orders between local feature generated from a matching recognition object and local feature generated from an image in a video. Furthermore, while the description given in the present embodiment is based on a two-dimensional image, similar processing can be performed using three-dimensional feature point coordinates.

<<Hardware Configuration of Communication Terminal>>

Figure 12A:
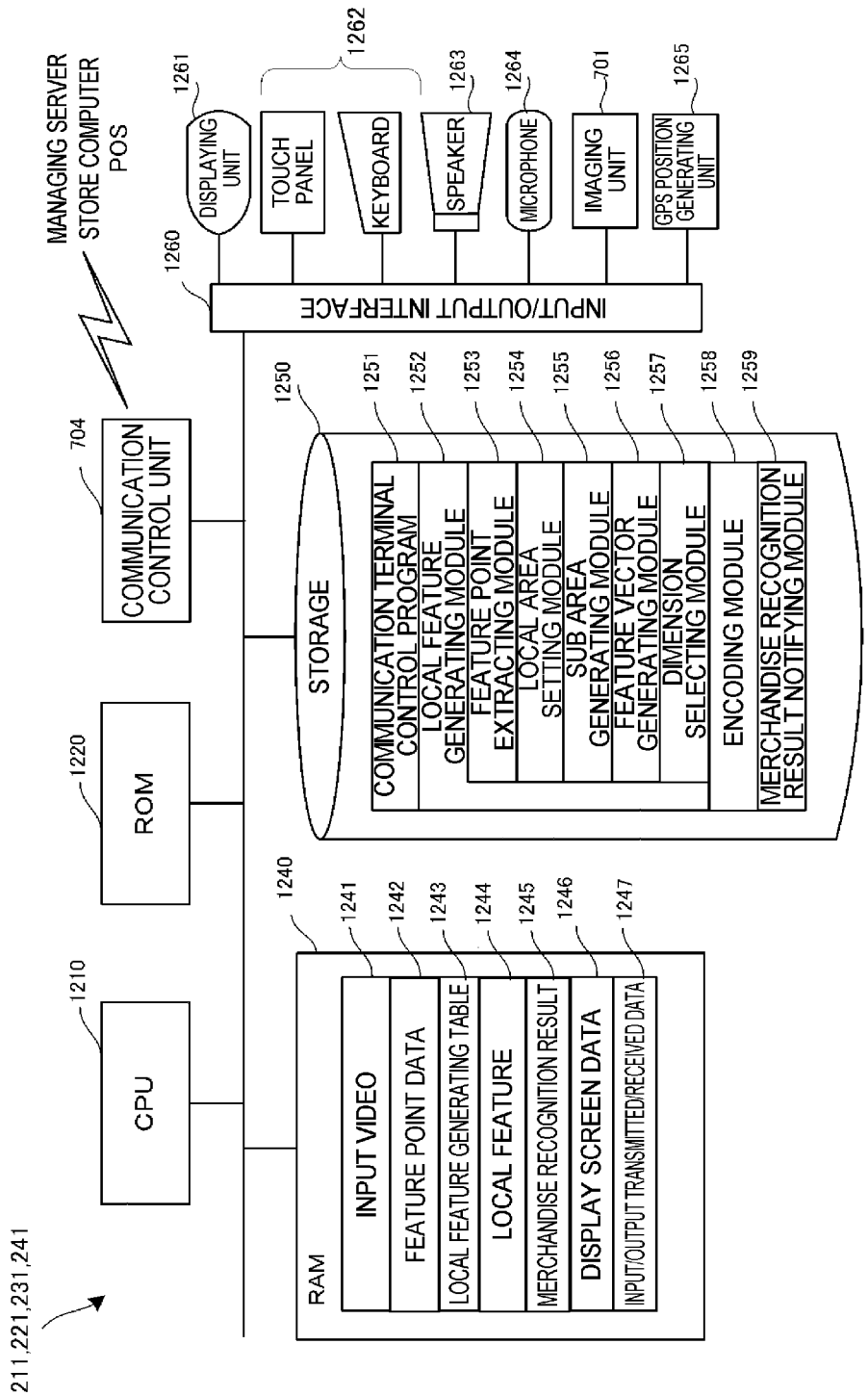
FIG. 12A is a block diagram showing a hardware configuration of a communication terminal according to the second embodiment of the present invention.

FIG. 12A is a block diagram showing a hardware configuration of the communication terminals 211 to 241 according to the present embodiment.

In FIG. 12A, a CPU 1210 is an arithmetic control processor which realizes respective functional components of the communication terminals 211 to 241 by executing a program. A ROM 1220 stores initial data, fixed data of the program and the like, and the program. In addition, the communication control unit 704 is a communication control unit which, in the present embodiment, communicates with other devices via a network. Moreover, the CPU 1210 is not limited to one unit. Alternatively, a plurality of CPUs may be provided or the CPU 1210 may include a GPU (Graphics Processing Unit) for image processing.

A RAM 1240 is a random access memory used by the CPU 1210 as a work area for temporary storage. An area for storing data necessary to realize the present embodiment is secured in the RAM 1240. An input video 1241 represents an input video captured and inputted by the imaging unit 701. Feature point data 1242 represents feature point data which is detected from the input video 1241 and which includes a feature point coordinate, a scale, and an angle. A local feature generating table 1243 represents a local feature generating table that retains data prior to generating a local feature (refer to FIG. 12B). A local feature 1244 represents a local feature which is generated using the local feature generating table 1243 and which is sent via the communication control unit 704 to a transmission destination that performs merchandise recognition. A merchandise recognition result 1245 represents a merchandise recognition result returned from the transmission destination via the communication control unit 704. Display screen data 1246 represents display screen data for notifying information including the merchandise recognition result 1245 to the user. Moreover, when audio output is to be provided, the information may include audio data. Input/output transmitted/received data 1247 represents input/output data that is inputted and outputted via an input/output interface 1260 and transmitted/received data that is transmitted and received via the communication control unit 704.

A storage 1250 stores databases and various parameters as well as the following data and programs necessary for realizing the present embodiment. The storage 1250 stores the following program. A communication terminal control program 1251 represents a communication terminal control program that controls the whole of the present communication terminals 211 to 241. The communication terminal control program 1251 includes the following modules.

A local feature generating module 1252 represents a local feature generating module that generates a local feature according to FIGS. 4B to 4F from an input video in the communication terminal control program 1251. An encoding module 1258 represents an encoding module that encodes the local feature generated by the local feature generating module 1252 for transmission purposes. A merchandise recognition result notifying module 1259 represents a merchandise recognition result notifying module that receives and notifies a merchandise recognition result to the user by display or audio.

The input/output interface 1260 provides an interface with input and output devices with respect to input/output data. A displaying unit 1261, a touch panel or a keyboard that constitutes an operating unit 1262, a speaker 1263, a microphone 1264, and the imaging unit 701 are connected to the input/output interface 1260. Examples of input/output devices are not limited to those mentioned above. In addition, a GPS (Global Positioning System) position generating unit 1265 acquires a current position based on a signal from a GPS satellite.

Moreover, FIG. 12A only shows data and a program essential to the present embodiment and does not illustrate data and programs unrelated to the present embodiment.

(Local Feature Generating Table)

FIG. 12B is a diagram showing the local feature generating table 1243 in the communication terminals 211 to 241 according to the present embodiment.

The local feature generating table 1243 stores, in association with an input image ID 1201, a plurality of detected feature points 1202, feature point coordinates 1203, and local area information 1204 corresponding to the feature points. In addition, a plurality of sub area IDs 1205, sub area information 1206, a feature vector 1207 corresponding to each sub area, and a selected dimension 1208 including a priority is stored in association with each detected feature point 1202, each feature point coordinate 1203, and each piece of local area information 1204.

A local feature 1209 generated with respect to each detected feature point 1202 from the data described above is stored.

<<Processing Procedure of Communication Terminal>>

FIG. 13 is a flow chart showing a processing procedure of the communication terminals 211 to 241 according to the present embodiment. The flow chart is executed by the CPU 1210 using the RAM 1240, both shown in FIG. 12A, to realize the respective functional components shown in FIG. 7.

First, in step S1311, a determination is made regarding whether or not a video has been inputted to perform merchandise recognition. In addition, in step S1321, data reception is determined. When neither determination is positive, other processes are performed in step S1231. Moreover, a description of an ordinary transmission process will be omitted.

Figure 14A:
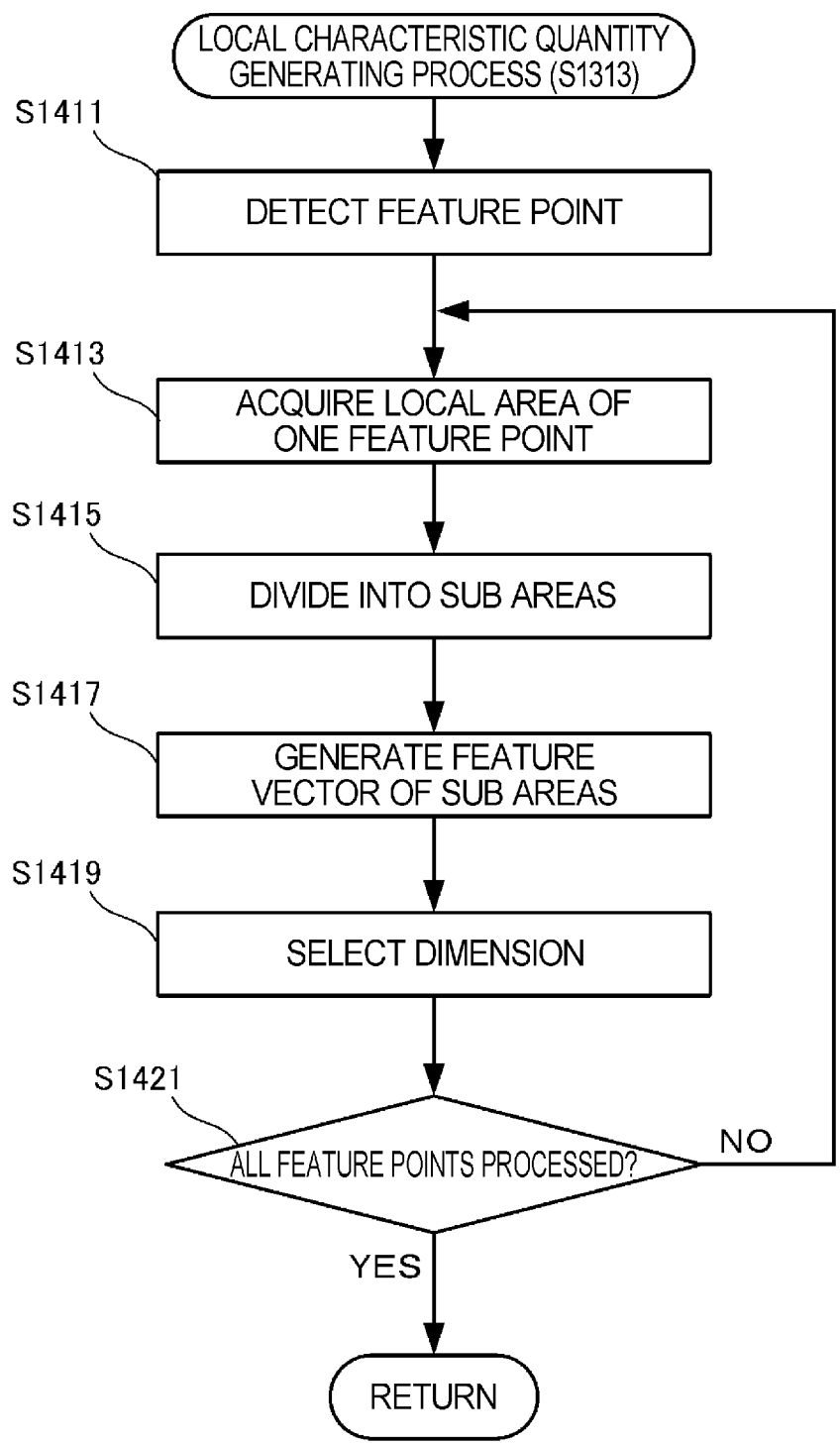
FIG. 14A is a flow chart showing a processing procedure of a local feature generating process according to the second embodiment of the present invention.

When a video has been inputted, processing proceeds to step S1313 to execute a local feature generating process from the input video (refer to FIG. 14A). Next, in step S1315, a local feature and a feature point coordinate are encoded (refer to FIGS. 14B and 14C). In step S1317, the encoded data is transmitted to a managing computer.

When data has been received, processing proceeds to step S1323 to determine whether or not a merchandise recognition result has been received from a collating server. When a merchandise recognition result has been received, processing proceeds to step S1325 to notify the received merchandise recognition result.

(Local Feature Generating Process)

FIG. 14A is a flow chart showing a processing procedure of the local feature generating process S1313 according to the present embodiment.

First, in step S1411, a position coordinate, a scale, and an angle of feature points are detected from an input video. In step S1413, a local area is acquired with respect to one of the feature points detected in step S1411. Next, in step S1415, the local area is divided into sub areas. In step S1417, feature vectors of each sub area are generated to generate a feature vector of the local area. Processes of steps S1411 to S1417 are illustrated in FIG. 11B.

Next, in step S1419, dimension selection is executed with respect to the feature vector of the local area generated in step S1417. Dimension selection is illustrated in FIGS. 11D to 11F.

In step S1421, a determination is made regarding whether or not local feature generation and dimension selection have been completed with respect to all feature points detected in step S1411. If not, a return is made to step S1413 to repeat the processing on a next feature point.

(Encoding Process)

Figure 14B:
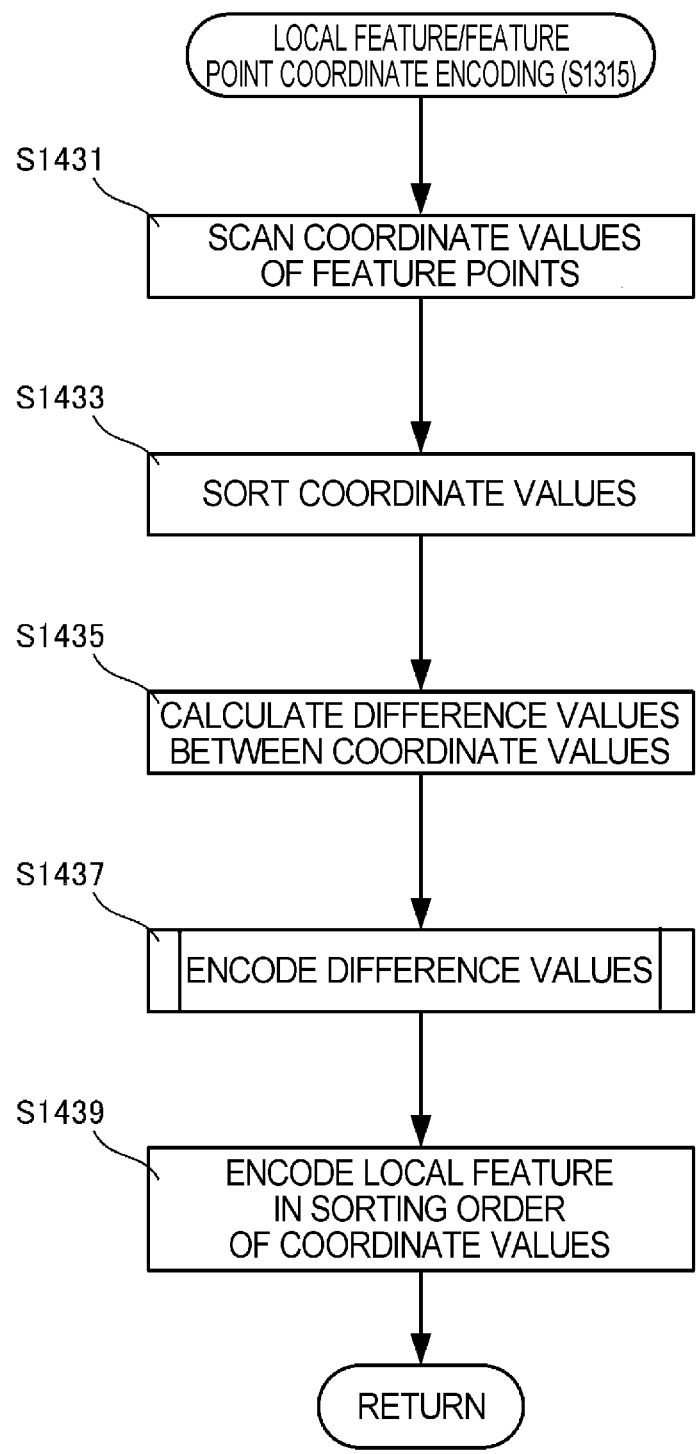
FIG. 14B is a flow chart showing a processing procedure of an encoding process according to the second embodiment of the present invention.

FIG. 14B is a flow chart showing a processing procedure of the encoding process S1315 according to the present embodiment.

First, in step S1431, coordinate values of feature points are scanned in a desired order. Next, in step S1433, the scanned coordinate values are sorted. In step S1435, difference values of the coordinate values are calculated in the sorted order. In step S1437, the difference values are encoded (refer to FIG. 14). Subsequently, in step S1439, local feature are encoded in the sorting order of the coordinate values. Moreover, the encoding of the difference values and the encoding of the local feature may be performed in parallel.

(Encoding Process of Difference Value)

Figure 14C:
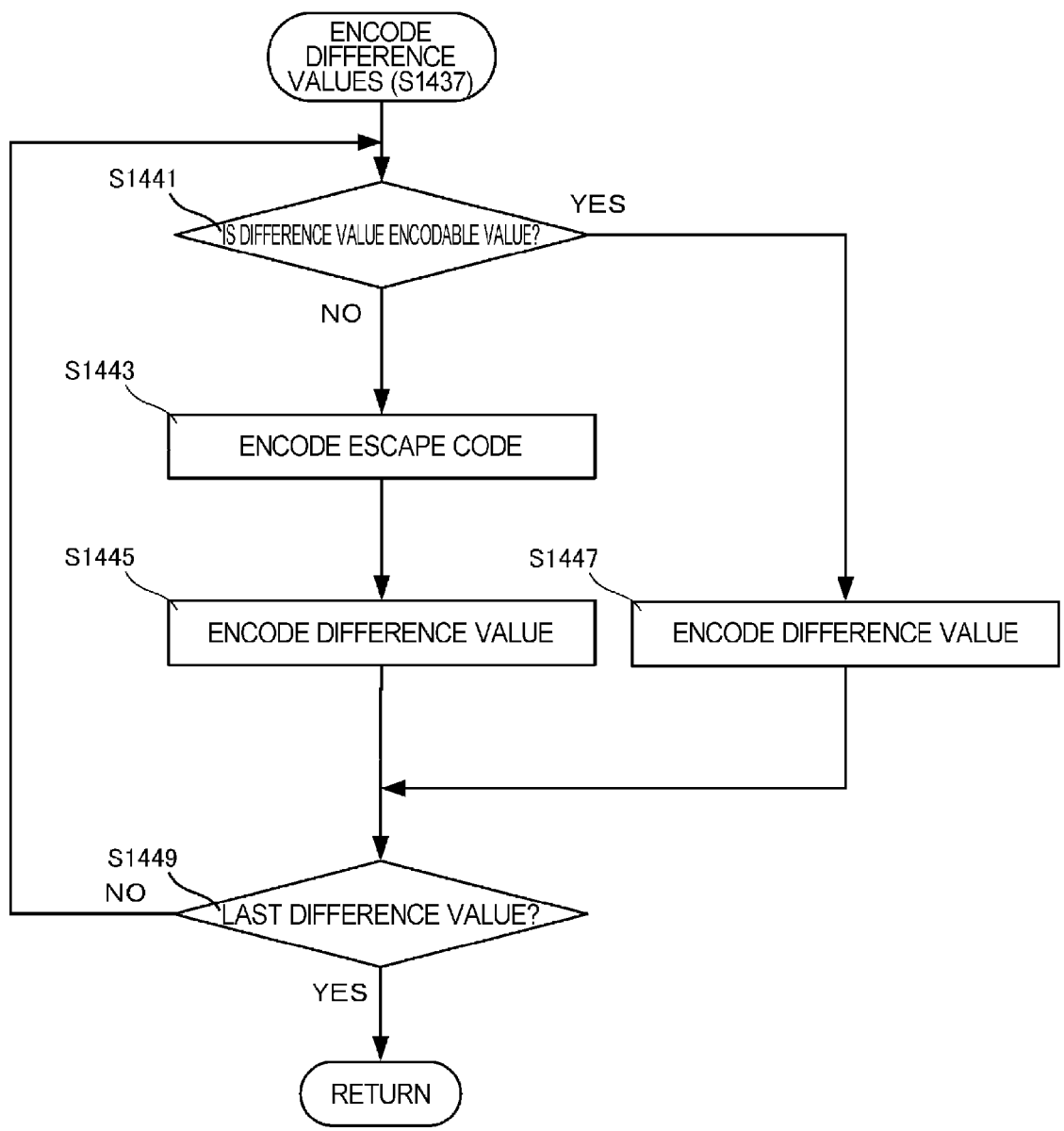
FIG. 14C is a flow chart showing a processing procedure of an encoding process of a difference value according to the second embodiment of the present invention.

FIG. 14C is a flow chart showing a processing procedure of the encoding process S1317 of difference values according to the present embodiment.

First, in step S1441, a determination is made regarding whether or not a difference value is in an encodable range. If within an encodable range, processing proceeds to step S1447 to encode the difference value. Subsequently, a transition is made to step S1449. If not within an encodable range (out of range), processing proceeds to step S1443 to encode an escape code. Subsequently, in step S1445, a difference value is encoded using a different encoding method from the encoding performed in step S1447. Subsequently, a transition is made to step S1449. In step S1449, a determination is made regarding whether or not the processed difference value is a last component in a series of difference values. If so, the processing ends. If not, a return is once again made to step S1441 to execute processing on a next difference value in the series of difference values.

<<Hardware Configuration of Managing Computer>>

Figure 15A:
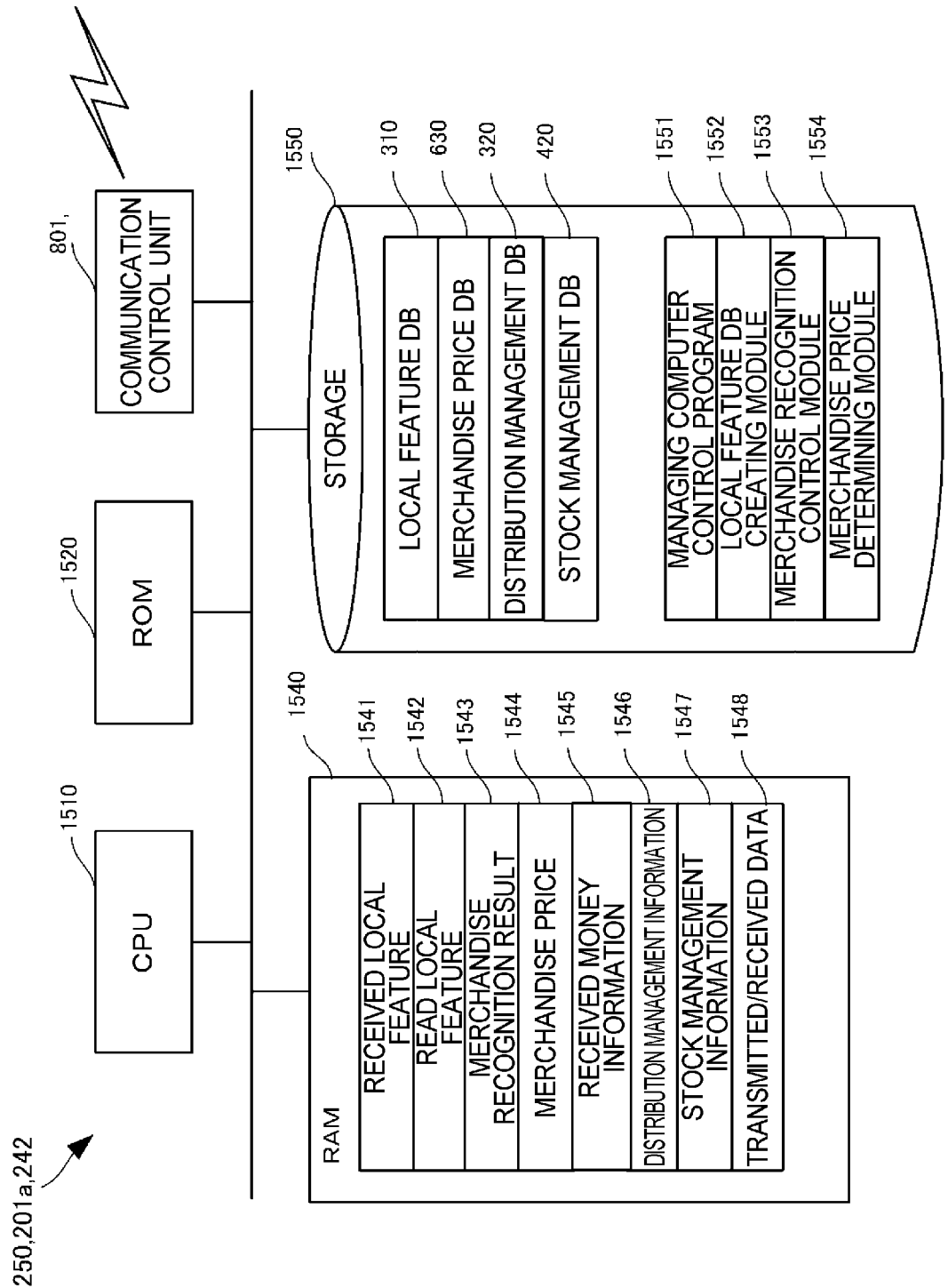
FIG. 15A is a block diagram showing a hardware configuration of a managing computer according to the second embodiment of the present invention.

FIG. 15A is a block diagram showing a hardware configuration of a managing computer according to the present embodiment. Moreover, it should be mentioned that common components and unique components are illustrated in a mixed state in FIG. 15A. The managing server 250 is to represent the common components.

In FIG. 15A, a CPU 1510 is an arithmetic control processor which realizes respective functional components of a video processing device 1620 that is a collating server by executing a program. A ROM 1520 stores initial data, fixed data of the program and the like, and the program. In addition, the communication control unit 801 is a communication control unit which, in the present embodiment, communicates with other devices via a network. Moreover, the CPU 1510 is not limited to one unit. Alternatively, a plurality of CPUs may be provided or the CPU 1510 may include a GPU for image processing.

A RAM 1540 is a random access memory used by the CPU 1510 as a work area for temporary storage. An area for storing data necessary to realize the present embodiment is secured in the RAM 1540. A received local feature 1441 represents a local feature including a feature point coordinate received from a communication terminal. A read local feature 1542 represents a local feature which is read out from the local feature DB 310 and which includes a feature point coordinate. A merchandise collation result 1543 represents a merchandise collation result recognized by collating a received local feature with a local feature housed in the local feature DB 310. A merchandise price 1544 represents a merchandise price which is data unique to the POS 242 or the store computer 201a and which is read out from the merchandise price DB 630 based on the merchandise recognition result. Received money information 1545 represents received money information which is data unique to the POS 242 or the store computer 201a and which is information at completion of payment by the user. Distribution management information 1546 represents distribution management information which is data unique to the managing server 250 and which is accumulated in the distribution management DB 320. Stock management information 1547 represents stock management information which is data unique to the managing server 250 and the store computer 201a and which is based on the stock management DB 420. Transmitted/received data 1548 represents transmitted/received data that is transmitted and received via the communication control unit 801.

A storage 1550 stores databases and various parameters as well as the following data and programs necessary for realizing the present embodiment. The local feature DB 310 represents a local feature DB similar to that shown in FIG. 10. The merchandise price DB 630 is a DB which is unique to the POS 242 or the store computer 201a and which stores merchandise prices (refer to FIG. 15B). The distribution management DB 320 is a DB which is unique to the managing server 250 and which stores information regarding merchandise distribution (for example, the shipping and warehousing shown in FIG. 2). The stock management DB 420 is a DB which is unique to the managing server 250 and the store computer 201a and which stores stock management information.

The storage 1550 stores the following program. A managing computer control program 1551 represents a managing computer control program that controls the whole of the present managing computer. A local feature DB generating module 1552 represents a local feature DB generating module that generates a local feature from an image of a recognized part and stores the local feature in a local feature DB in the managing computer control program 1551. A merchandise recognition control module 1553 represents a merchandise recognition control module that collates a received local feature with a local feature stored in the local feature DB 310 and recognizes merchandise in the managing computer control program 1551. A merchandise price determining module 1554 represents a merchandise price determining module which is unique to the POS 242 or the store computer 201a and which determines a price based on the merchandise recognized from the recognized local feature.

Figure 23:
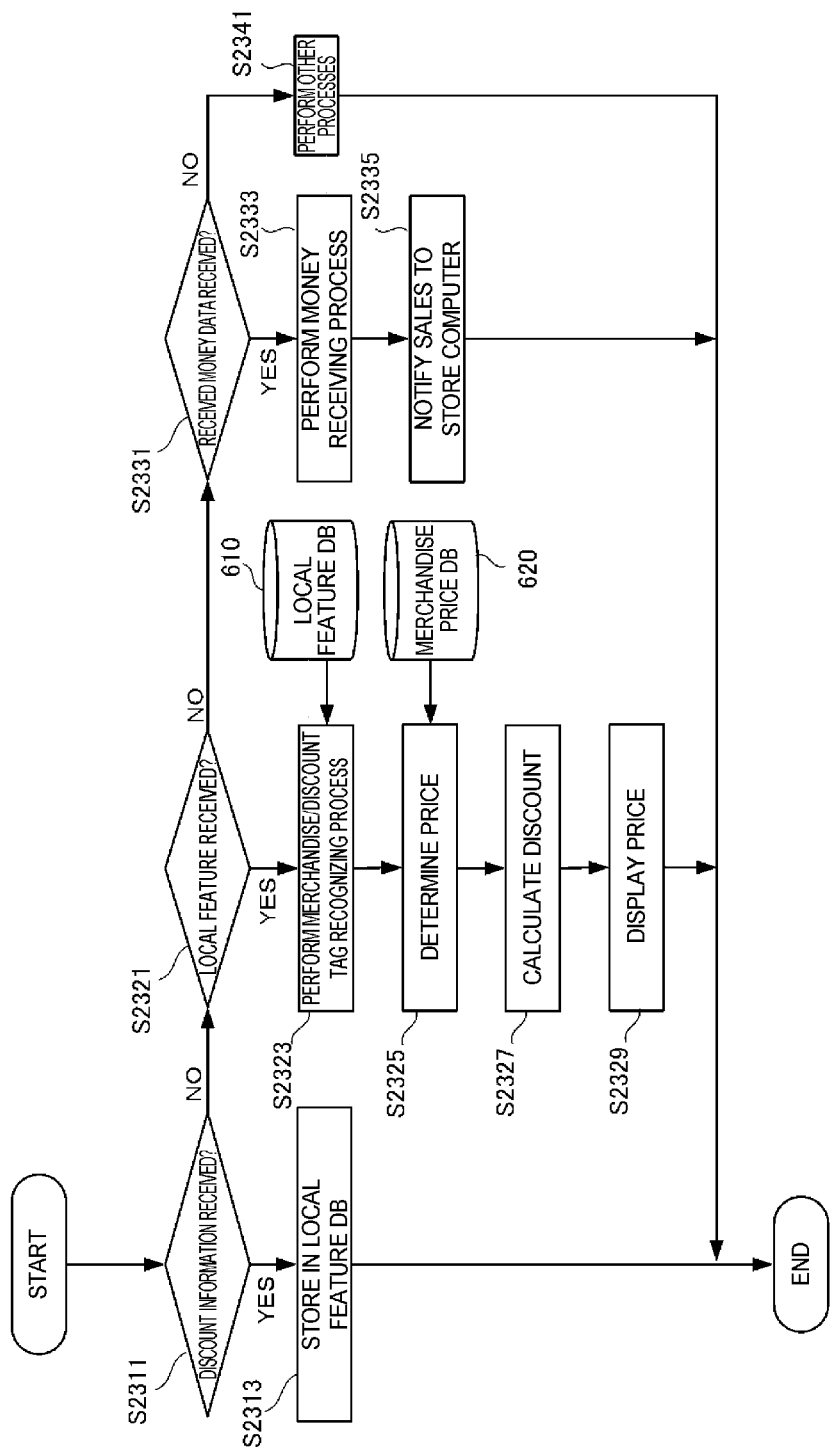
FIG. 23 is a flow chart showing a processing procedure of a POS according to the third embodiment of the present invention.

Moreover, FIG. 23 only shows data and a program essential to the present embodiment and does not illustrate data and programs unrelated to the present embodiment.

(Merchandise Price DB)

FIG. 15B is a diagram showing a configuration of the merchandise price DB 630 according to the present embodiment.

The merchandise price DB 630 stores a merchandise price in association with a merchandise ID and a merchandise name/type.

<<Processing Procedure of Managing Computer>>

FIG. 16 is a flow chart showing a processing procedure of the managing computers 250, 201a, and 242 according to the present embodiment. The flow chart is executed by the CPU 1510 using the RAM 1540, both shown in FIG. 15A, to realize the respective functional components shown in FIG. 8, FIG. 9A, or FIG. 9B.

First, in step S1611, a determination is made regarding whether or not a local feature DB is to be generated. In addition, in step S1621, a determination is made regarding whether or not a local feature is to be received from a communication terminal. When neither determination is positive, other processes are performed in step S1631.

Figure 17:
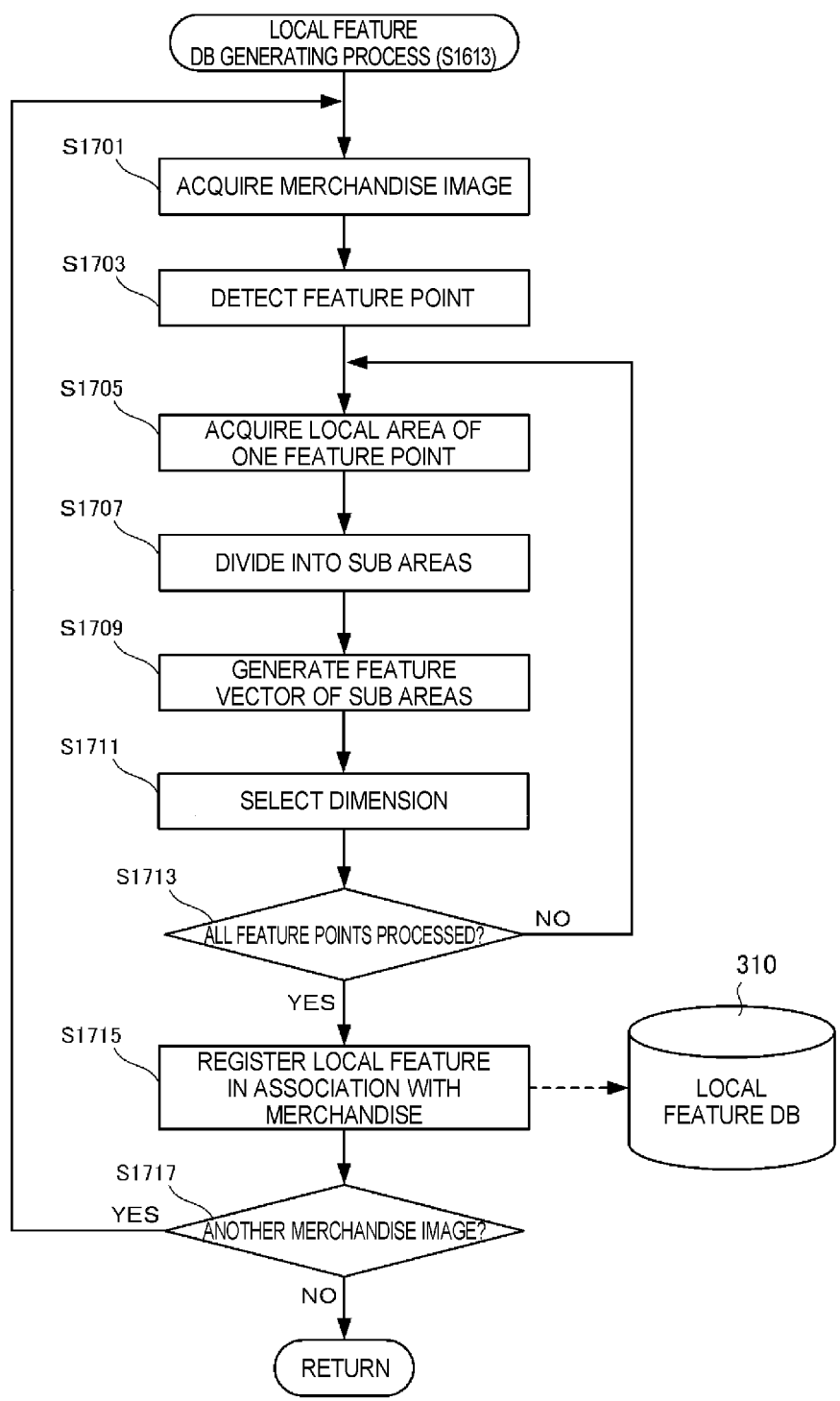
FIG. 17 is a flow chart showing a processing procedure of a local feature DB generating process according to the second embodiment of the present invention.

When a local feature DB is to be generated, processing proceeds to step S1613 to execute a local feature DB generating process (refer to FIG. 17). On the other hand, when a local feature is to be received, processing proceeds to step S1623 to perform a merchandise recognizing process (refer to FIGS. 18A and 18B). Next, in step S1625, a recognition object/link information acquiring process is executed (refer to FIG. 26B). Subsequently, in step S1625, a price determining process that is a step unique to the POS 242 or the store computer 201a is performed. In addition, in step S1627, a merchandise distributing process including a distribution managing process and a stock managing process is performed (refer to FIG. 19).

(Local Feature DB Generating Process)

FIG. 17 is a flow chart showing a processing procedure of the local feature DB generating process S1613 according to the present embodiment.

First, in step S1701, an image of merchandise is acquired. In step S1703, a position coordinate, a scale, and an angle of feature points are detected. In step S1705, a local area is acquired with respect to one of the feature points detected in step S1703. Next, in step S1707, the local area is divided into sub areas. In step S1709, feature vectors of each sub area are generated to generate a feature vector of the local area. Processes from steps S1705 to S1709 are illustrated in FIG. 11B.

Next, in step S1711, dimension selection is executed with respect to the feature vector of the local area generated in step S1709. Dimension selection is illustrated in FIGS. 11D to 11F. However, while hierarchization in dimension selection is executed when generating the local feature DB 310, all of the generated feature vectors are desirably stored.

In step S1713, a determination is made regarding whether or not local feature generation and dimension selection have been completed with respect to all feature points detected in step S2613. If not, a return is made to step S1705 to repeat the processing on a next feature point. If local feature generation and dimension selection have been completed with respect to all feature points, processing proceeds to step S1715 to register a local feature and a feature point coordinate in the local feature DB 310 in association with a piece of recognized merchandise.

In step S1717, a determination is made regarding whether or not there are other pieces of merchandise. When there are other pieces of merchandise, a return is made to step S1701 to acquire an image of a recognition object and repeat the processing.

(Merchandise Recognizing Process)

Figure 18A:
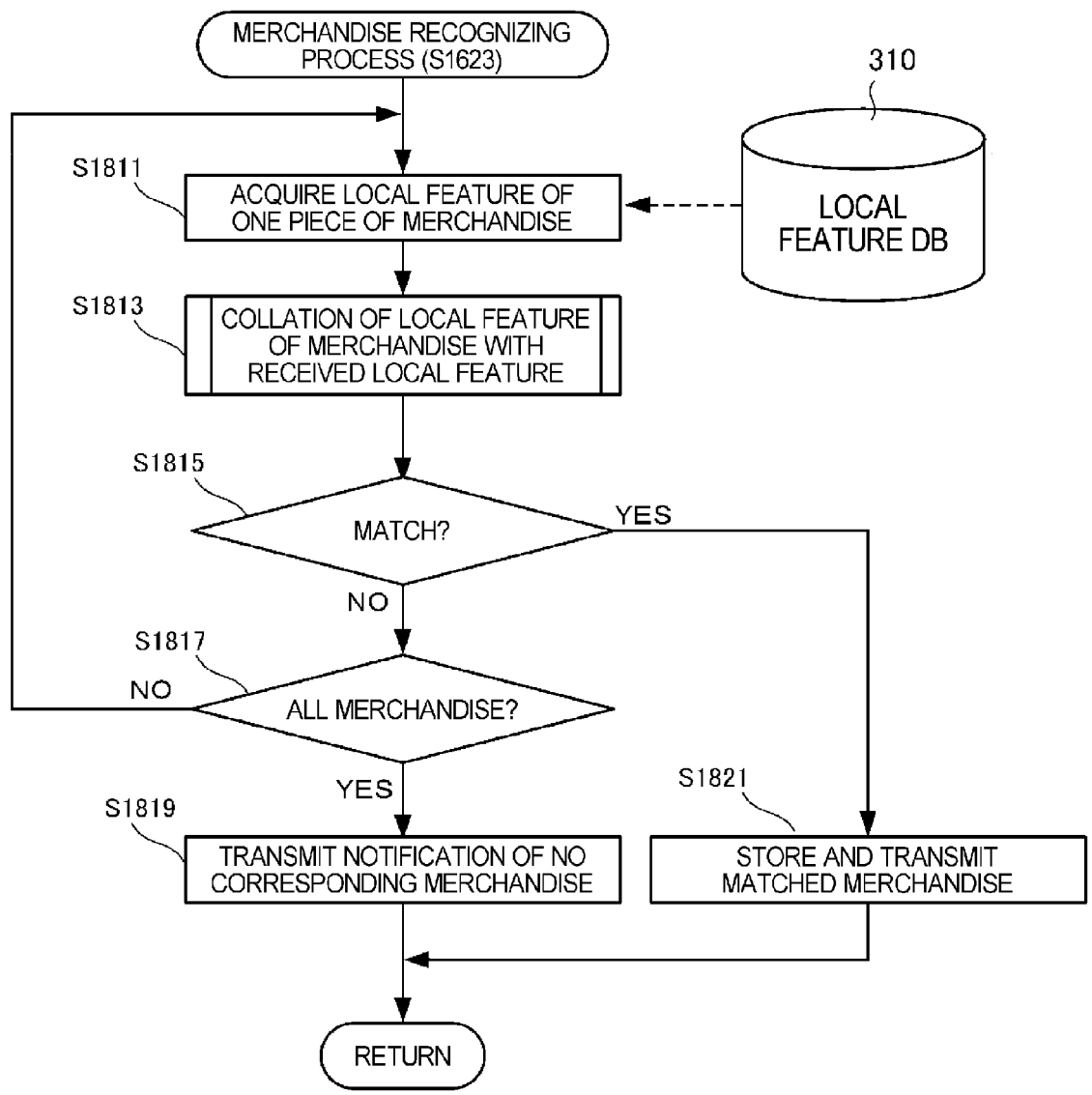
FIG. 18A is a flow chart showing a processing procedure of a merchandise recognizing process according to the second embodiment of the present invention.

FIG. 18A is a flow chart showing a processing procedure of the merchandise recognizing process S1623 according to the present embodiment.

First, in step S1811, a local feature of one recognition object is acquired from the local feature DB 310. Subsequently, in step S1813, a local feature of a piece of merchandise is collated with a local feature received from a communication terminal (refer to FIG. 18B).

In step S1815, a determination is made regarding whether or not the local feature match. If so, processing proceeds to step S1821 to store and transmit a name of the matching merchandise to the communication terminal.

In step S1817, a determination is made regarding whether or not all pieces of merchandise have been collated, and if an uncollated piece of merchandise remains, a return is made to step S1811 to repeat collation on a next piece of merchandise. Alternatively, the collation may be performed by limiting fields in advance.

(Collating Process)

Figure 18B:
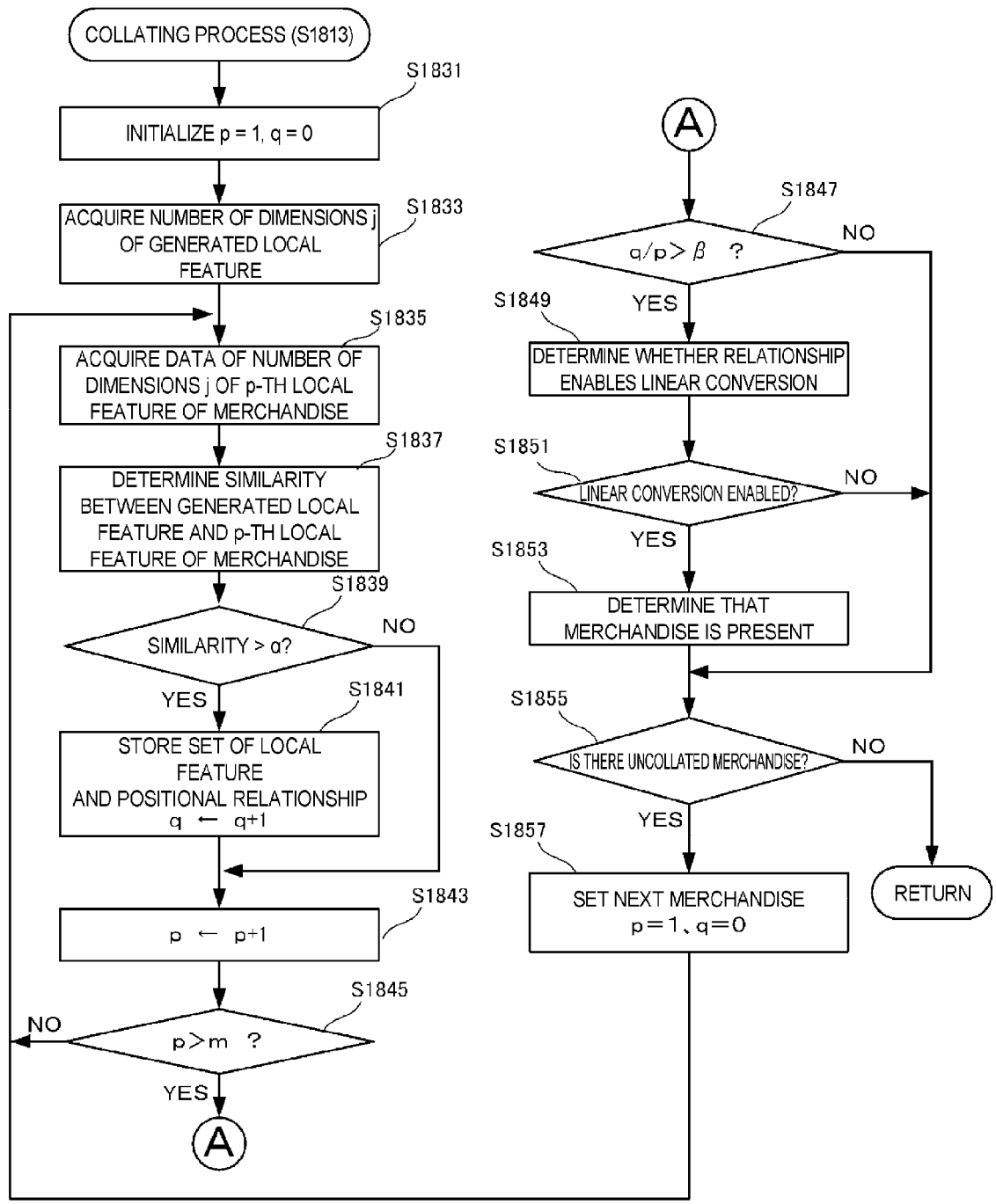
FIG. 18B is a flow chart showing a processing procedure of a collating process according to the second embodiment of the present invention.

FIG. 18B is a flow chart showing a processing procedure of the collating process S1813 according to the present embodiment.

First, in step S1831, parameters p=1 and q=0 are set as initialization. Next, in step S1833, the number of dimensions j of local feature generated in step S1831 is acquired.

In a loop including steps S1835 to S1845, collation of each local feature is repeated until p>m (where m=the number of feature points of a piece of merchandise) is satisfied. First, in step S1835, data of j-number of dimensions of a p-th local feature of a piece of merchandise stored in the local feature DB 310 is acquired. In other words, a first 1 to j dimensions are acquired. Next, in step S1837, the p-th local feature acquired in step S1835 and local feature of all feature points generated from an input video are sequentially collated, and a determination of whether the local feature are similar or not is made. In step S1839, a determination is made regarding whether or not a similarity exceeds a threshold a based on a result of the collation between local feature, and when the similarity exceeds the threshold $\alpha$, in step S1841, a set constituted by the local feature and a positional relationship of feature points that match between the input image and the merchandise is stored. In addition, q that is a parameter representing the number of matched feature points is counted up by 1. In step S1843, a feature point of the merchandise is advanced to a next feature point (p←p+1), and when collation of all feature points of the merchandise is not completed (p≤m), a return is made to step S1835 to repeat collation of matching local feature. Moreover, the threshold $\alpha$ may be modified in correspondence with a recognition accuracy that is required by the merchandise. In the case of a recognition object with a low correlation with other merchandise, accurate recognition can be performed even when a low recognition accuracy is set.

Once collation with all feature points of the merchandise is completed, processing proceeds from step S1845 to S1847. In steps S1847 to S1853, a determination is made regarding whether or not the merchandise is present in the input video. First, in step S1847, a determination is made regarding whether or not a proportion of the number of feature points q matching the local feature of feature points in the input video among the number of feature points p of the merchandise exceeds a threshold $\beta$. If so, processing proceeds to step S1849 to further determine, as a merchandise candidate, whether or not a positional relationship between the feature points of the input video and the feature points of the merchandise is a relationship that enables linear conversion. In other words, a determination is made regarding whether a positional relationship between the feature points of the input video and the feature points of the merchandise which is stored in step S1841 as a match among local feature is a relationship that is maintained even after changes such as rotation, inversion, viewpoint position alteration, or the like are made or a relationship that is not maintained after such changes. Since methods of making such a determination are geometrically known, a detailed description thereof will be omitted. In step S1851, depending on a result of the determination of whether or not linear conversion is enabled, if linear conversion is enabled, processing proceeds to step S1853 to determine that the piece of collated merchandise is present in the input video. Moreover, the threshold $\beta$ may be modified in correspondence with a recognition accuracy that is required by the merchandise. In this case, when the merchandise has a low correlation with other merchandise or when features of the merchandise can be determined even from one portion of the merchandise, accurate recognition can be performed even when the number of matching feature point is small. In other words, even if one portion is hidden from view or as long as one feature portion is in view, the merchandise can be recognized.

In step S1855, a determination is made regarding whether or not pieces of uncollated merchandise remain in the local feature DB 310. When pieces of uncollated merchandise remain, in step S1857, a next piece of merchandise is set and parameters are initialized to p=1 and q=0, and a return is made to S1835 to repeat collation.

Moreover, as is apparent from the description of the collating process given above, a process involving storing merchandise of all fields in the local feature DB 310 and collating all of the merchandise requires a significantly large load. In consideration thereof, for example, the user may conceivably select a field of merchandise from a menu before performing merchandise recognition from an input video and perform collation by retrieving the selected field from the local feature DB 310. Alternatively, the load can also be reduced by storing only local feature of a field used by the user in the local feature DB 310.

(Merchandise Managing Process)

Figure 19:
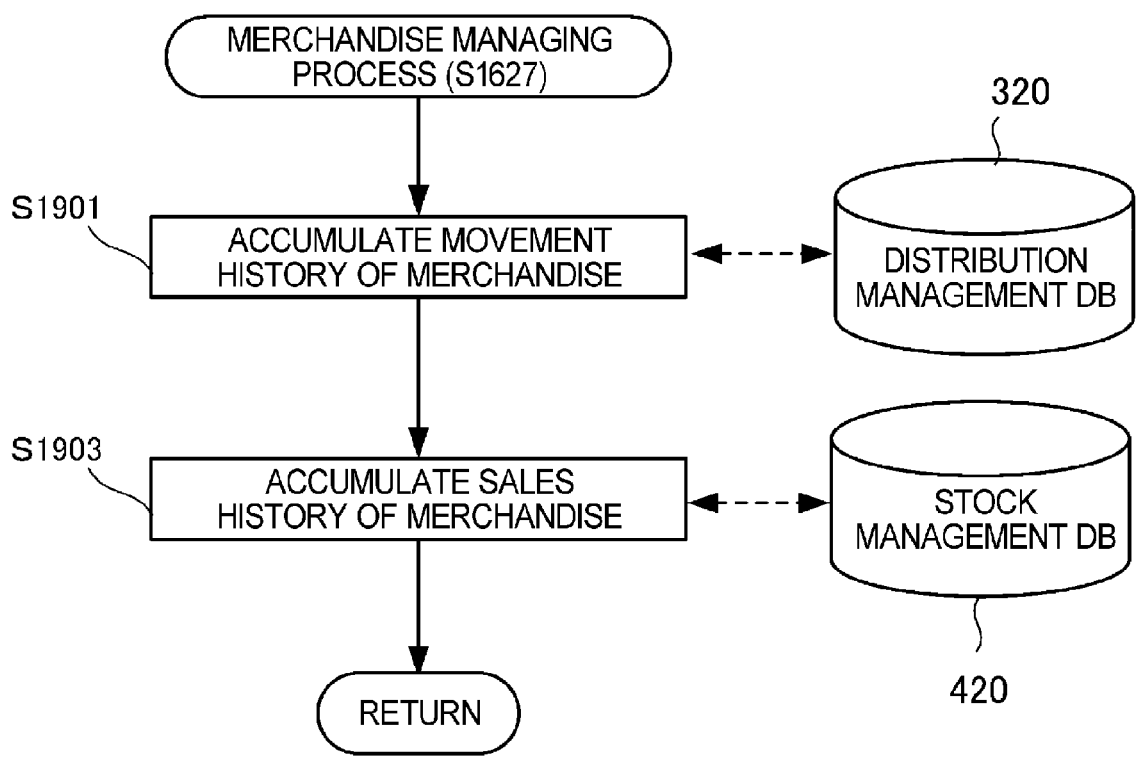
FIG. 19 is a flow chart showing a processing procedure of a merchandise managing process according to the second embodiment of the present invention.

FIG. 19 is a flow chart showing a processing procedure of the merchandise managing process S1627 according to the present embodiment.

First, in step S1901, a movement history of a piece of recognized merchandise is accumulated in the distribution management DB 320. Subsequently, in step S1903, a sales history of the recognized merchandise is traced with respect to the stock management DB 420.

Third Embodiment

Next, an information processing system according to a third embodiment of the present invention will be described. The information processing system according to the present embodiment differs from that of the second embodiment described above in that, in register processing, a discount amount is recognized from a captured video in addition to identifying merchandise and a discount is calculated without requiring operations by a store clerk. Since other components and operations are similar to those of the second embodiment, descriptions of similar components and operations will be omitted.

According to the present embodiment, a discount process of merchandise can be realized without operations by a store clerk and efficiency of register processing can be improved.

<<Processing According to Present Embodiment>>

Figure 20:
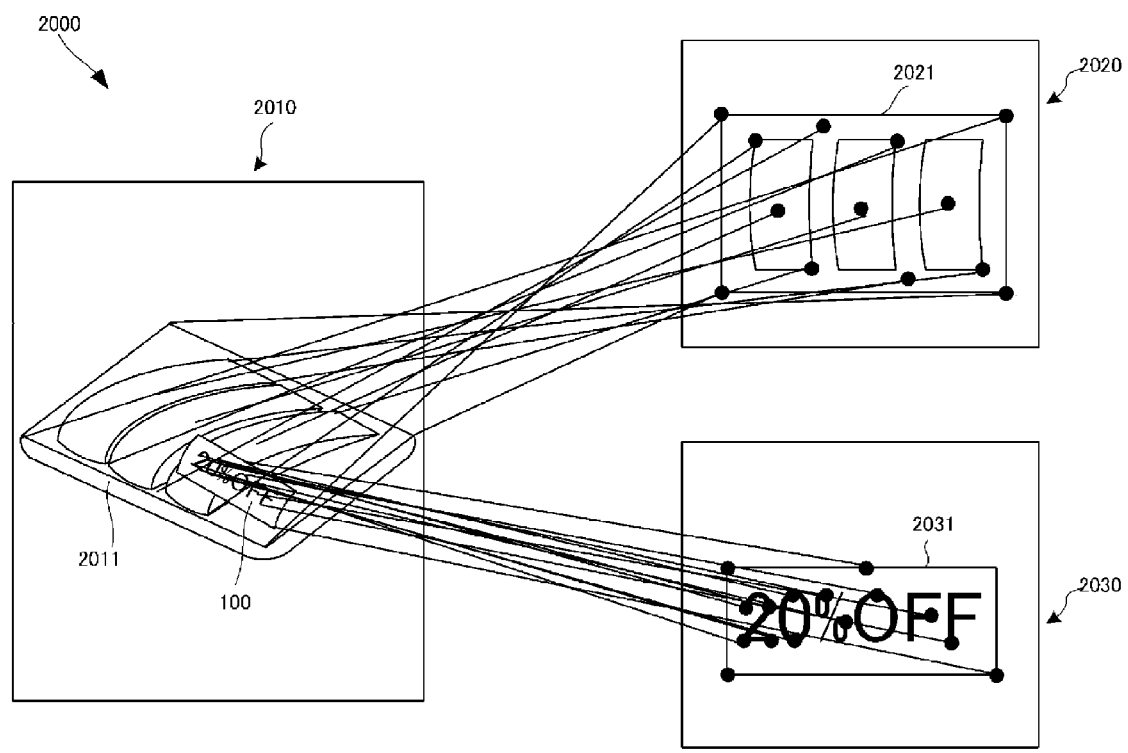
FIG. 20 is a diagram showing processing by an information processing system according to a third embodiment of the present invention.

FIG. 20 is a diagram showing processing by an information processing system 2000 according to the third embodiment of the present invention. In particular, FIG. 20 is a diagram showing processing by the merchandise recognizing unit 913 according to the present embodiment.

Local feature 2020 and 2030 which are shown in FIG. 20 and which have been generated according to the present embodiment in advance from a piece of merchandise 2021 and a discount tag 2031 are stored in the local feature DB 610. Meanwhile, local feature are generated according to the present embodiment from a video screen 2010 captured by a communication terminal shown in a left diagram in FIG. 20. Subsequently, the local feature 2020 and 2030 stored in the local feature DB 610 are collated to determine whether the local feature 2020 and 2030 are included in the local feature generated from the video screen 2010.

As shown in FIG. 20, the merchandise recognizing unit 913 associates each feature point at which the local feature stored in the local feature DB 610 and the local feature match as depicted by the fine lines. Moreover, the merchandise recognizing unit 913 determines a match of a feature point when a prescribed proportion or more of the local feature are consistent. Subsequently, the merchandise recognizing unit 913 recognizes a piece of object merchandise when a positional relationship between sets of feature points associated with each other is a linear relationship. Such recognition can be performed even in cases of different sizes or orientations (different viewpoints) or in cases of inversion or the like. In addition, since recognition accuracy is obtained as long as there are a prescribed number or more of associated feature points, a piece of merchandise can be recognized even if a part of the merchandise is hidden from view.

In FIG. 20, a piece of merchandise and a discount amount (a discount rate) are recognized from the local feature 2020 and 2030 of the merchandise and the discount tag in the local feature DB 610. In addition, the POS 242 shown in FIG. 2 realizes processing with a discounted merchandise price without operations performed by a store clerk 243.

<<Operation Procedure of Information Processing System>>

Figure 21:
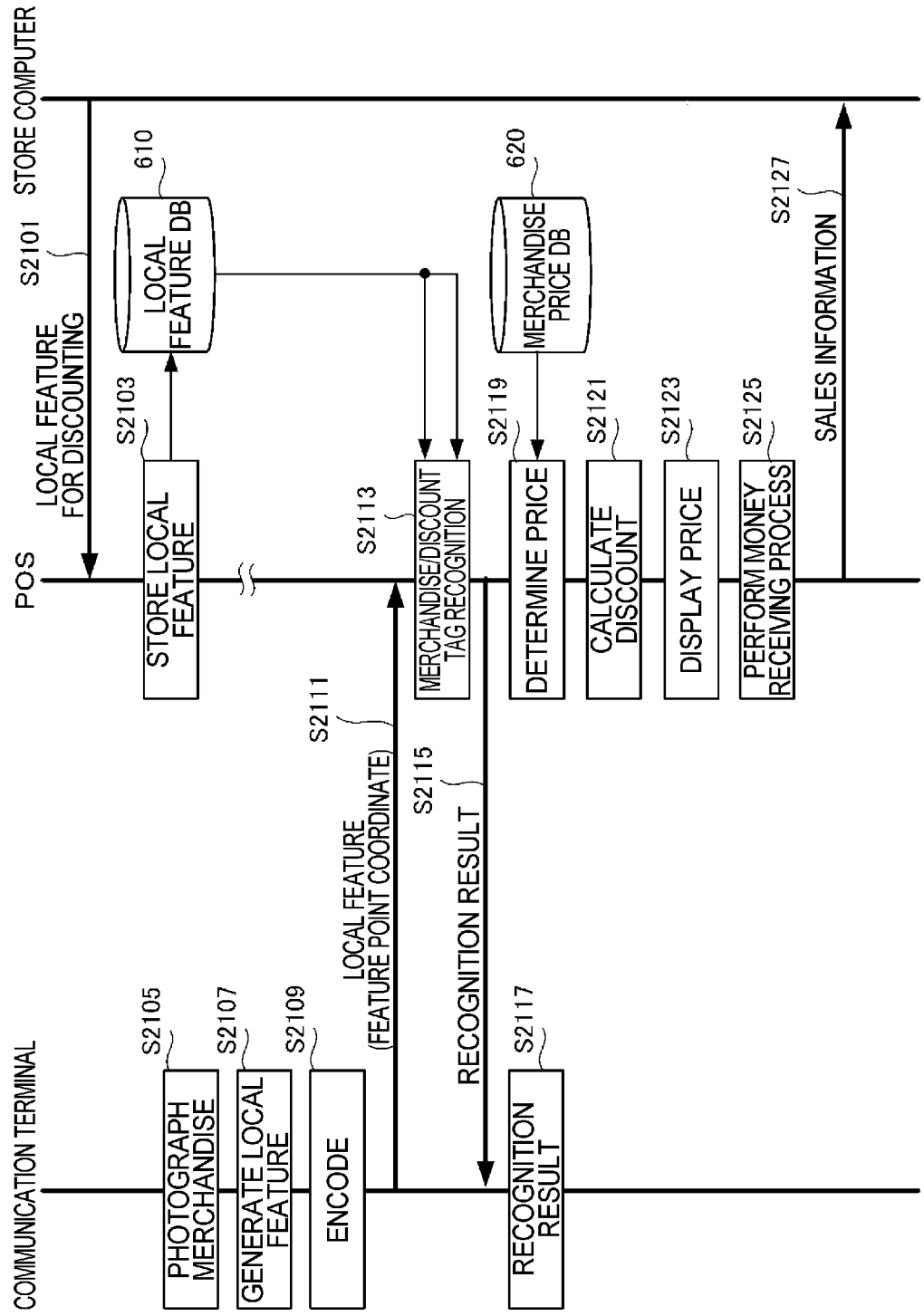
FIG. 21 is a sequence diagram showing a processing procedure of the information processing system according to the third embodiment of the present invention.

FIG. 21 is a sequence diagram showing an operation procedure of the information processing system 2000 according to the present embodiment. Moreover, if necessary, an application is downloaded from the managing server 250 or a store computer to a POS or a communication terminal. Although the application is subsequently activated and initialized in order to perform processing according to the present embodiment, the activation and initialization are omitted in FIG. 21 (refer to FIG. 6).

In step S2101, a local feature for discounting is transmitted from a store computer to a POS. In step S2103, the POS adds the local feature of a discount tag to the local feature DB 610 (refer to FIG. 22).

In step S2105, a communication terminal captures a video of a single piece of merchandise, a plurality of pieces of merchandise, or a group of merchandise placed in a basket at the register. In step S2107, a local feature is generated from the video. Moreover, as already described with respect to inventory/shelf allocation evaluation, when recognizing individual pieces of merchandise or a plurality of pieces of merchandise in a basket, local feature with changed accuracy are generated by adjusting the number of feature points or the number of dimensions of feature vectors. Subsequently, in step S2109, the local feature is encoded together with a feature point coordinate. The encoded local feature is transmitted in step S2111 from the communication terminal to the POS.

In step S2113, the POS refers to the local feature DB 610 of the POS which is generated and stored with respect to respective pieces of merchandise to recognize the merchandise. At the same time, the discount tag is also recognized. Subsequently, in step S2115, the recognition results are transmitted from the POS to the communication terminal.

In step S2117, the communication terminal notifies the recognition results. Meanwhile, in step S2119, the POS refers to the merchandise price DB 620 of the POS to determine a price of the recognized merchandise. Next, in step S2121, if a discount applies, a discounted merchandise price is calculated. Subsequently, in step S2123, the discounted price is displayed.

In step S2125, the POS accepts payment from a customer and performs a money receiving process. Subsequently, in step S2127, sales information is transmitted to the store computer. Subsequent processes are as shown in FIG. 6.

(Discount Information in Local Feature DB)

Figure 22:
FIG. 22 is a diagram showing a configuration of discount information in a local feature DB according to the third embodiment of the present invention.

FIG. 22 is a diagram showing a configuration of discount information in the local feature DB 610 according to the present embodiment.

The local feature DB 610 stores local feature associated with merchandise IDs. In addition, discount information 610a is registered in the local feature DB 610. As the discount information 610a, a discount rate, a discount amount, and a local feature of a discount tag are stored in association with the discount tag.

<<Processing Procedure of POS>>

FIG. 23 is a flow chart showing a processing procedure of a POS according to the present embodiment.

First, in step S2311, a determination is made regarding whether or not discounting information has been received. In addition, in step S2321, a determination is made regarding whether or not a local feature has been received. Furthermore, a determination is made regarding whether or not received money data has been received. When none of the determinations are positive, other processes are performed in step S2341.

When discounting information has been received, processing proceeds to step S2313 to store the discount information in the local feature DB 610.

When a local feature has been received, processing proceeds to step S2323 to perform a recognizing process of the merchandise and the discount tag by referring to the local feature DB 610. Next, in step S2325, with respect to the recognized merchandise, a merchandise price is determined by referring to the merchandise price DB 620. In step S2327, when a discount tag had been recognized in step S2323, a discount calculation is performed on the merchandise price determined in step S2325. Subsequently, in step S2329, the price is displayed.

When received money data has been received, processing proceeds to step S2333 to perform a money receiving process. Subsequently, sales are notified to the store computer 201a.

Fourth Embodiment

Next, an information processing system according to a fourth embodiment of the present invention will be described. The information processing according to the present embodiment differs from the second embodiment described earlier in that merchandise recognition by a communication terminal is used to supplement conventional merchandise identification using a barcode that is an identifier added to merchandise or the like. In other words, with merchandise recognition based on a local feature according to the present embodiment, since recognition can be performed regardless of a direction and the like of a piece of merchandise, a position of a barcode and the like can be notified to a store clerk. Since other components and operations are similar to those of the second embodiment, similar components and operations will be denoted using similar reference characters and a description thereof will be omitted.

According to the present embodiment, since a store clerk is not required to search for a position of a barcode and the like, speedy processing can be performed.

<<Operation Procedure According to Present Embodiment>>

Figure 24:
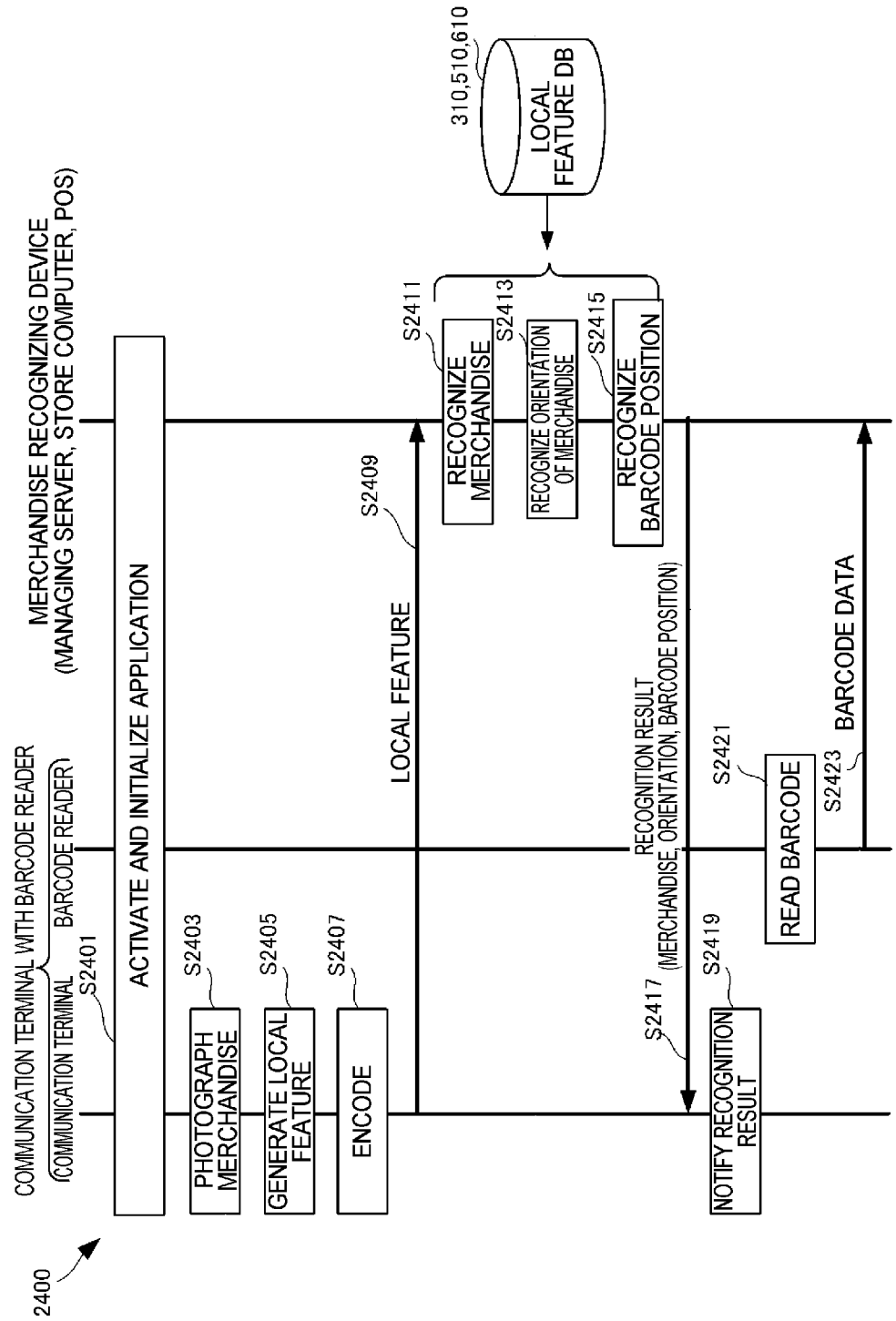
FIG. 24 is a sequence diagram showing a processing procedure of an information processing system according to a fourth embodiment of the present invention.

FIG. 24 is a sequence diagram showing an operation procedure of the information processing system 2400 according to the present embodiment. Moreover, if necessary, an application is downloaded from the managing server 250 or a store computer to a POS or a communication terminal. However, this download is omitted in FIG. 24 (refer to FIG. 6).

In step S2401, the application is activated and initialized in order to perform processing according to the present embodiment. In step S2403, a communication terminal captures a video of a single piece of merchandise, a plurality of pieces of merchandise, or a group of merchandise placed in a basket at the register. In step S2405, a local feature is generated from the video. Moreover, as already described with respect to inventory/shelf allocation evaluation, when recognizing individual pieces of merchandise or a plurality of pieces of merchandise in a basket, local feature with changed accuracy are generated by adjusting the number of feature points or the number of dimensions of feature vectors. Subsequently, in step S2407, the local feature is encoded together with a feature point coordinate. The encoded local feature is transmitted in step S2409 from the communication terminal to the POS.

In step S2411, the POS refers to the local feature DB 610 of the POS which is generated and stored with respect to respective pieces of merchandise to recognize the merchandise. At the same time, in step S2413, an orientation of the merchandise is recognized. As shown in FIGS. 11H to 11K, in the present embodiment, an orientation of merchandise can be recognized. Moreover, the orientation of merchandise can be recognized not only for just one piece of merchandise but also for a plurality of pieces of merchandise. Subsequently, in step S2415, by referring to a position where a barcode is arranged in advance from the orientation of the merchandise, a position of the barcode is recognized particularly when the barcode is not visible from a store clerk. In step S2417, information regarding the orientation of the merchandise and the barcode position that is the recognition result is transmitted to a communication terminal together with the recognized merchandise name.

In step S2419, the communication terminal notifies the recognition result. The position of the barcode that is hidden from view is notified.

After the store clerk locates the barcode and a barcode reader reads the barcode in step S2421, in step S2423, barcode data is sent from the barcode reader to a POS and recognition of merchandise is performed.

Moreover, while orientation recognition that is performed by a POS is shown in FIG. 24, for example, orientation recognition can also be performed by a store computer or a managing server during a shipping process or a warehousing process.

<<Functional Configuration of Communication Terminal>>

Figure 25:
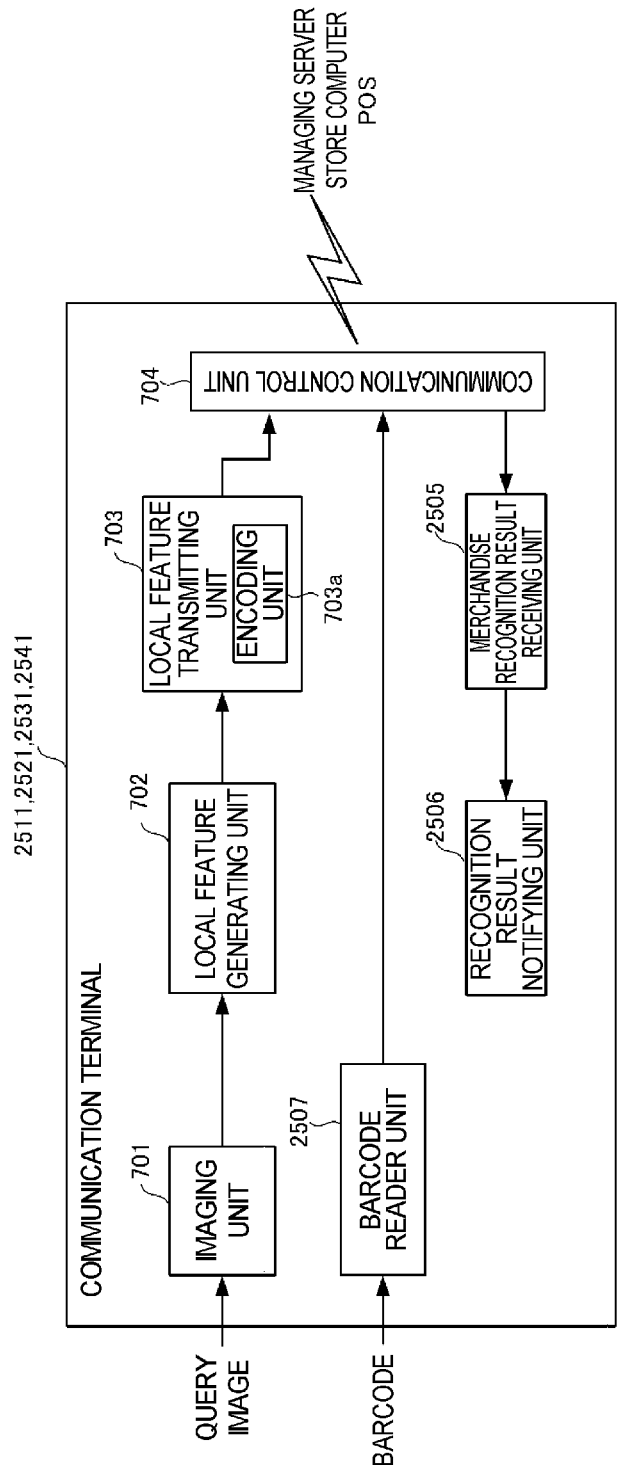
FIG. 25 is a block diagram showing a functional configuration of a communication terminal according to the fourth embodiment of the present invention.

FIG. 25 is a block diagram showing a functional configuration of the communication terminals 2511, 2521, 2531, and 2541 according to the present embodiment. Moreover, in the present embodiment, a function related to a barcode reader is added to FIG. 7 according to the second embodiment. Accordingly, functional components similar to those in FIG. 7 will be denoted by similar reference numerals and a description thereof will be omitted.

In FIG. 25, a merchandise recognition result that is received by a merchandise recognition result receiving unit 2505 via the communication control unit 704 includes not only a merchandise name but also information representing an orientation of the merchandise and a position of a barcode. A recognition result notifying unit 2506 notifies the information representing the orientation of the merchandise and the position of a barcode to the user. Information representing a position of the barcode may be notified by a display, an audio comment, or image information. A barcode reader unit 2507 is a conventional functional component and transmits, via the communication control unit 704, barcode information read according to instructions issued by the recognition result notifying unit 2506.

Fifth Embodiment

Next, an information processing system according to a fifth embodiment of the present invention will be described. The information processing system according to the present embodiment differs from the second embodiment described earlier in that, when the user captures a video of merchandise using a mobile terminal, participants to a questionnaire are invited via the merchandise in the video. Since other components and operations are similar to those of the second embodiment, descriptions of similar components and operations will be omitted.

According to the present embodiment, the user's interest towards merchandise or a store can be enhanced. At the same time, from the perspective of a manufacturer of the merchandise, an advertising effect can be enhanced.

Moreover, in the present embodiment, while a supplier-side terminal will still be referred to as a communication terminal, a user-side terminal will be referred to as a mobile terminal in order to distinguish the latter from the former.

<<Processing According to Present Embodiment>>

Figure 26:
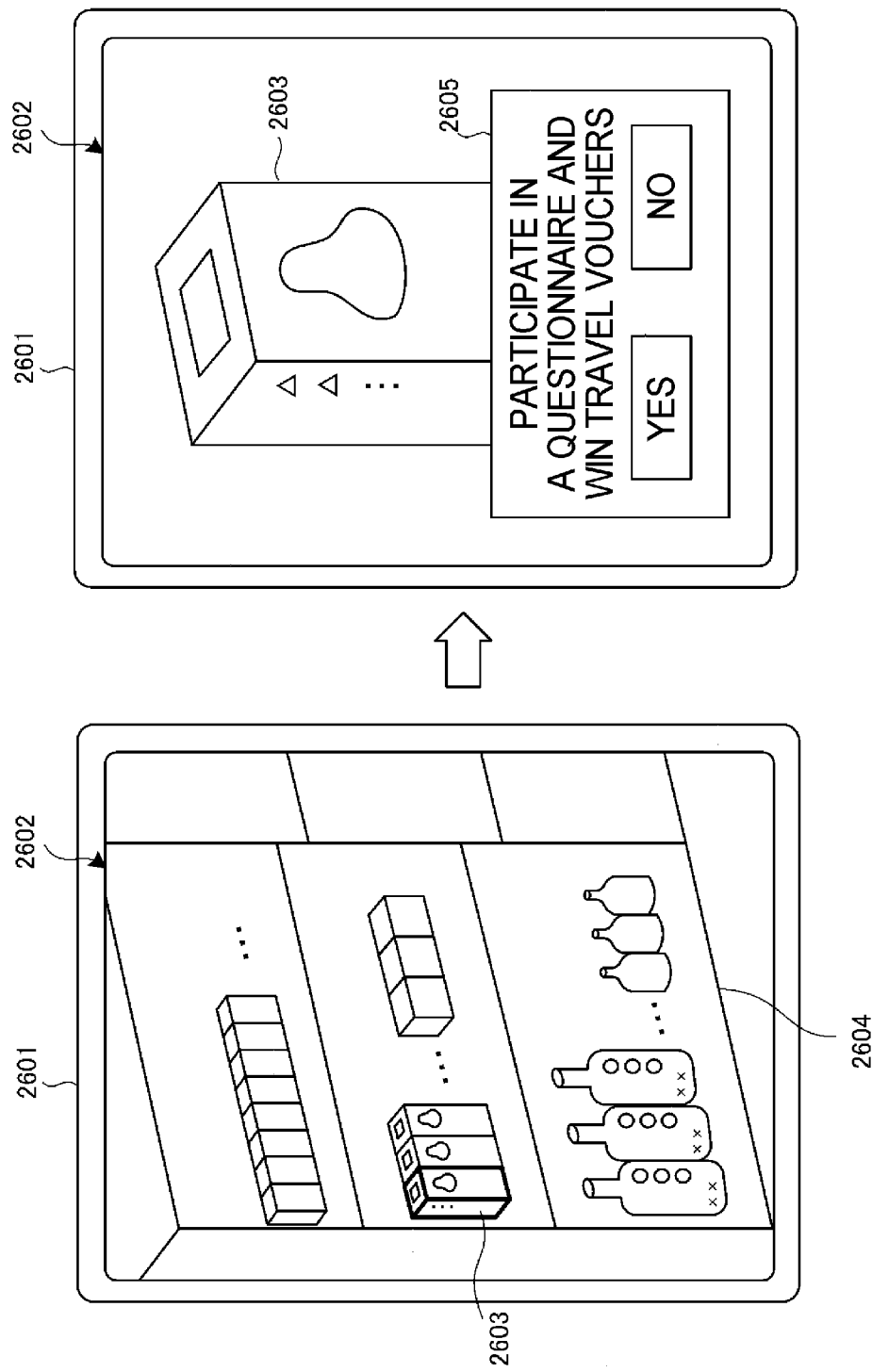
FIG. 26 is a diagram showing processing by an information processing system according to a fifth embodiment of the present invention.

FIG. 26 is a diagram showing processing by the information processing system according to the present embodiment.

A left diagram in FIG. 26 represents a video of a food shelf 2804 in a store which is captured by a mobile terminal 2801 and which is displayed on a display screen 2802. PET bottles and paper cartons are displayed on the food shelf. Let us assume that, among these items, a paper carton 2803 is registered as a piece of merchandise used to announce a questionnaire.

A right diagram in FIG. 26 represents a message 2805 reading "Participate in a questionnaire and win travel vouchers (Yes/No)" in correspondence with the paper carton 2803.

(Questionnaire DB)

Figure 27:
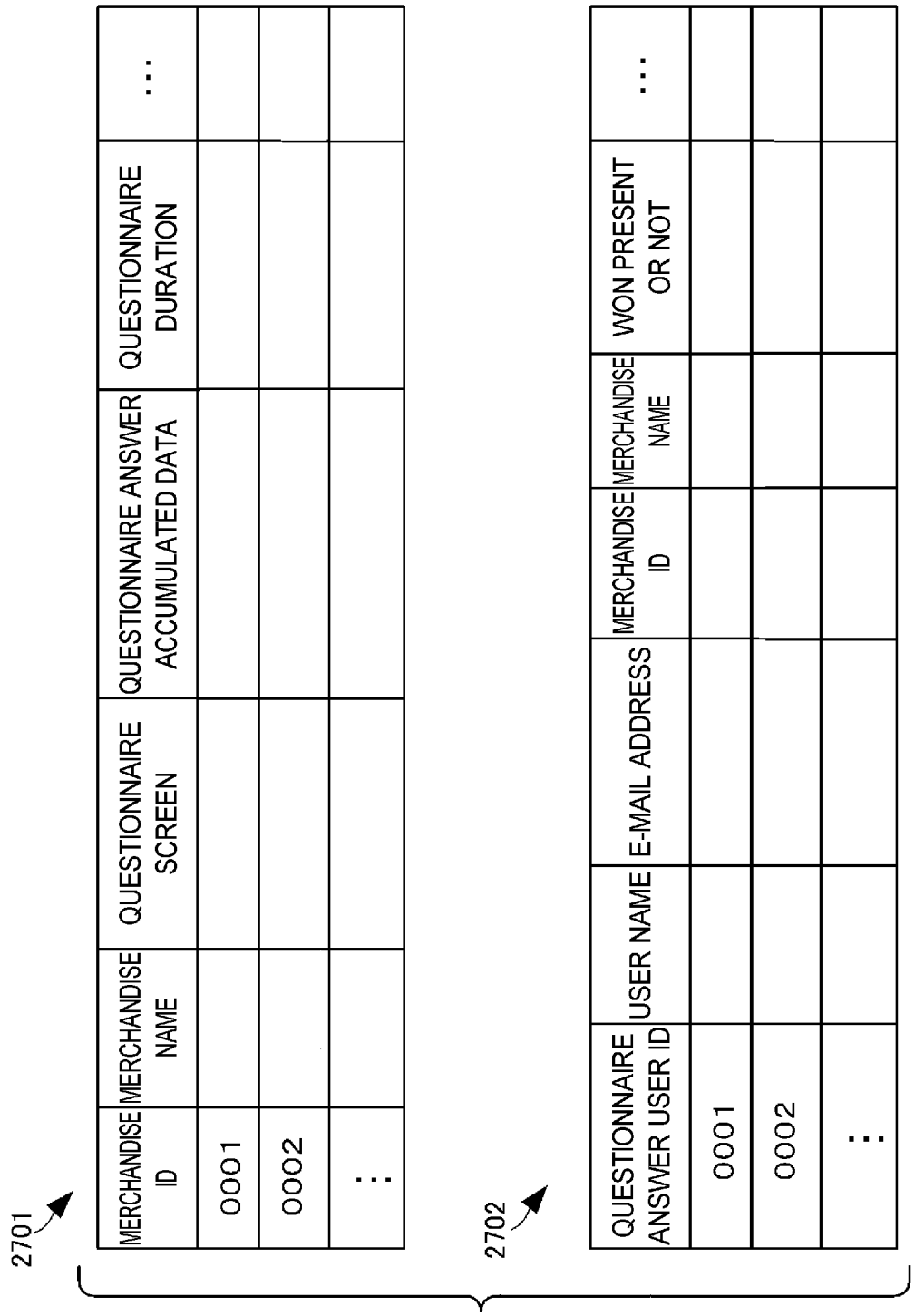
FIG. 27 is a diagram showing a configuration of a questionnaire DB according to the fifth embodiment of the present invention.

FIG. 27 is a diagram showing a configuration of a questionnaire DB according to the present embodiment.

In FIG. 27, a questionnaire DB 2701 stores, in association with a merchandise ID and a merchandise name, a questionnaire screen, accumulated data of answers to the questionnaire, and a duration of the questionnaire.

In addition, a questionnaire DB 2702 stores, in association with a user ID and a user name of a user having answered the questionnaire, an e-mail address, a merchandise ID of the merchandise to which the user responded, a name of the merchandise, and whether or not the user had won a present (travel vouchers in FIG. 26).

<<Processing Procedure of Managing Computer>>

Figure 28:
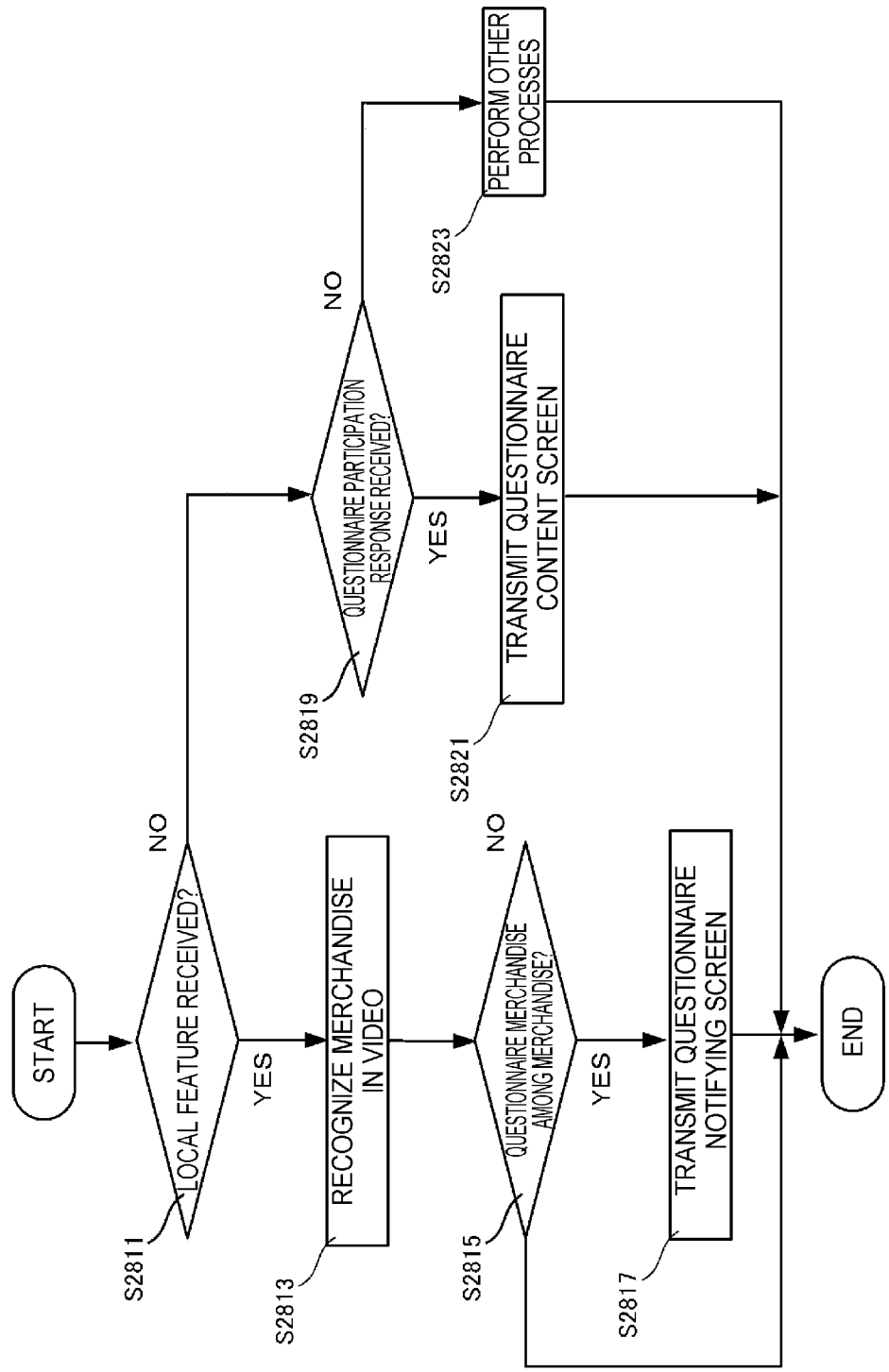
FIG. 28 is a flow chart showing a processing procedure of a managing computer according to the fifth embodiment of the present invention.

FIG. 28 is a flow chart showing a processing procedure of a managing computer according to the present embodiment.

First, in step S2811, a determination is made regarding whether or not a local feature has been received from the mobile terminal. If a local feature has been received, processing proceeds to step S2813 to recognize merchandise in the video. In step S2815, a determination is made regarding whether or not there is a piece of questionnaire merchandise among the merchandise. When there is a piece of questionnaire merchandise, in step S2817, a questionnaire notifying screen is sent to the mobile terminal.

On the other hand, when a local feature has not been received, processing proceeds to step S2819 to determine whether or not a questionnaire participation response from the user has been received. When a questionnaire participation response has been received, in step S2821, a questionnaire content screen is transmitted.

When neither a local feature nor a questionnaire participation response has been received, in step S2823, other processes are performed.

Sixth Embodiment

Next, an information processing system according to a sixth embodiment of the present invention will be described. The information processing system according to the present embodiment differs from the second embodiment described earlier in that a communication terminal (a mobile terminal) includes a local feature DB and performs merchandise recognition. Since other components and operations of the communication terminal are similar to those of the second embodiment, similar components and operations will be denoted using similar reference characters and a description thereof will be omitted.

According to the present embodiment, merchandise recognition can be performed regardless of a communication fault or the like.

<<Functional Configuration of Communication Terminal>>

Figure 29:
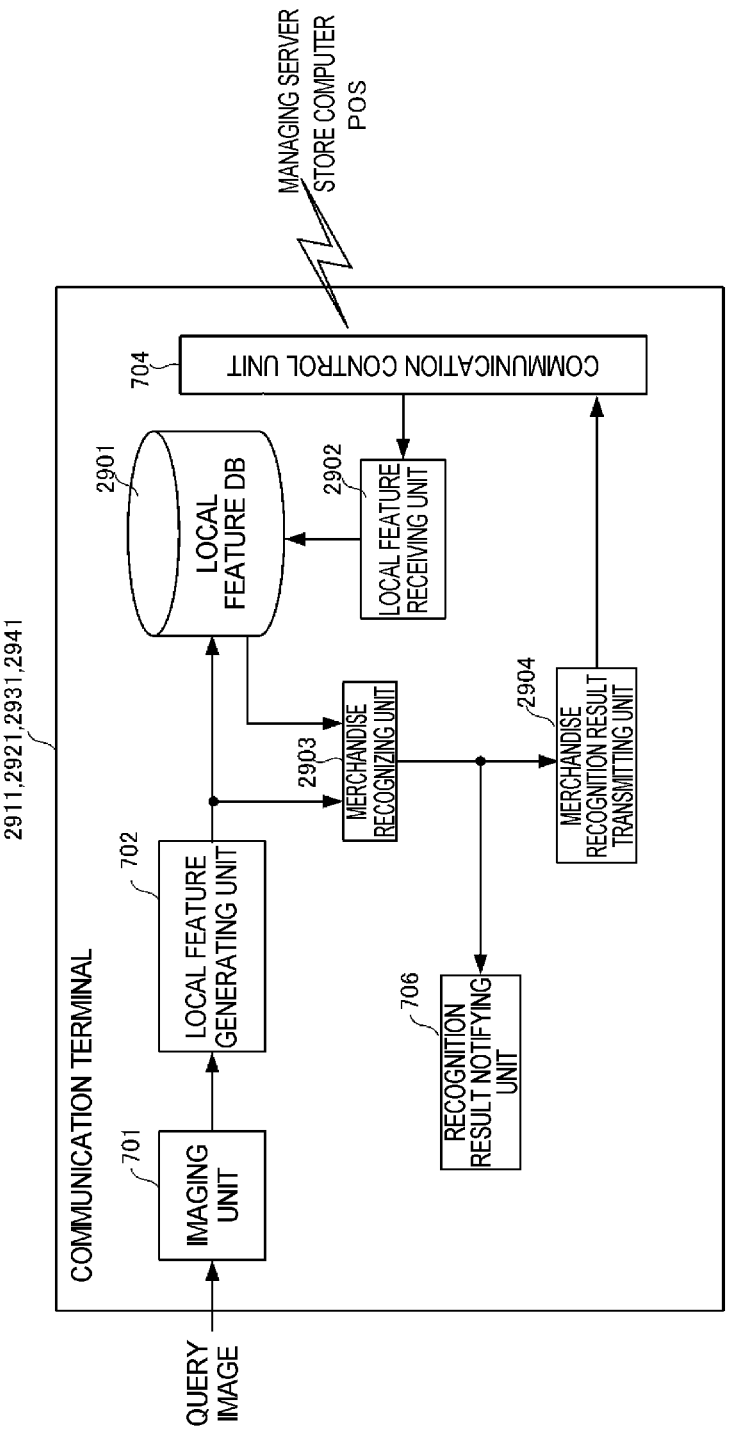
FIG. 29 is a block diagram showing a functional configuration of a communication terminal in an information processing system according to a sixth embodiment of the present invention.

FIG. 29 is a block diagram showing a functional configuration of a communication terminal in the information processing system according to the present embodiment. Moreover, a configuration of the communication terminal shown in FIG. 29 differs from that according to the second embodiment shown in FIG. 7 in that the communication terminal shown in FIG. 29 is configured to perform merchandise recognition. Since other functional components are similar to those of the second embodiment, similar components and operations will be denoted using similar reference characters and a description thereof will be omitted.

A local feature DB 2901 is configured in a similar manner to FIG. 10 and stores merchandise and local feature in association with one another. Moreover, when the communication terminal is subjected to restrictions such as processing speed and storage capacity, the local feature DB 2901 may only store local feature of a particular field or local feature related to desired merchandise. A merchandise recognizing unit 2903 collates a local feature generated from a video with a local feature from the local feature DB 2901 and recognizes a piece of merchandise. A merchandise recognition result transmitting unit 2904 transmits a name of the merchandise recognized by the communication terminal and the like to the outside via the communication control unit 704.

Seventh Embodiment

Next, an information processing system according to a seventh embodiment of the present invention will be described. The information processing system according to the present embodiment represents an application of the second to sixth embodiments described above to a library.

Figure 30:
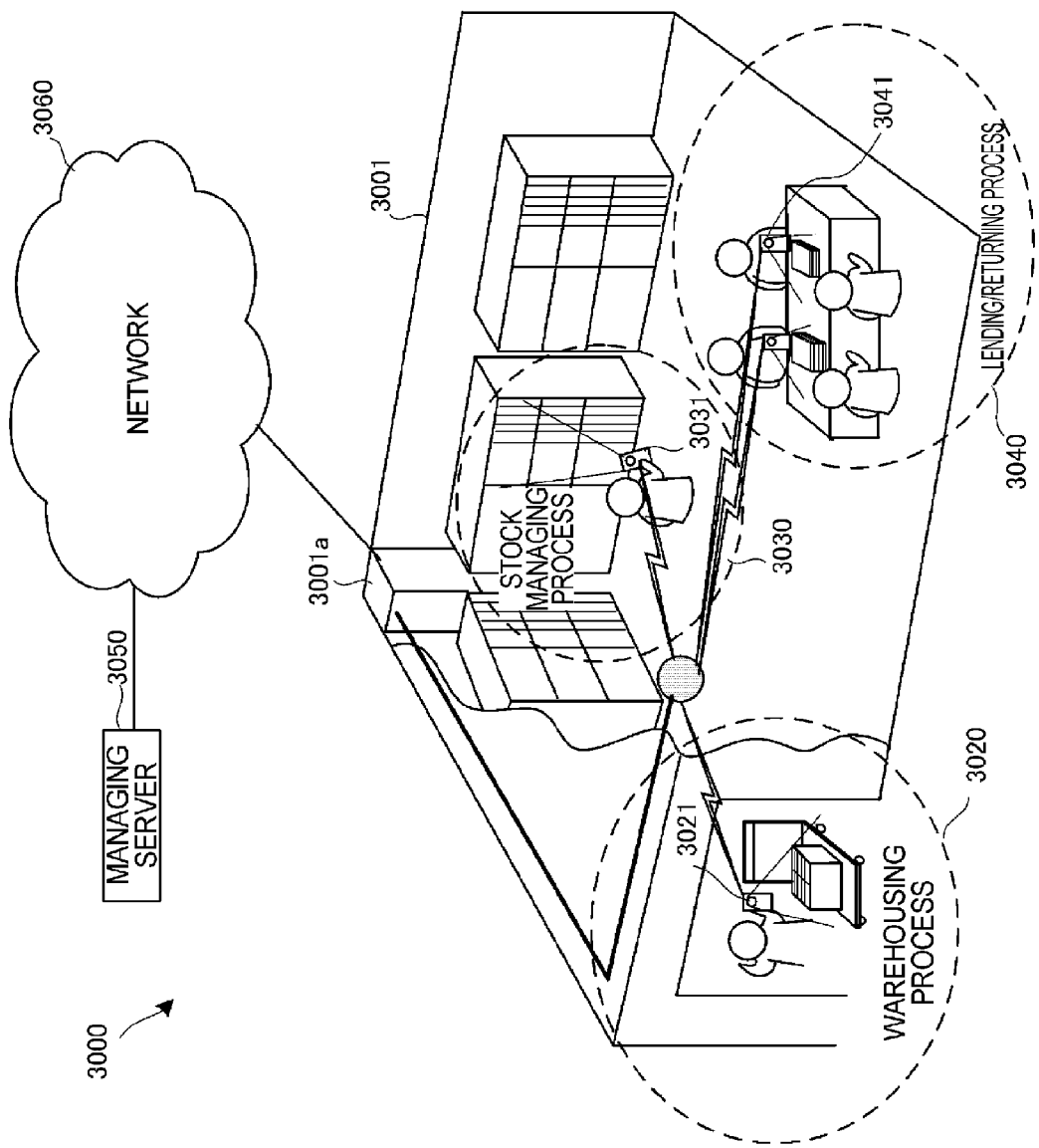
FIG. 30 is a block diagram showing a configuration of an information processing system according to a seventh embodiment of the present invention.

FIG. 30 is a block diagram showing a configuration of an information processing system 3000 according to the present embodiment. Processing similar to those shown in FIG. 2 according to the second embodiment can also be applied to management of books in a library.

FIG. 30 illustrates a computer 3001a of a library 3001 which is connected to a managing server 3050 via a network 3060. In a similar manner to FIG. 2, in a book warehousing process 3020, a book is recognized by capturing a video of the book with a communication terminal 3021. In addition, in a stock managing process 3030, a shelf and a book are recognized by capturing a video thereof with a communication terminal 3031. In addition, in a lending/returning process 3040, a book is recognized by capturing a video thereof with a communication terminal 3041.

Eighth Embodiment

Next, an information processing system according to an eighth embodiment of the present invention will be described. The information processing system according to the present embodiment represents an application of the second to sixth embodiments described above to an art museum or a museum.

Figure 31:
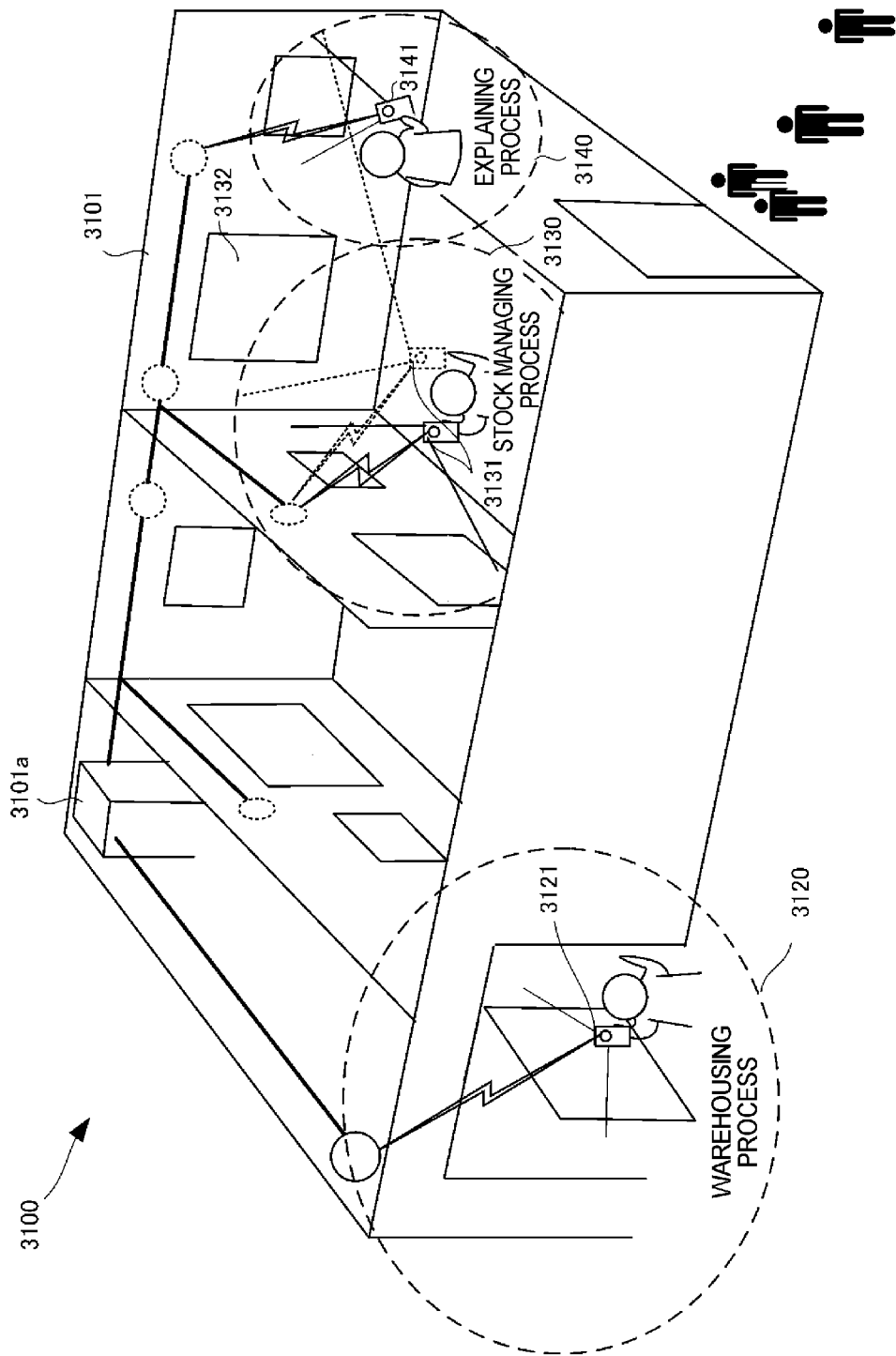
FIG. 31 is a block diagram showing a configuration of an information processing system according to an eighth embodiment of the present invention.

FIG. 31 is a block diagram showing a configuration of an information processing system 3100 according to the present embodiment. Processing similar to those shown in FIG. 2 according to the second embodiment can also be applied to management of exhibits such as paintings, sculptures, and cultural heritage items in an art museum or a museum.

FIG. 31 illustrates a computer 3101*a* in an art museum or a museum 3101. In a similar manner to FIG. 2, in a book warehousing process 3120, a work of art such as a painting is recognized by capturing a video of the painting with a communication terminal 3121. In addition, in a stock managing process 3130, a painting or the like is recognized by capturing a video of the painting with a communication terminal 3131. Furthermore, in an explaining process 3140, an explanation of a painting or the like whose video is captured by a communication terminal 3141 can be provided.

Other Embodiments

While the present invention has been described in its preferred embodiments, it is to be understood that the present invention is not limited to the embodiments described above. It will be obvious to those skilled in the art that various changes and modifications may be made to the configurations and details of the present invention within the scope thereof. It is also to be understood that systems and devices that combine independent features included in the respective embodiments in various ways also fall within the scope of the present invention.

In addition, the present invention may be applied to systems constituted by a plurality of devices or to a single apparatus. Furthermore, the present invention is also applicable to cases where a control program that realizes the functions of the embodiments is directly or remotely supplied to a system or an apparatus.

Accordingly, a control program to be installed on a computer, a medium storing the control program, and a WWW (World Wide Web) server that enables the control program to be downloaded in order to realize the functions of the present invention on the computer also fall within the scope of the present invention.

This application is based on, and claims priority from, Japanese Patent Application No. 2011-276522, filed on Dec. 16, 2011, the entire contents of which are incorporated herein by reference.

A part of or all of the present embodiment may be described as, but not limited to, the following Appendices.

(Appendix 1)

An information processing system, comprising:

a first local feature storing unit which stores a piece of merchandise and m-number of first local feature which are respectively 1-dimensional to i-dimensional feature vectors and which are generated for each of m-number of local areas including each of m-number of feature points of an image of the merchandise after associating the piece of merchandise and m-number of first local feature with each other;

an imaging unit;

a second local feature generating unit which extracts n-number of feature points from an image on a video captured by the imaging unit and which generates n-number of second local feature which are respectively 1-dimensional to j-dimensional feature vectors for n-number of local areas including each of the n-number of feature points; and a recognizing unit which selects a smaller number of dimensions among the number of dimensions i of the feature vectors of the first local feature and the number of dimensions j of the feature vectors of the second local feature, and recognizes that the merchandise exists in the image on the video when determination is made that a prescribed proportion or more of the m-number of first local feature which are feature vectors up to the selected number of dimensions correspond to the n-number of second local feature which are feature vectors up to the selected number of dimensions (Appendix 2)

The information processing system according to Appendix 1, further comprising notifying unit which notifies a recognition result of the recognizing unit.

(Appendix 3)

The information processing system according to Appendix 2, wherein the information processing system comprises a communication terminal carried by a user and an information processing device that communicates with the communication terminal, the communication terminal includes the imaging unit, the second local feature generating unit, and the notifying unit and transmits the m-number of second local feature from the communication terminal to the information processing device, and the information processing device includes the first local feature storing unit and the recognizing unit and transmits a recognition result of the recognizing unit from the information processing device to the communication terminal.

(Appendix 4)

The information processing system according to any one of Appendices 1 to 3, wherein the first local feature storing unit stores, in association with each of a plurality of pieces of merchandise, the m-number of first local feature generated from an image of each piece of merchandise, and the recognizing unit recognizes a plurality of pieces of merchandise included in the image captured by the imaging unit and includes an arrangement recognizing unit which recognizes an arrangement of the plurality of pieces of merchandise included in the image captured by the imaging unit based on an arrangement of the n-number of second local feature.

(Appendix 5)

The information processing system according to Appendix 4, further comprising first managing unit that performs inventory or shelf allocation based on the arrangement of the plurality of pieces of merchandise recognized by the arrangement recognizing unit.

(Appendix 6)

The information processing system according to any one of Appendices 1 to 4, wherein the image of the merchandise includes an image of a packing container containing a plurality of pieces of merchandise, and the recognizing unit recognizes the packing container.

(Appendix 7)

The information processing system according to Appendix 6, further comprising a second managing unit which performs distribution management or stock management of the merchandise based on the recognition of the packing container by the recognizing unit.

(Appendix 8)

The information processing system according to any one of Appendices 1 to 7, wherein the first local feature and the second local feature are generated by dividing a local area including a feature point extracted from an image into a plurality of sub areas and generating feature vectors of a plurality of dimensions constituted by a gradient direction histogram in the plurality of sub areas.

(Appendix 9)

The information processing system according to Appendix 8, wherein the first local feature and the second local feature are generated by deleting dimensions with a higher correlation between adjacent sub areas from the generated feature vectors of the plurality of dimensions.

(Appendix 10)

The information processing system according to Appendix 8 or 9, wherein the plurality of dimensions of the feature vectors are arranged to circumnavigate the local area for every prescribed number of dimensions so that the plurality of dimensions of the feature vectors can be selected sequentially from the dimensions contributing to a feature of the feature point and sequentially from a 1st dimension in accordance with an increase in accuracy required with respect to the local feature.

(Appendix 11)

The information processing system according to Appendix 10, wherein the second local feature generating unit generates, in correspondence to a correlation of the merchandise, the second local feature having a larger number of dimensions with respect to merchandise having a higher correlation with other merchandise.

(Appendix 12)

The information processing system according to Appendix 10 or 11, wherein the first local feature storing unit stores, in correspondence to a correlation of the merchandise, the first local feature having a larger number of dimensions with respect to merchandise having a higher correlation with other merchandise.

(Appendix 13)

The information processing system according to any one of Appendices 1 to 12, further comprising an identifying unit which identifies the merchandise by reading an identifier attached to the merchandise, wherein the recognizing unit determines a direction of the recognized merchandise and recognizes a position of the identifier attached to the merchandise based on the direction.

(Appendix 14)

The information processing system according to any one of Appendices 1 to 13, wherein the merchandise is a book in a library.

(Appendix 15)

The information processing system according to any one of Appendices 1 to 13, wherein the merchandise is a work of art in an art museum.

(Appendix 16)

The information processing system according to any one of Appendices 1 to 13, wherein the merchandise is an exhibit in a museum.

(Appendix 17)

A communication terminal in the information processing system according to Appendix 3, the communication terminal comprising:

an imaging unit;

a second local feature generating unit which extracts n-number of feature points from an image on a video captured by the imaging unit and which generates n-number of second local feature which are respectively 1-dimensional to j-dimensional feature vectors for n-number of local areas including each of the n-number of feature points;

a first transmitting unit which transmits the m-number of second local feature to an information processing device that recognizes merchandise included in the captured image based on comparison with local feature; and a first receiving unit which receives information representing merchandise included in the captured image from the information processing device.

(Appendix 18)

A control method of a communication terminal in the information processing system according to claim 3, the control method comprising:

an imaging step of performing imaging;

a second local feature generating step of extracting n-number of feature points from an image on a video captured in the imaging step and generating n-number of second local feature which are respectively 1-dimensional to j-dimensional feature vectors for n-number of local areas including each of the n-number of feature points;

a first transmitting step of transmitting the m-number of second local feature to an information processing device that recognizes merchandise included in the captured image based on comparison with local feature; and a first receiving step of receiving information representing merchandise included in the captured image from the information processing device.

(Appendix 19)

A control program of a communication terminal in the information processing system according to claim 3, the control program causing a computer to execute:

an imaging step of performing imaging;

a second local feature generating step of extracting n-number of feature points from an image on a video captured by the imaging and generating n-number of second local feature which are respectively 1-dimensional to j-dimensional feature vectors for n-number of local areas including each of the n-number of feature points;

a first transmitting step of transmitting the m-number of second local feature to an information processing device that recognizes merchandise included in the captured image based on comparison with local feature; and a first receiving step of receiving information representing merchandise included in the captured image from the information processing device.

(Appendix 20)

An information processing device including a first local feature storing unit that stores a piece of merchandise and m-number of first local feature which are respectively 1-dimensional to i-dimensional feature vectors and which are respectively generated for m-number of local areas respectively including m-number of feature points of an image of the merchandise after associating the piece of merchandise and m-number of first local feature with each other in the information processing system according to claim 3, the information processing device comprising:

a second receiving unit which receives, from the communication terminal, n-number of second local feature which are respectively 1-dimensional to j-dimensional feature vectors for n-number of local areas respectively including n-number of feature points extracted from an image on a video captured by the imaging unit;

a recognizing unit which selects a smaller number of dimensions among the number of dimensions i of the feature vectors of the first local feature and the number of dimensions j of the feature vectors of the second local feature, and recognizes that the merchandise exists in the image on the video when determination is made that a prescribed proportion or more of the m-number of first local feature which are feature vectors up to the selected number of dimensions correspond to the n-number of second local feature which are feature vectors up to the selected number of dimensions, and a second transmitting unit which transmits information representing the recognized merchandise to the communication terminal.

(Appendix 21)

A control method of an information processing device including a first local feature storing unit that stores a piece of merchandise and m-number of first local feature which are respectively 1-dimensional to i-dimensional feature vectors and which are respectively generated for m-number of local areas respectively including m-number of feature points of an image of the merchandise after associating the piece of merchandise and m-number of first local feature with each other in the information processing system according to claim 3, the control method comprising:

a second receiving step of receiving, from the communication terminal, n-number of second local feature which are respectively 1-dimensional to j-dimensional feature vectors for n-number of local areas respectively including n-number of feature points extracted from an image on a video captured by the imaging unit;

a recognizing step of selecting a smaller number of dimensions among the number of dimensions i of the feature vectors of the first local feature and the number of dimensions j of the feature vectors of the second local feature, and recognizing that the merchandise exists in the image on the video when determination is made that a prescribed proportion or more of the m-number of first local feature which are feature vectors up to the selected number of dimensions correspond to the n-number of second local feature which are feature vectors up to the selected number of dimensions; and a second transmitting step of transmitting information representing the recognized merchandise to the communication terminal.

(Appendix 22)

A control program of an information processing device including a first local feature storing unit that stores a piece of merchandise and m-number of first local feature which are respectively 1-dimensional to i-dimensional feature vectors and which are respectively generated for m-number of local areas respectively including m-number of feature points of an image of the merchandise after associating the piece of merchandise and m-number of first local feature with each other in the information processing system according to claim 3, the control program causing a computer to execute:

a second receiving step of receiving, from the communication terminal, n-number of second local feature which are respectively 1-dimensional to j-dimensional feature vectors for n-number of local areas respectively including n-number of feature points extracted from an image on a video captured by the imaging unit;

a recognizing step of selecting a smaller number of dimensions among the number of dimensions i of the feature vectors of the first local feature and the number of dimensions j of the feature vectors of the second local feature, and recognizing that the merchandise exists in the image on the video when determination is made that a prescribed proportion or more of the m-number of first local feature which are feature vectors up to the selected number of dimensions correspond to the n-number of second local feature which are feature vectors up to the selected number of dimensions; and a second transmitting step of transmitting information representing the recognized merchandise to the communication terminal.

(Appendix 23)

An information processing method in an information processing system including a first local feature storing unit that stores a piece of merchandise and m-number of first local feature which are respectively 1-dimensional to i-dimensional feature vectors and which are respectively generated for m-number of local areas respectively including m-number of feature points of an image of the merchandise after associating the piece of merchandise and m-number of first local feature with each other, the information processing method comprising:

an imaging step of performing imaging;

a second local feature generating step of extracting n-number of feature points from an image on a video captured in the imaging step and generating n-number of second local feature respectively which are 1-dimensional to j-dimensional feature vectors for n-number of local areas respectively including the n-number of feature points; and a recognizing step of selecting a smaller number of dimensions among the number of dimensions i of the feature vectors of the first local feature and the number of dimensions j of the feature vectors of the second local feature, and recognizing that the merchandise exists in the image on the video when determination is made that a prescribed proportion or more of the m-number of first local feature which are feature vectors up to the selected number of dimensions correspond to the n-number of second local feature which are feature vectors up to the selected number of dimensions.

The invention claimed is:

1. An information processing system, comprising:
   a local feature storage which stores a piece of merchandise and m-number of first local feature which are respectively 1-dimensional to i-dimensional feature vectors and which are generated for each of m-number of local areas including each of m-number of feature points of an image of the merchandise after associating the piece of merchandise and m-number of first local feature with each other;
   an imaging unit;
   a first processor that executes the steps of:
      extracting n-number of feature points from an image on a video captured by the imaging unit, and
      generating n-number of second local feature which are respectively 1-dimensional to j-dimensional feature vectors for n-number of local areas including each of the n-number of feature points; and
   a second processor that executes the steps of:
      selecting a smaller number of dimensions among the number of dimensions i of the feature vectors of the first local feature and the number of dimensions j of the feature vectors of the second local feature, and
      recognizing that the merchandise exists in the image on the video when determination is made that a prescribed proportion or more of the m-number of first local feature which are feature vectors up to the selected number of dimensions correspond to the n-number of second local feature which are feature vectors up to the selected number of dimensions,
   wherein the first local feature and the second local feature are generated by dividing a local area including a feature point extracted from an image into a plurality of sub areas and generating feature vectors of a plurality of dimensions constituted by a gradient direction histogram in the plurality of sub areas, and
   wherein the first local feature and the second local feature are generated by deleting dimensions with a higher correlation between adjacent sub areas from the generated feature vectors of the plurality of dimensions.

2. The information processing system according to claim 1, wherein the first processor further executes the step of notifying a recognition result of the recognizing step.

3. The information processing system according to claim 2, wherein
the information processing system comprises a communication terminal carried by a user and an information processing device that communicates with the communication terminal,
the communication terminal includes the imaging unit and the first processor and transmits the m-number of second local feature from the communication terminal to the information processing device, and
the information processing device includes the local feature storage and the second processor and transmits a recognition result of the recognizing step from the information processing device to the communication terminal.

4. A communication terminal in the information processing system according to claim 3,
the communication terminal comprising:
an imaging unit;
a processor that executes the steps of extracting n-number of feature points from an image on a video captured by the imaging unit and generating n-number of second local feature which are respectively 1-dimensional to j-dimensional feature vectors for n-number of local areas including each of the n-number of feature points;
a transmitter which transmits the m-number of second local feature to an information processing device that recognizes merchandise included in the captured image based on comparison with local feature; and
a receiver which receives information representing merchandise included in the captured image from the information processing device.

5. A control method of a communication terminal in the information processing system according to claim 3,
the control method comprising:
an imaging step of performing imaging;
a second local feature generating step of extracting n-number of feature points from an image on a video captured in the imaging step and generating n-number of second local feature which are respectively 1-dimensional to j-dimensional feature vectors for n-number of local areas including each of the n-number of feature points;
a first transmitting step of transmitting the m-number of second local feature to an information processing device that recognizes merchandise included in the captured image based on comparison with local feature; and
a first receiving step of receiving information representing merchandise included in the captured image from the information processing device.

6. A non-transitory computer-readable storage medium storing thereon a control program of a communication terminal in the information processing system according to claim 3,
the control program causing a computer to execute:
an imaging step of performing imaging;
a second local feature generating step of extracting n-number of feature points from an image on a video captured by the imaging and generating n-number of second local feature which are respectively 1-dimensional to j-dimensional feature vectors for n-number of local areas including each of the n-number of feature points;
a first transmitting step of transmitting the m-number of second local feature to an information processing device that recognizes merchandise included in the captured image based on comparison with local feature; and
a first receiving step of receiving information representing merchandise included in the captured image from the information processing device.

7. An information processing device including a local feature storage that stores a piece of merchandise and m-number of first local feature which are respectively 1-dimensional to i-dimensional feature vectors and which are generated for each of m-number of local areas including each of m-number of feature points of an image of the merchandise after associating the piece of merchandise and m-number of first local feature with each other in the information processing system according to claim 3,
the information processing device comprising:
a receiver which receives, from the communication terminal, n-number of second local feature which are respectively 1-dimensional to j-dimensional feature vectors for n-number of local areas including each of n-number of feature points extracted from an image on a video captured by the imaging unit;
a second processor that executes the steps of selecting a smaller number of dimensions among the number of dimensions i of the feature vectors of the first local feature and the number of dimensions j of the feature vectors of the second local feature, and recognizing that the merchandise exists in the image on the video when determination is made that a prescribed proportion or more of the m-number of first local feature which are feature vectors up to the selected number of dimensions correspond to the n-number of second local feature which are feature vectors up to the selected number of dimensions, and
a transmitter which transmits information representing the recognized merchandise to the communication terminal.

8. A control method of an information processing device including a local feature storage that stores a piece of merchandise and m-number of first local feature which are respectively 1-dimensional to i-dimensional feature vectors and which are respectively generated for m-number of local areas including each of m-number of feature points of an image of the merchandise after associating the piece of merchandise and m-number of first local feature with each other in the information processing system according to claim 3,
the control method comprising:
a second receiving step of receiving, from the communication terminal, n-number of second local feature which are respectively 1-dimensional to j-dimensional feature vectors for n-number of local areas including each of n-number of feature points extracted from an image on a video captured by the imaging unit;
a recognizing step of selecting a smaller number of dimensions among the number of dimensions i of the feature vectors of the first local feature and the number of dimensions j of the feature vectors of the second local feature, and recognizing that the merchandise exists in the image on the video when determination is made that a prescribed proportion or more of the m-number of first local feature which are feature vectors up to the selected number of dimensions correspond to the n-number of second local feature which are feature vectors up to the selected number of dimensions; and a second transmitting step of transmitting information representing the recognized merchandise to the communication terminal.

9. A non-transitory computer-readable storage medium storing thereon a control program of an information processing device including a local feature storage that stores a piece of merchandise and m-number of first local feature which are respectively 1-dimensional to i-dimensional feature vectors and which are generated each of for m-number of local areas including each of m-number of feature points of an image of the merchandise after associating the piece of merchandise and m-number of first local feature with each other in the information processing system according to claim 3, the control program causing a computer to execute:

a second receiving step of receiving, from the communication terminal, n-number of second local feature which are respectively 1-dimensional to j-dimensional feature vectors for n-number of local areas including each of n-number of feature points extracted from an image on a video captured by the imaging unit;

a recognizing step of selecting a smaller number of dimensions among the number of dimensions i of the feature vectors of the first local feature and the number of dimensions j of the feature vectors of the second local feature, and recognizing that the merchandise exists in the image on the video when determination is made that a prescribed proportion or more of the m-number of first local feature which are feature vectors up to the selected number of dimensions correspond to the n-number of second local feature which are feature vectors up to the selected number of dimensions; and a second transmitting step of transmitting information representing the recognized merchandise to the communication terminal.

10. The information processing system according to claim 1, wherein the local feature storage stores, in association with each of a plurality of pieces of merchandise, the m-number of first local feature generated from an image of each piece of merchandise, and the second processor executes the steps of recognizing a plurality of pieces of merchandise included in the image captured by the imaging unit and recognizing an arrangement of the plurality of pieces of merchandise included in the image captured by the imaging unit based on an arrangement of the n-number of second local feature.

11. The information processing system according to claim 10, wherein the second processor performs the step of performing inventory or shelf allocation based on the arrangement of the plurality of pieces of merchandise recognized by the second processor.

12. The information processing system according to claim 1, wherein the image of the merchandise includes an image of a packing container containing a plurality of pieces of merchandise, and the second processor executes the step of recognizing the packing container.

13. The information processing system according to claim 12, wherein the second processor performs the step of performing distribution management or stock management of the merchandise based on the recognition of the packing container by the second processor.

14. The information processing system according to claim 1, wherein the first processor executes the step of generating, in correspondence to a correlation of the merchandise, the second local feature having a larger number of dimensions with respect to merchandise having a higher correlation with other merchandise.

15. The information processing system according to claim 1, wherein the local feature storage stores, in correspondence to a correlation of the merchandise, the first local feature having a larger number of dimensions with respect to merchandise having a higher correlation with other merchandise.

16. The information processing system according to claim 1, wherein the second processor executes the step of determining a direction of the merchandise and recognizes a position of an identifier attached to the merchandise based on the direction, the identifier identifying the merchandise.

17. The information processing system according to claim 1, wherein the merchandise is a book in a library.

18. The information processing system according to claim 1, wherein the merchandise is a work of art in an art museum.

19. The information processing system according to claim 1, wherein the merchandise is an exhibit in a museum.

20. An information processing method in an information processing system including a local feature storage that stores a piece of merchandise and m-number of first local feature which are respectively 1-dimensional to i-dimensional feature vectors and which are generated for each of m-number of local areas including each of m-number of feature points of an image of the merchandise after associating the piece of merchandise and m-number of first local feature with each other, the information processing method comprising:

an imaging step of performing imaging;

a second local feature generating step of extracting n-number of feature points from an image on a video captured in the imaging step and generating n-number of second local feature which are respectively 1-dimensional to j-dimensional feature vectors for n-number of local areas including each of the n-number of feature points; and a recognizing step of selecting a smaller number of dimensions among the number of dimensions i of the feature vectors of the first local feature and the number of dimensions j of the feature vectors of the second local feature, and recognizing that the merchandise exists in the image on the video when determination is made that a prescribed proportion or more of the m-number of first local feature which are feature vectors up to the selected number of dimensions correspond to the n-number of second local feature which are feature vectors up to the selected number of dimensions, wherein the first local feature and the second local feature are generated by dividing a local area including a feature point extracted from an image into a plurality of sub areas and generating feature vectors of a plurality of dimensions constituted by a gradient direction histogram in the plurality of sub areas, and wherein the first local feature and the second local feature are generated by deleting dimensions with a higher correlation between adjacent sub areas from the generated feature vectors of the plurality of dimensions.

* * * * *